US008589970B2

(12) United States Patent
Teraoka et al.

(10) Patent No.: US 8,589,970 B2
(45) Date of Patent: Nov. 19, 2013

(54) CONTENT TRANSMITTER AND RECEIVER APPARATUS AND CONTENT TRANSMITTING AND RECEIVING METHOD

(75) Inventors: Hidetoshi Teraoka, Kawasaki (JP); Hiroo Okamoto, Yokohama (JP); Chiyo Ohno, Chigasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 558 days.

(21) Appl. No.: 12/779,801

(22) Filed: May 13, 2010

(65) Prior Publication Data
US 2010/0293570 A1 Nov. 18, 2010

(30) Foreign Application Priority Data

May 14, 2009 (JP) ................................ 2009-117175
Jun. 9, 2009 (JP) ................................ 2009-137815
Jun. 25, 2009 (JP) ................................ 2009-150460
May 7, 2010 (JP) ................................ 2010-106875

(51) Int. Cl.
*G06F 21/00* (2013.01)
(52) U.S. Cl.
USPC ................................ 725/31; 726/4
(58) Field of Classification Search
USPC ................................ 725/31; 726/4
See application file for complete search history.

(56) References Cited

U.S. PATENT DOCUMENTS

2004/0158634 A1* 8/2004 Saito et al. ............... 709/225
2005/0210290 A1   9/2005 Ono et al.
2006/0265735 A1  11/2006 Ohno
2007/0022195 A1   1/2007 Kawano et al.
2007/0192837 A1   8/2007 Lee et al.

FOREIGN PATENT DOCUMENTS

| JP | 2005-102021 A | 4/2005 |
|---|---|---|
| JP | 2005-269288 A | 9/2005 |
| JP | 2006-323707 A | 11/2006 |
| JP | 2007-036351 A | 2/2007 |
| JP | 2007-220095 A | 8/2007 |
| JP | 2009-225074 A | 10/2009 |
| WO | WO2009/116338 A1 | 9/2009 |

OTHER PUBLICATIONS

Japan Patent Office office action for application JP2009-117175 (Jan. 15, 2013).

* cited by examiner

*Primary Examiner* — Lisa Lewis
(74) *Attorney, Agent, or Firm* — Kilpatrick Townsend & Stockton LLP

(57) ABSTRACT

A content transmitter apparatus is provided which decides whether to permit a content receiver apparatus at a content transmission destination to retransmit content to another content receiver apparatus located inside a house and transmits to the content receiver apparatus the content along with an identifier indicating a permission or prohibition of the content retransmission. A content receiver apparatus is also provided which, when it receives encrypted content from the content transmitter apparatus, checks an identifier received together with the content in executing the content retransmission to another content receiver apparatus located outside the house. If the identifier is found to permit the content retransmission, the content receiver apparatus encrypts and retransmits the content to the outside-house content receiver apparatus. If the identifier is found to not permit the content retransmission, the content receiver apparatus does not retransmit the content to the outside of the house.

22 Claims, 46 Drawing Sheets

FIG. 5

TABLE OF DEVICE INFORMATION ~5000
CONTENT TRANSMITTER AND RECEIVER APPARATUS ~5100

| | |
|---|---|
| MAXIMUM DEVICE AUTHENTICATION NUMBER | 34 |
| MAXIMUM REMOTE REGISTRATION NUMBER | 40 |
| MAXIMUM IN-HOUSE ACCESS COUNTER VALUE | 1000 |
| MAXIMUM REMOTE ACCESS COUNTER VALUE | 3000 |
| MAXIMUM SIMULTANEOUS ACCESS NUMBER | 3 |
| MAXIMUM SIMULTANEOUS REMOTE ACCESS NUMBER | 1 |

5101, 5102, 5103, 5104, 5105, 5106

TABLE OF DEVICE INFORMATION ~5200

| ID | DEVICE ID | ADDRESS INFORMATION | IN-HOUSE ACCESS COUNTER VALUE | REMOTE ACCESS KEY | ACCESS STATE | REMOTE ACCESS COUNTER VALUE |
|---|---|---|---|---|---|---|
| 1 | aa bb cc dd ee (CONTENT RECEIVER APPARATUS 300) | AAAAA | 1000 | – | STOP | – |
| 2 | ff aa bb cc dd (MOBILE TERMINAL 200) | BBBBB | 333 | "#$$%#& | OUT OF THE HOUSE | 2300 |
| 3 | ff aa bb cc dd (MOBILE TERMINAL 200) | BBBBB | – | "#$$%#* | STOP | 3000 |
| 4 | ff aa bb cc ee (CONTENT RECEIVER APPARATUS 400) | CCCCC | – | "#$$%#& | STOP | 3000 |
| ... | | | | | | |

5201, 5202, 5203, 5204, 5205, 5206, 5207
5211, 5212, 5213, 5214

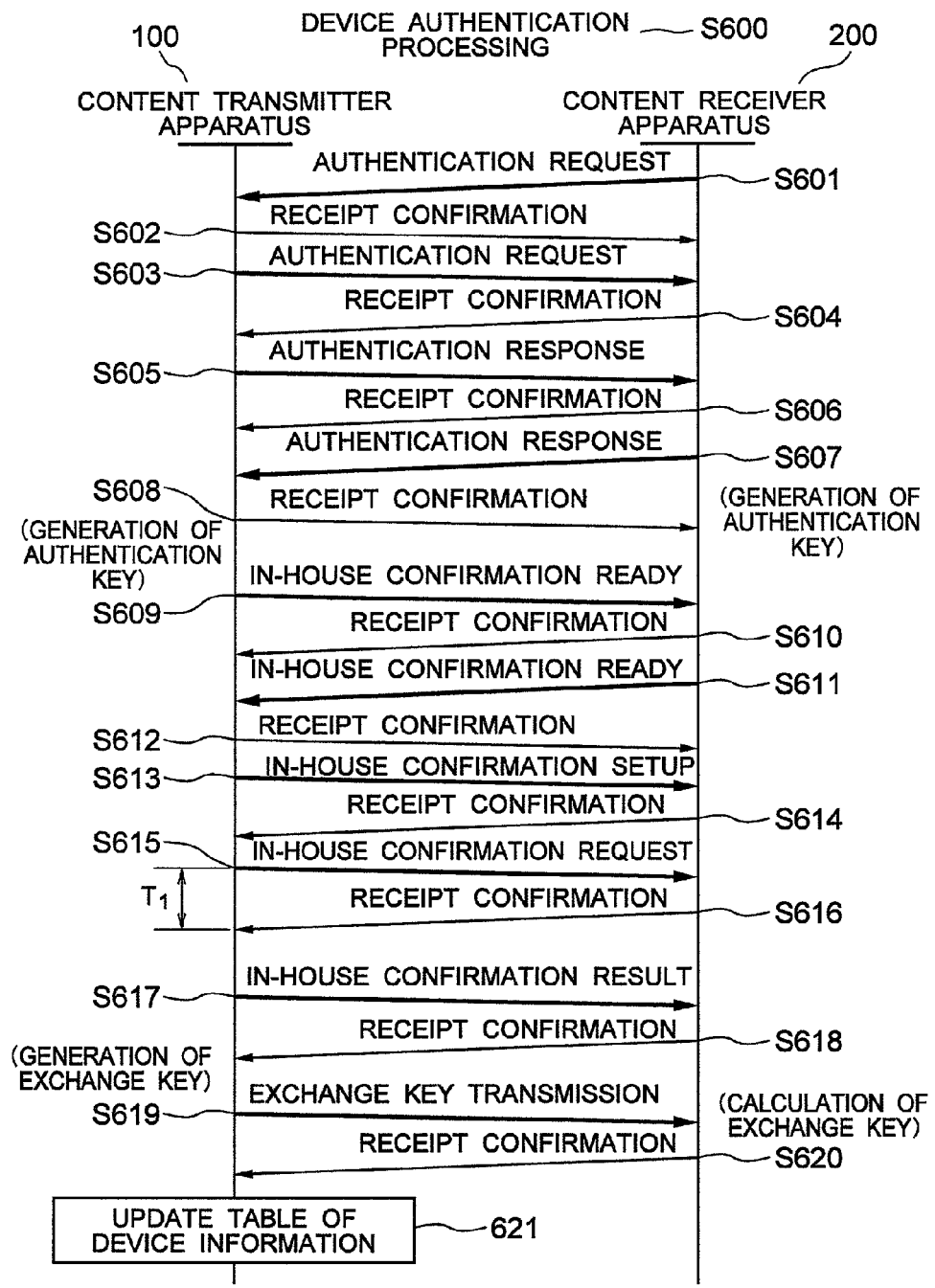

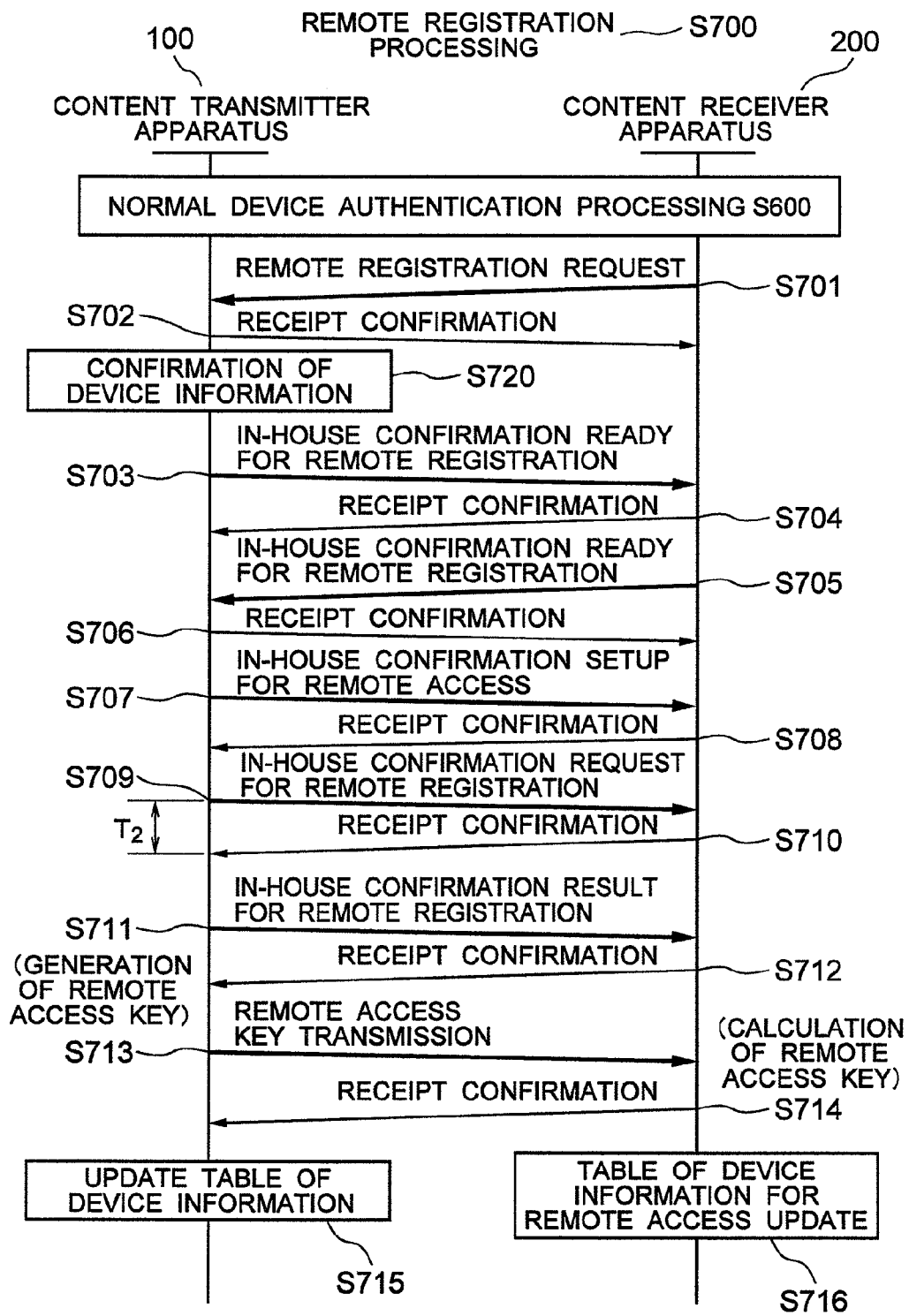

FIG. 8

TABLE OF DEVICE INFORMATION FOR REMOTE ACCESS 60000

| ID 60001 | ADDRESS INFORMATION 60002 | | REGISTRATION INFORMATION 60003 | | EXTERNAL ACCESS KEY 60004 |
|---|---|---|---|---|---|
| | MAC | IP | USER NAME | PASSWORD | |
| 1 | DDDDDD | 133.144.xxx.yyy | taro | ************ | "#$$%#& 6101 |
| 2 | CCCCCC | 133.144.aaa.yyy | hanako | ************ | "#"#%%"" 6102 |
| 3 | AAAAAA | 133.144.xxx.bbb | kazuo | ************ | #$"%'%~ 6103 |
| ... | | | | | |

FIG.15

MANAGEMENT TABLE 5300

| | | |
|---|---|---|
| MAXIMUM DEVICE AUTHENTICATION NUMBER | 34 | ~5101 |
| MAXIMUM REMOTE REGISTRATION NUMBER | 40 | ~5102 |
| MAXIMUM IN-HOUSE ACCESS COUNTER VALUE | 1000 | ~5103 |
| MAXIMUM REMOTE ACCESS COUNTER VALUE | 3000 | ~5104 |
| MAXIMUM SIMULTANEOUS ACCESS NUMBER | 3 | ~5105 |
| MAXIMUM SIMULTANEOUS REMOTE ACCESS NUMBER | 1 | ~5106 |
| REMOTE ACCESS PASSWORD | abc987def | ~5107 |

FIG.18

TABLE OF DEVICE INFORMATION — 6000
CONTENT TRANSMITTER AND RECEIVER APPARATUS — 5800

| | | |
|---|---|---|
| MAXIMUM DEVICE AUTHENTICATION NUMBER | 34 | 5101 |
| MAXIMUM REMOTE REGISTRATION NUMBER (IN-HOUSE REGISTRATION) | 40 | 5801 |
| MAXIMUM REMOTE REGISTRATION NUMBER (REMOTE REGISTRATION) | 3 | 5802 |
| MAXIMUM IN-HOUSE ACCESS COUNTER VALUE | 2400 | 5103 |
| MAXIMUM REMOTE ACCESS COUNTER VALUE (IN-HOUSE REGISTRATION) | 4800 | 5803 |
| MAXIMUM REMOTE ACCESS COUNTER VALUE (REMOTE REGISTRATION) | 9600 | 5804 |
| MAXIMUM SIMULTANEOUS ACCESS NUMBER | 3 | 5105 |
| MAXIMUM SIMULTANEOUS REMOTE ACCESS NUMBER | 1 | 5106 |
| REMOTE ACCESS PASSWORD | abc987def | 5107 |

TABLE OF DEVICE INFORMATION — 5400
IN-HOUSE ACCESS TABLE OF DEVICE INFORMATION — 5500

| ID (5201) | DEVICE ID (5202) | ADDRESS INFORMATION (5203) | IN-HOUSE ACCESS COUNTER VALUE (5204) | ACCESS STATE (5206) | |
|---|---|---|---|---|---|
| 1 | aa bb cc dd ee (CONTENT RECEIVER APPARATUS 300) | AAAAA | 2400 | STOP | 5511 |
| 2 | ff aa bb cc dd (MOBILE TERMINAL 200) | BBBBB | 333 | STOP | 5512 |
| ... | | | | | |

REMOTE ACCESS DEVICE (IN-HOUSE REGISTRATION) INFORMATION TABLE — 5600

| ID (5201) | DEVICE ID (5202) | ADDRESS INFORMATION (5203) | REMOTE ACCESS KEY (5205) | REMOTE COUNTER VALUE (5601) | ACCESS STATE (5207) | |
|---|---|---|---|---|---|---|
| 1 | ff aa bb cc dd (MOBILE TERMINAL 200) | BBBBB | "#$$%#*" | 4800 | STOP | 5611 |
| ... | | | | | | |

REMOTE ACCESS DEVICE (REMOTE REGISTRATION) INFORMATION TABLE — 5700

| ID (5201) | DEVICE ID (5202) | ADDRESS INFORMATION (5203) | REMOTE ACCESS KEY (5205) | REMOTE COUNTER VALUE (5701) | ACCESS STATE (5207) | |
|---|---|---|---|---|---|---|
| 1 | ff aa bb cc dd (MOBILE TERMINAL 200) | BBBBB | "#$$%#*" | 9600 | STOP | 5711 |
| ... | | | | | | |

FIG.19

MANAGEMENT TABLE — 5900

| | | |
|---|---|---|
| MAXIMUM DEVICE AUTHENTICATION NUMBER | 34 | — 5101 |
| MAXIMUM REMOTE REGISTRATION NUMBER (IN-HOUSE REGISTRATION) | 40 | — 5801 |
| MAXIMUM REMOTE REGISTRATION NUMBER (REMOTE REGISTRATION) | 3 | — 5802 |
| MAXIMUM IN-HOUSE ACCESS COUNTER VALU | 2400 | — 5103 |
| MAXIMUM REMOTE ACCESS COUNTER VALUE (IN-HOUSE REGISTRATION) | 4800 | — 5803 |
| MAXIMUM REMOTE ACCESS COUNTER VALUE (REMOTE REGISTRATION) | 9600 | — 5804 |
| MAXIMUM SIMULTANEOUS ACCESS NUMBER | 3 | — 5105 |
| MAXIMUM SIMULTANEOUS REMOTE ACCESS NUMBER | 1 | — 5106 |
| REMOTE ACCESS PASSWORD | abc987def | — 5107 |
| MAXIMUM VALIDITY PERIOD OF REMOTE ACCESS PASSWORD | 20XX/CC/DD 23:59:00 | — 5901 |
| UNREGISTERED VALIDITY PERIOD OF REMOTE ACCESS PASSWORD | 20XX/AA/BB 23:59:00 | — 5902 |

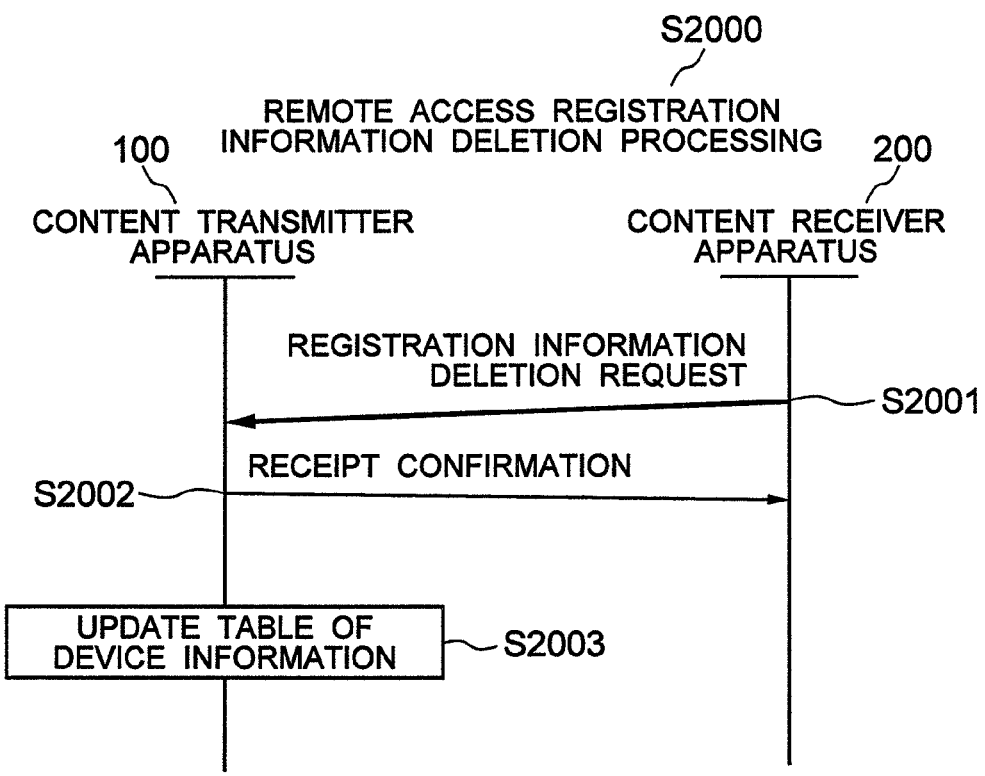

FIG.21

REMOTE ACCESS DEVICE (IN-HOUSE REGISTRATION) INFORMATION TABLE ~7000

| ID 5201 | DEVICE ID 5202 | ADDRESS INFORMATION 5203 | REMOTE ACCESS KEY 5205 | REMOTE ACCESS COUNTER VALUE 5701 | PASSWORD 7001 | 7002 | ACCESS STATE 5207 |
|---|---|---|---|---|---|---|---|
| 1 | ff aa bb cc dd (MOBILE TERMINAL 200) | BBBBB | "#$$%#* | 9600 | abc987def | 20XX/CC/DD 23:59:00 | STOP ~7011 |
| 2 | ff aa bb cc ee (CONTENT RECEIVER APPARATUS 400) | — | — | — | abc9dc7dea | 20XX/CC/AA 23:59:00 | NOT REGISTERED ~7012 |
| ... | | | | | | | |

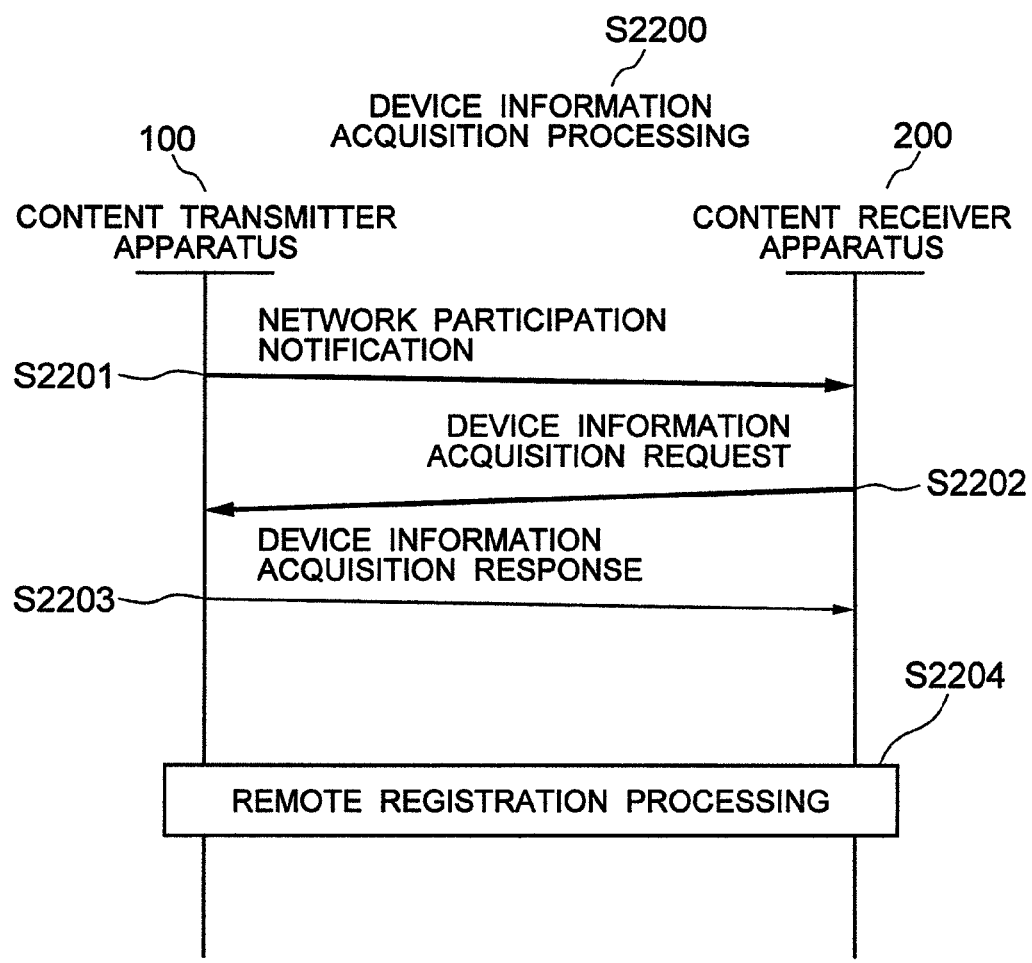

FIG.23

```
<?xml version="1.0"encoding="utf-8"?><root xmlns="urn:schemas-upnp-
org:device-1-0"xmlns:dlna="urn:schemas-dlna-org:device-1-0">
  <specVersion>
    <major>1</major>
    <minor>0</minor>
  </specVersion>
  <device>
    <dlna:X_DLNADOC>DMS-1.50</dlna:X_DLNADOC>
    <dlna:X_DLNACAP>dtcp-ra</dlna:X_DLNACAP>
    <dlna:X_DTCP_RA_LIST>
      <dtcp_local_reg>192.168.1.100:53219</dtcp_local_reg>
      <dtcp_remote_reg>128.241.23.25:53220</dtcp_remote_reg>
    </dlna:X_DTCP_RA_LIST>
    <deviceType>urn:schemas-upnp-org:device:MediaServer:1</deviceType>
    <friendlyName>manufacturer.com DMS</friendlyName>
    <manufacturer>manufacturer</manufacturer>
    <manufacturerURL>http://www.manufacturer.com</manufacturerURL>
    <modelName>manufacturer.com DMS</modelName>
    <modelURL>http://www.manufacturer.com/</modelURL>
    <UDN>uuid:c65f5c6c-1f0f-12de-8c72-00aab0ee00ff</UDN>
    <iconList>
      <icon>
        <mimetype>image/jpeg</mimetype>
        <width>48</width>
        <height>48</height>
        <depth>24</deptht>
        <url>doc/desc/sm.jpg</url>
      </icon>
    </iconList>
    <serviceList>
      <service>
        <serviceType>urn:schemas-upnp-org:service:ContentDirectory:1</serviceType>
        <serviceId>urn:upnp-org:serviceId:ContentDirectory</serviceId>
        <SCPDURL>doc/desc/cds.xml</SCPDURL>
        <controlURL>control/ContentDirectory</controlURL>
        <eventSubURL>event/ContentDirectory</eventSubURL>
      </service>
    </serviceList>
  </device>
</root>
```

FIG.28

RETRANSMISSION CONDITION TABLE ~ 9000

| COPY CONTROL INFORMATION \ INPUT MEDIA | BROADCAST WAVE | HDD | OPTICAL DISC 1 | OPTICAL DISC 2 | SEMICONDUCTOR MEMORY | IP BROADCAST | IN-HOUSE NETWORK |
|---|---|---|---|---|---|---|---|
| COPY FREE | PERMITTED | PERMITTED | PERMITTED | PERMITTED | PERMITTED | PERMITTED | — |
| COPY FREE WITH EPN ASSERTED | PERMITTED | PERMITTED | PERMITTED | PERMITTED | PERMITTED | PERMITTED | — |
| COPY ONE GENERATION | PERMITTED | PERMITTED | PERMITTED | PERMITTED | PERMITTED | PERMITTED | — |
| NO MORE COPIES | — | PERMITTED | PERMITTED | PERMITTED | PERMITTED | PERMITTED | — |
| COPY NEVER | PERMITTED | — | PROHIBITED | PROHIBITED | PROHIBITED | PERMITTED | — |

FIG.29

IN-HOUSE ACCESS TABLE ~7100
OF DEVICE INFORMATION

| ID 5201 | DEVICE ID 5202 | ADDRESS INFORMATION 5203 | IN-HOUSE ACCESS COUNTER VALUE 5204 | ACCESS STATE 5206 | REMOTE RETRANSMISSION CONTROLLABILITY 7101 |
|---|---|---|---|---|---|
| 1 | aa bb cc dd ee (CONTENT RECEIVER APPARATUS 300) | AAAAA | 2400 | STOP | NOT CONTROLLABLE 7102 |
| 2 | ff aa bb dd (MOBILE TERMINAL 200) | BBBBB | 333 | STOP | CONTROLLABLE 7103 |
| ... | | | | | |

FIG.31

PACKET MONITORING TABLE —— 9100

| ID | PORT NUMBER | TTL LIMIT | |
|---|---|---|---|
| 1 | 53219 | 3 | — 9111 |
| 2 | 53220 | 0 | — 9112 |
| 3 | 33432 | 128 | — 9113 |
| ... | ... | ... | |

CONNECTION MANAGEMENT — 9200
TABLE

| ID | SOCKET DESCRIPTOR | TTL LIMIT |
|----|-------------------|-----------|
| 1  | 2                 | 3         |
| 2  | 4                 | 0         |
| 3  | 6                 | NOT SET   |
| ... | ...              | ...       |

9201, 9202, 9203 — column labels
9211, 9212, 9213 — rows

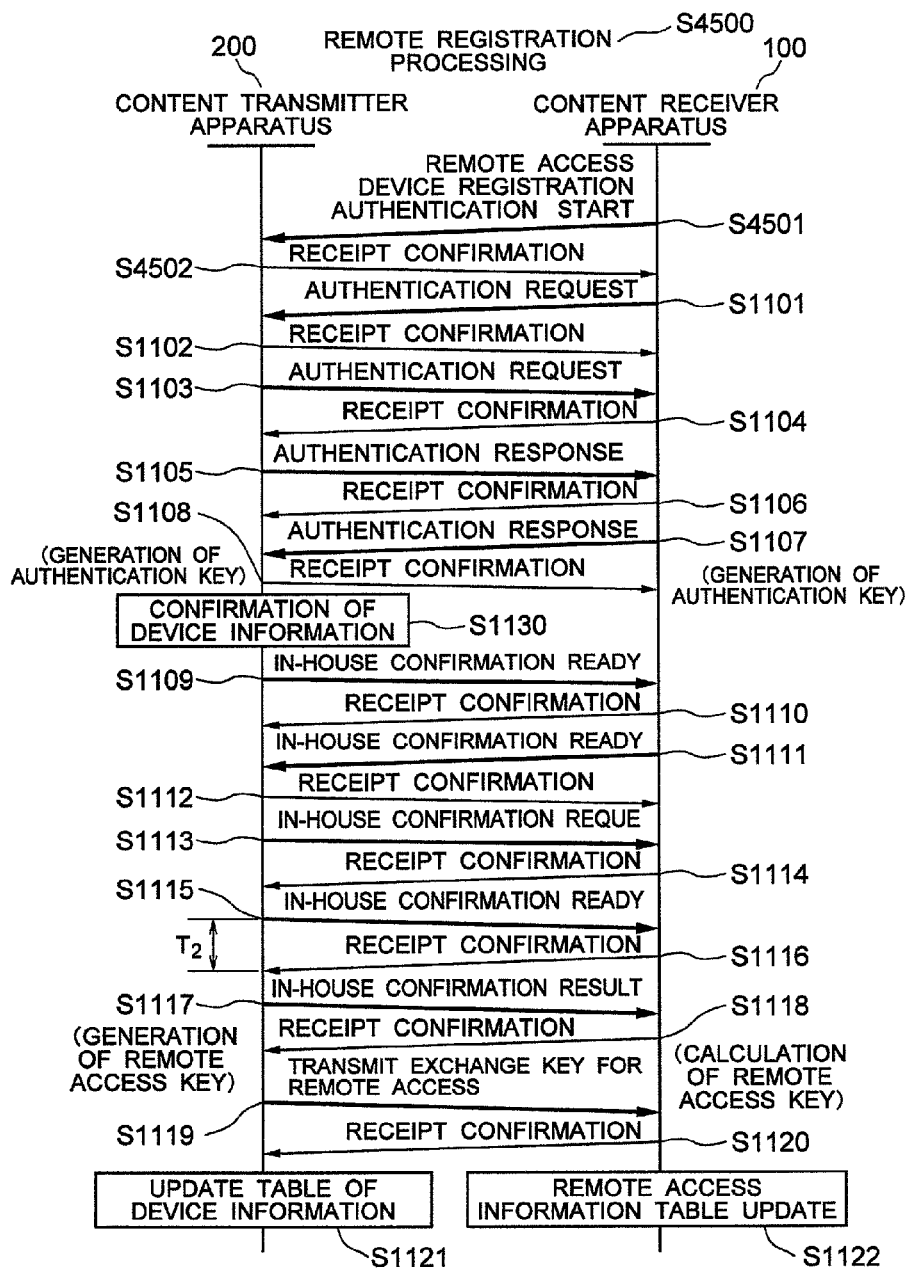

FIG.46

RETRANSMISSION CONDITION TABLE — 9300

| INPUT MEDIA | | | COPY FREE | COPY FREE WITH EPN ASSERTED | COPY ONE GENERATION | NO MORE COPIES | COPY NEVER |
|---|---|---|---|---|---|---|---|
| BROADCAST WAVE | IDENTIFY EXIST | PROHIBITED | PERMITTED | PROHIBITED | PROHIBITED | — | PROHIBITED |
| | | PERMITTED | PERMITTED | PERMITTED | PERMITTED | — | PERMITTED |
| | NO IDENTIFY | | PERMITTED | PERMITTED | PERMITTED | — | PERMITTED |
| HDD | | | PERMITTED | PERMITTED | PERMITTED | PERMITTED | — |
| OPTICAL DISC 1 | | | PERMITTED | PERMITTED | PERMITTED | PERMITTED | — |
| OPTICAL DISC 2 | IDENTIFY EXIST | PROHIBITED | PERMITTED | PROHIBITED | PROHIBITED | PROHIBITED | PROHIBITED |
| | | PERMITTED | PERMITTED | PERMITTED | PERMITTED | PERMITTED | PERMITTED |
| | NO IDENTIFY | | PERMITTED | PERMITTED | PERMITTED | PERMITTED | PROHIBITED |
| SEMICONDUCTOR MEMORY | | | PERMITTED | PERMITTED | PERMITTED | PERMITTED | PROHIBITED |
| IP BROADCAST | IDENTIFY EXIST | PROHIBITED | PERMITTED | PROHIBITED | PROHIBITED | — | PROHIBITED |
| | | PERMITTED | PERMITTED | PERMITTED | PERMITTED | — | PERMITTED |
| | NO IDENTIFY | | PERMITTED | PERMITTED | PERMITTED | — | PERMITTED |
| IN-HOUSE NETWORK | | | PERMITTED | PROHIBITED | PROHIBITED | PROHIBITED | PROHIBITED |

CONTENT TRANSMITTER AND RECEIVER APPARATUS AND CONTENT TRANSMITTING AND RECEIVING METHOD

INCORPORATION BY REFERENCE

The present application claims priorities from Japanese applications JP2009-117175 filed on May 14, 2009, JP2009-137815 filed on Jun. 9, 2009, JP2009-150460 filed on Jun. 25, 2009 and JP2010-106875 filed on May 7, 2010, the contents of which are hereby incorporated by reference into this application.

BACKGROUND OF THE INVENTION

The present invention relates to a transmitting device for transmitting and receiving contents, such as audio visual materials, through networks which is suited to copy protects of the contents and to a content transmitting method.

In transmitting a material to be delivered, or content, between digital audiovisual devices, the device on the transmitting side implements a copy protect on the content for preventing it from being copied an unlimited number of times, by encrypting the content and sharing information for decryption with the content receiving side device so that the content cannot be correctly received and decrypted by other than the intended content receiving side device at the destination.

Among such copy protects employed by digital audiovisual devices is a method described in JP-A-2005-269288. The method proposed by JP-A-2005-269288 involves: classifying contents into categories of "Copy free (permitted to be copied without limitation)", "Copy free with EPN asserted (permitted to be copied without limitation with an output protection)", "Copy one generation (permitted to be copied for only one generation)", "No more copies (no further copies permitted)" and "Copy never (no copies permitted)"; allowing the recording device to record only those contents categorized as "Copy free", "Copy free with EPN asserted" and "Copy one generation" and requiring the recording device to, after making a copy, handle those contents in the "Copy one generation" category as being in the "No more copies" category; and requiring the device on the transmitting side to implement the encryption on all contents before transmitting them, except those in the "Copy free" category, thus preventing an uncontrolled copying of contents.

Further in JP-A-2005-269288 and JP-A-2007-36351, a technique is disclosed which, in a content transmission through a wired or wireless network, checks that the network is an in-house network so as to prevent copy-protected contents such as broadcast programs that have been recorded in house from being distributed unlimitedly to the outside the house.

SUMMARY OF THE INVENTION

For a user who has a device for use in a mobile environment, such as a note PC and a mobile terminal, there is a growing need that he or she may want to access his or her house for contents from a visited location or from a commuter train. With the conventional technique described above, however, when one wishes to transmit the copy-protected content through a wired or wireless network, the devices on the transmitting side and on the receiving side have a function incorporated therein to checked that these two devices are in the same house. Because of this function, the user cannot make an access to the copy-protected content from outside the house.

To solve the above problem, a content transmitter apparatus is provided which, when transmitting encrypted content to a content receiver apparatus, decides whether to permit the content receiver apparatus at the content transmission destination to retransmit the content to another content receiver apparatus located inside the house and delivers to the content receiver apparatus the content along with an identifier indicating a permission or prohibition of the content retransmission. A content receiver apparatus is also provided which, when it receives encrypted content from the content transmitter apparatus, checks an identifier received together with the content in executing the content retransmission to another content receiver apparatus located outside the house. If the identifier is found to permit the content retransmission, the content receiver apparatus encrypts and retransmits the content to the outside-house content receiver apparatus. If the identifier is found to not permit the content retransmission, the content receiver apparatus does not retransmit the content to the outside of the house.

A content receiver apparatus for making an external access to house is registered with the content transmitter apparatus in the house in advance and then only the content receiver apparatus that has succeeded in the above procedure is subjected, outside the house, to a procedure for authenticating out-of-house dedicated devices. With the above procedure executed, contents in the house can be accessed and viewed. This allows an authorized user to view a desired content stored in the house from outside the house without exceeding a personal use range, thus improving user's convenience.

Other objects, features and advantages of the invention will become apparent from the following description of the embodiments of the invention taken in conjunction with the accompanying drawings.

BRIEF DESCRIPTION OF THE DRAWINGS

FIG. 5 is an explanatory diagram showing an example configuration of management information.

FIG. 6 is an explanatory diagram showing an example of a device authentication sequence executed between the content receiver apparatus and the content transmitter apparatus.

FIG. 7 is an explanatory diagram showing an example of a remote access device registration sequence executed between the content receiver apparatus and the content transmitter apparatus.

FIG. 8 is an explanatory diagram showing an example of a table of device information for remote access.

FIG. 15 is an explanatory diagram showing an example of a management table.

FIG. 18 shows an example configuration in which validity periods of device information stored in a device information registration portion are managed by using different remote count values in two difference cases where the remote access device registration sequence is performed in house and out of house.

FIG. 19 shows an example management table of device information stored in the device information registration portion when a validity period is set to a remote access password.

FIG. 20 shows an example of a remote access device registration information deleting sequence that the content receiver apparatus performs from outside the house to delete the remote access device information registered with the table of device information or with the remote access device (remote registration) information table.

FIG. 21 shows an example of the remote access device (remote registration) information table in device information stored in the device information registration portion when a remote access password is set for every registered device.

FIG. 22 shows an example of access destination information acquisition sequence for remote registration.

FIG. 23 shows an example of device information of a content transmitter apparatus that supports a remote access.

FIG. 28 shows an example of retransmission condition table showing conditions under which the content retransmission to the outside of house is permitted.

FIG. 29 shows an example of in-house access table of device information managed by the device information management portion of the content transmitter apparatus when the remote content retransmission of the content receiver apparatus is controlled by a remote access flag.

FIG. 31 shows an example of packet monitoring table 9100 used when filtering is performed for each port number by using TTL in the communication processing portion of the content transmitter apparatus.

FIG. 33 shows an example of connection management table 9200 used when the device authentication packets are filtered for each TCP connection by using TTL in the device authentication processing portion of the content transmitter apparatus.

FIG. 45 shows an example procedure of remote registration processing executed in advance inside house between the content transmitter apparatus 100 and the mobile terminal 200.

FIG. 46 is an example of retransmission condition table 9300 that shows conditions under which content delivered from the content transmitter apparatus is permitted to be retransmitted.

DESCRIPTION OF THE EMBODIMENTS

Embodiments will be described by referring to the accompanying drawings.

[Embodiment 1]

Figure 1:
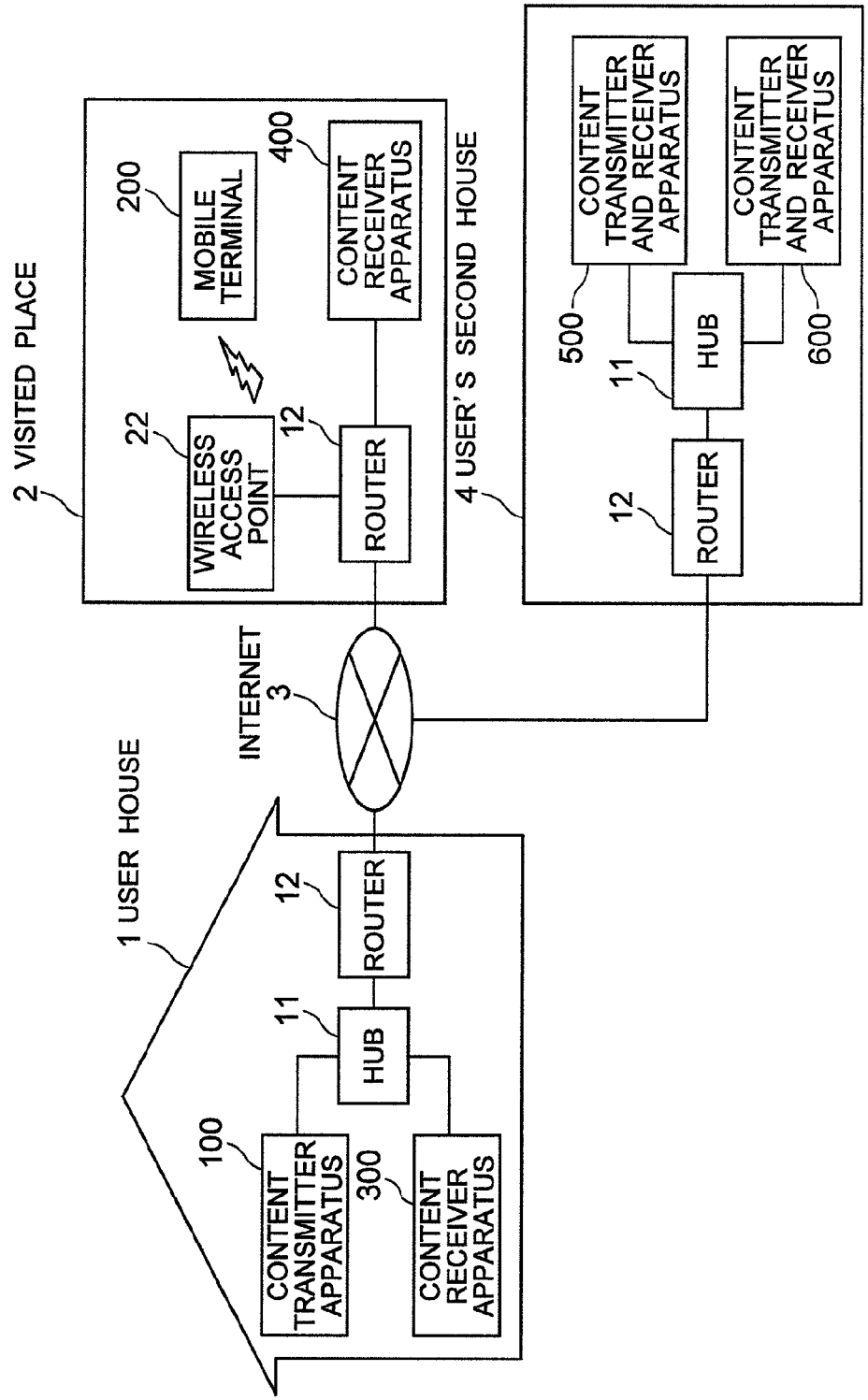
FIG. 1 is an explanatory diagram showing an example system configuration.

FIG. 1 shows an example system configuration. In a user house 1, a content transmitter apparatus 100 and a content receiver apparatus 300 are connected through wired LAN cables to a network hub device 11 which in turn is connected to a router 12. The router 12 is connected through a modem and an optoelectric converter to the Internet 3.

Where the user is visiting (e.g., hotel and office) 2, the user's mobile terminal 300 can communicate with a wireless access point 22 for connection to the Internet 3 through a router 21. A content receiver apparatus 400 installed at the visited place is connected to the Internet 3 through the router 21.

At user's second house 4, a content transmitter and receiver apparatus 500 and a content transmitter and receiver apparatus 600 are connected through wired LAN cables to a network hub device 11 which in turn is connected to a router 12. The router 12 is connected to the Internet 3 through a modem and an optoelectric converter.

In the network a standard IP (Internet Protocol) is used as the network protocol. For a higher level transport protocol, the TCP (Transmission Control Protocol) and UDP (User Datagram Protocol) are used. For the transmission of contents, still higher application protocols, such as RTP (Real-time Transport Protocol), HTTP (Hyper Text Transfer Protocol) and FTP (File Transfer Protocol), are used. This embodiment is not limited to either of the IP versions, IPv4 and IPv6.

The content transmitter apparatus 100, mobile terminal 200, content receiver apparatus 300, content receiver apparatus 400, content transmitter and receiver apparatus 500, content transmitter and receiver apparatus 600 and router 12 all have their own IP addresses that identify themselves on the IP network. An interface of each network communication circuit is assigned an 48-bit MAC (Media Access Control) address. The IP address setting for each device may be done by having the router 12 or router 21 act as a DHCP server conforming to DHCP (Dynamic Host Configuration Protocol) which then assigns IP addresses to these devices.

If IPv6 (Internet Protocol Version 6) is used, individual devices may set their own IP addresses according to a method called a stateless automatic setting by using upper 64 bits of the IP address and the MAC address of the router 12.

While in FIG. 1 devices in the user house 1 are shown interconnected through wired LAN, they may connect to one another through a LAN using a wireless access point. They may use the network hub device 11 and the router 12 formed integral.

Figure 2:
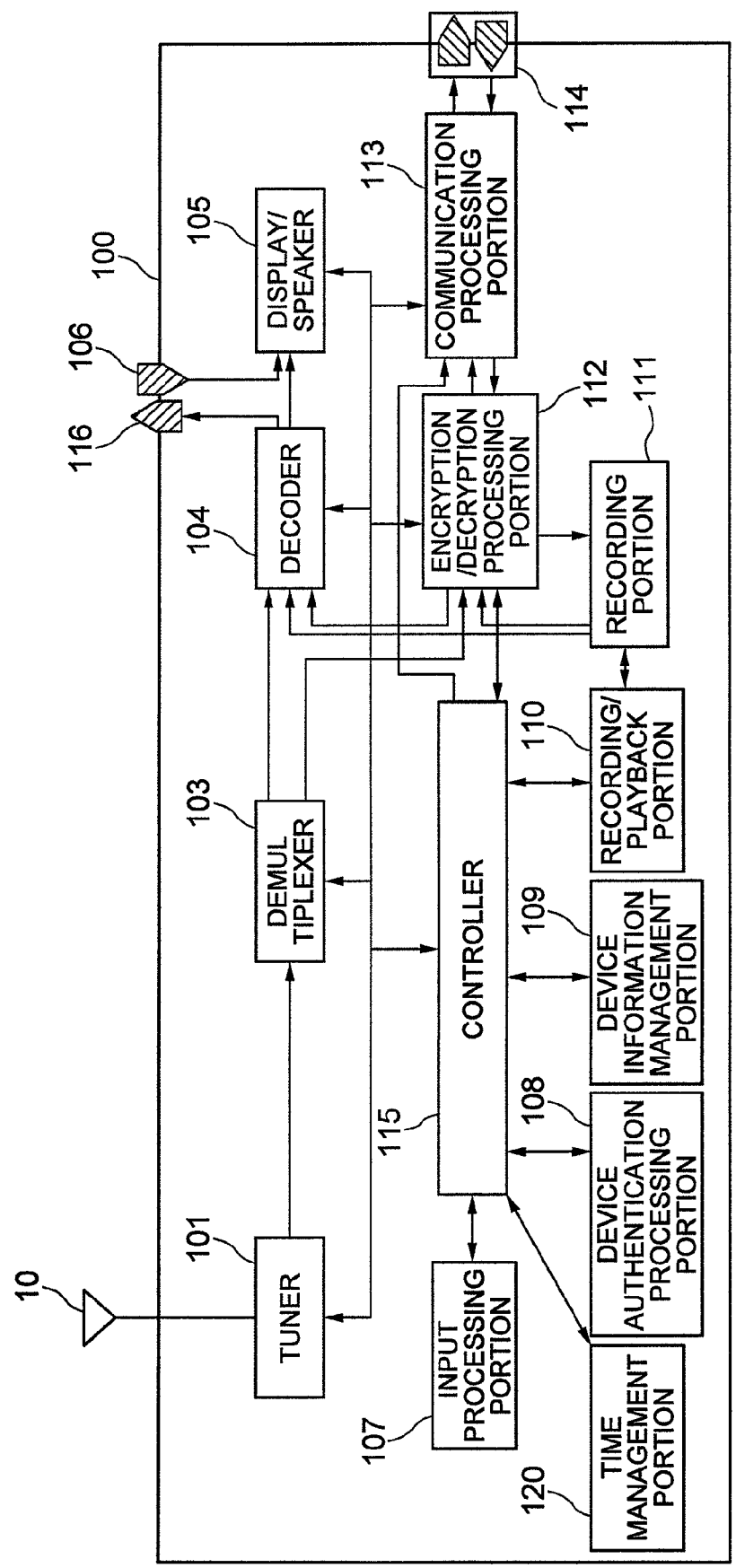
FIG. 2 is an explanatory diagram showing an example configuration of a content transmitter apparatus.

FIG. 2 shows one example configuration of the content transmitter apparatus 100. The similar configuration is also used with the content receiver apparatus 300, content receiver apparatus 400, content transmitter and receiver apparatus 500 and content transmitter and receiver apparatus 600.

The content transmitter apparatus 100 comprises a tuner 101, a demultiplexer 103, a decoder 104, a display/speaker 105, a digital input terminal 106, a digital output terminal 116, an input processing portion 107, a device authentication processing portion 108, a device information management portion 109, a recording/playback portion 110, a recording portion 111, an encryption/decryption processing portion 112, a communication processing portion 113, a digital input/output terminal 114, a controller 115 and a time management portion 120.

The tuner 101 selects a desired channel from a plurality of channels it has received from broadcasting stations and satellites via an antenna 10, and demodulates a digitally modulated program.

The demultiplexer 103 extracts voice data, video data, program information, data and copy control information from the broadcast program. The broadcast program may be descrambled after being extracted.

The decoder 104 decrypts compressed voice and video data contained in the broadcast program entered through the tuner 101, in the content accumulated in the recording portion 111 or in the content received from the digital input/output terminal 114 and then extends them to the original voice signal and video signal.

The display/speaker 105 plays back the output signal from the decoder 104 and the signals entered from the digital input terminal 106. The display/speaker 105 may be installed outside the content transmitter apparatus rather than being built into it.

The digital input terminal 106 receives non-compressed digital data from external devices.

The digital output terminal 116 outputs non-compressed digital data to external devices.

The input processing portion 107 operates the content transmitter apparatus 100 according to instructions from the user through a remote controller and a touch panel.

The device authentication processing portion 108, to deliver copy-protected content through a wired or wireless IP network, makes an authentication check between it and other audiovisual devices using a particular authentication protocol if they are authorized devices and, if so, shares a key for encryption and decryption of content with these audiovisual devices.

The device information management portion 109 manages information on those audiovisual devices that have passed the authentication by the device authentication processing portion 108 and information necessary for the device authentication processing portion 108 to perform the device authentication.

The recording/playback portion 110 performs a recording control for recording content in the recording portion 111 and a playback control for playing back the content recorded in the recording portion 111.

The recording portion 111 is a memory to record broadcast programs. It may be in the form of a removable HDD, optical disc and memory card or a hybrid of these configurations.

The encryption/decryption processing portion 112 decrypts a broadcast program entered through the tuner 101 or content accumulated in the recording portion 111 according to a predetermined procedure defined for a specific input path and for a particular recording media. When recording the broadcast program entered through the tuner 101 in the recording portion 111, the encryption/decryption processing portion 112 encrypts it according to a predetermined procedure defined for a particular recording media. Further, the encryption/decryption processing portion 112 encrypts or decrypts the content received at the digital input/output terminal 114 through the network by using the key shared with the device authentication processing portion 108.

The communication processing portion 113 transmits to other devices connected to the digital input/output terminal 114 through the network the broadcast program entered through the tuner 101, content accumulated in the recording portion 111 and a control command generated by the device authentication processing portion 108 and the controller 115. Further, the communication processing portion 113 receives content from other devices connected to the digital input/output terminal 114 via the network.

The content is delivered or received with an identification code other than "Copy free" encrypted, the identification code indicating how the content should be handled and including "Copy free", "Copy one generation", "No more copies" and "Copy never".

The digital input/output terminal 114 takes in and out content and control commands through the network.

The controller 115 performs an overall control on operations of individual units in the content transmitter apparatus 100.

The time management portion 120 manages time by using time information included in the broadcast signal entered through the tuner 101 and time information provided by an NTP (Network Time Protocol) server on the Internet 3. The NPT is a protocol for devices connected to the network to synchronize their clocks with the correct time.

Figure 3:
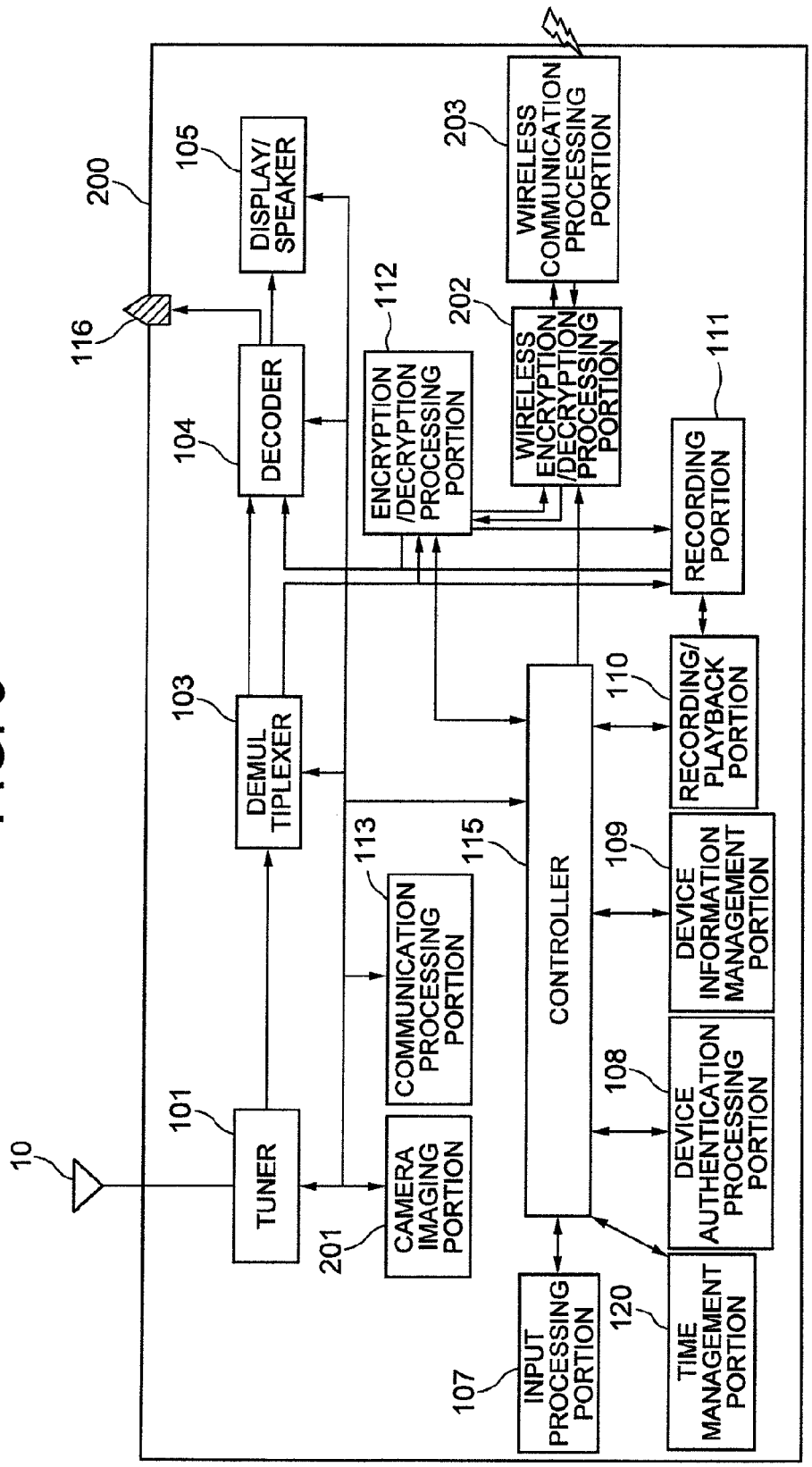
FIG. 3 is an explanatory diagram showing an example configuration of a mobile terminal (content receiver apparatus).

FIG. 3 shows an example configuration of the mobile terminal (content receiver apparatus) 200.

The mobile terminal 200 comprises a tuner 101, a demultiplexer 103, a decoder 104, a display/speaker 105, a digital output terminal 116, a camera imaging portion 201, a communication processing portion 113, an input processing portion 107, a device authentication processing portion 108, a device information management portion 109, a recording/playback portion 110, a recording portion 111, an encryption/decryption processing portion 112, a wireless encryption/decryption processing portion 202, a wireless communication processing portion 203, a controller 115 and a time management portion 120.

The camera imaging portion takes a shot with a camera.

The recording portion 111 is a nonvolatile memory to store videos and still pictures shot by the camera imaging portion, programs received through the tuner 101 and information such as personal information and address book. It may be built into the mobile terminal 200 or constructed as a removable memory.

The wireless encryption/decryption processing portion 202 encrypts and decrypts content received at the wireless communication processing portion 203 through the wireless network and content output from the encryption/decryption processing portion 112 by using a wireless network encryption algorithm. The wireless communication processing portion 203 transmits and receives content and control commands to and from a wireless access point 22 and other audiovisual devices connected through the wireless LAN.

For other parts, the mobile terminal 200 has the same configuration as the content transmitter apparatus 100.

Figure 4:
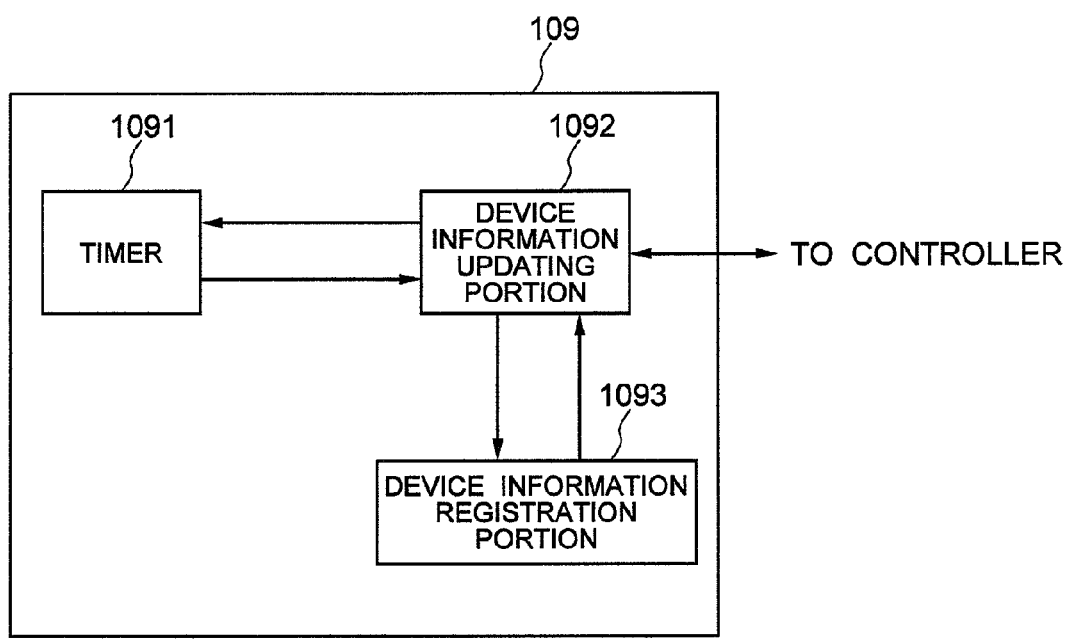
FIG. 4 is an explanatory diagram showing an example configuration of a device information management portion.

FIG. 4 shows an example configuration of the device information management portion 109 in the content transmission and receiving devices.

The device information management portion 109 comprises a timer 1091, a device information updating portion 1092 and a device information registration portion 1093.

The timer 1091 is used to measure time when the device authentication processing portion 108 checks whether a device on the remote end of communication that needs to be authenticated is inside a house or when a validity period, described later, of registered information in the device information registration portion 1093 is managed.

The device information updating portion 1092 is used to manage the validity periods of registered information in the device information registration portion 1093 and, as situation demands, perform registration, update or deletion.

The device information registration portion 1093, when the device authentication by the device information management portion 109 is successfully completed, stores information on the authenticated device on the remote end of communication.

FIG. 5 shows an example of device information 5000 stored in the device information registration portion 1093.

The device information 5000 comprises a management table 5100 and a table of device information 5200.

The management table 5100 comprises a maximum device authentication number 5101, a maximum outside-house registration number 5102, a maximum in-house access counter value 5103, a maximum remote access counter value 5104, a maximum simultaneous access number 5105 and a maximum simultaneous remote access number 5106.

The maximum device authentication number 5101 represents a maximum number of authentications that a content transmitter apparatus and a content receiver apparatus can mutually execute using the device authentication processing portion 108.

The maximum remote registration number 5102 represents a maximum number of remote access devices that can be registered.

The maximum in-house access counter value 5103 represents a maximum value of the in-house access counter set in the timer 1091.

The maximum remote access counter value 5104 represents a maximum value of the remote access counter set in the timer 1091.

The maximum simultaneous access number 5105 represents a maximum number of content access requests that can be accepted.

The maximum remote access number 5106 represents a maximum number of content access requests remote that can be accepted.

Meanwhile, the table of device information 5200 comprises an ID 5201, a device ID 5202, an address information 5203, an in-house access counter value 5204, a remote access key 5205, an access state 5206 and a remote access counter value 5207.

The ID 5201 indicates a table registration number.

The device ID 5202 represents an identifier to uniquely identify each device. The device ID 5202 generated by a particular authentication organization is information or value uniquely assigned to a particular device that is stored in a nonvolatile memory during the process of device manufacture. The device ID 5202 may also include other information such as a public key.

The address information 5203 indicates an IP address or a MAC address of individual devices on the network.

The in-house access counter value 5204 indicates a current value of the in-house access counter set in the timer 1091.

The remote access key 5205 represents key information used by the authentication and encryption/decryption operations when content is delivered between a content transmitter apparatus inside house and a content receiver apparatus outside house.

The access state 5206 indicates a state of content transmission between the content transmitter apparatus and content receiver apparatus (for example, stop, inside the house and out of the house).

The remote access counter value 5207 indicates a current value of the remote access counter set in the timer 1091.

The in-house accesses and remote accesses may be managed differently so as to apply different limitations to the remote accesses than those of the in-house accesses. This may be achieved by using the maximum remote access counter value 5104 in the management table 5100 in addition to the maximum in-house access counter value 5103 and by using the remote access counter value 5207 in the table of device information in addition to the in-house access counter value 5204.

In the configuration of FIG. 1 the inside-house means an internal network in the user house 1 with the router 12 as a boundary with the outside, an internal network in a visited place 2 with the router 12 as a boundary with the outside and an internal network in user's second house 4 with the router 12 as a boundary with the outside. Here, any house of a user has the same meaning as the inside-house. The outside-house, as opposed to the inside-house, represents a network of the Internet 3 with the router 12 functioning as a boundary.

The in-house access in the configuration of FIG. 1 means a connection between devices within the internal network, which is achieved by a device in a house accessing, not beyond the router, to another device in the same house to view a desired content. The remote access means a connection from a device outside the house to a device inside the house, which is achieved by a device outside the house accessing through the Internet beyond the router to a device inside the house to view a desired content.

Distributing the remote access key 5205 to individual devices allows them to be managed for their accesses on the basis of their IDs. In the management table 5100, setting the maximum simultaneous access number 5105 and the maximum remote access number 5106 and managing the access state for each ID in the table of device information allows limitations to be imposed on the total number of accesses made from within and from outside the house and on the number of accesses made from outside the house.

Figure 24:
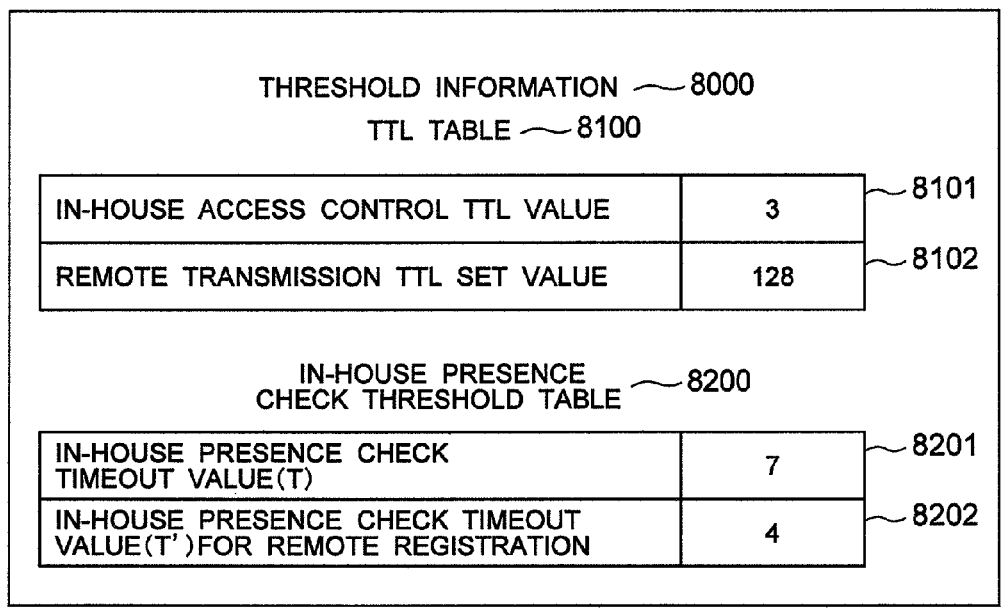
FIG. 24 shows an example configuration of threshold information 8000 that stores various thresholds and set values used by the device authentication processing portion 108.

FIG. 24 shows an example of threshold information 8000 that stores various thresholds and set values used by the device authentication processing portion 108. The threshold information 8000 comprises a TTL table 8100 and an in-house presence check threshold table 8200.

The TTL table 8100 comprises a in-house access limitation TTL value 8101 and a remote transmission TTL set value 8102. In the authentication operation that is performed when a content transmitter apparatus delivers content to a content receiver apparatus in the same house and when a remote access device is registered, the in-house access limitation TTL value 8101 represent a TTL value that is set in a packet transmitted by the content transmitter apparatus and the content receiver apparatus.

The in-house access limitation TTL value 8101 is also used as a threshold to decide whether a packet received has been transmitted from outside the house during the authentication operation that is performed when a content transmitter apparatus delivers content to a content receiver apparatus in the same house and when a remote access device is registered.

The remote transmission TTL set value 8102 is used as a value to be set in a packet transmitted by the content transmitter apparatus and the content receiver apparatus during the remote access device authentication. The remote transmission TTL set value 8102 is larger than the in-house access limitation TTL value 8101.

Here TTL is a value indicating a validity period of a packet which decrements by one each time the packet passes a router or the like. When the TTL is 0, the packet is discarded. So, by setting the TTL to a sufficiently small value, the transfer of a packet outside the house can be prevented.

The in-house presence check threshold table 8200 comprises an in-house presence check timeout value (T) 8201 and an in-house presence check timeout value (T') 8202. During the device authentication processing executed when the content transmitter apparatus delivers content to the content receiver apparatus, the in-house presence check timeout value (T) 8201 is used to confirm that the content receiver apparatus is in the same house, The in-house presence check timeout value (T') for remote registration 8202 is used by the content transmitter apparatus during the remote access device registration operation to confirm that the content receiver apparatus to be registered is in the same house. The in-house presence check timeout value (T') for remote registration 8202 may be set smaller than the in-house presence check timeout value (T) 8201 to perform a stricter in-house presence check for those devices that make an outside-house access during the authentication operation.

FIG. 6 shows a device authentication processing executed between the content transmitter apparatus 100 and the content receiver apparatus 300, both installed in the user house 1 in the system configuration of FIG. 1, by using the devices and information described above. In the following description, the authentication operation explained with reference to FIG. 6 is called a normal authentication.

Here, the TCP is used as a protocol to transmit and receive information for device authentication processing. When information, such as an authentication request to a device on the remote end of communication and an authentication response to the request, is transmitted, a receipt confirmation is returned from the device on the remote end, thus establishing a communication path that can detect a transmission error. In FIG. 6 the data transmission and reception for establishing and canceling a connection according to TCP is not shown.

Data transferred between the content transmitter apparatus 100 and the content receiver apparatus 300 is transmitted as IP packets. In the device authentication processing S600, the content transmitter apparatus 100 and the content receiver apparatus 300 monitor TTLs (Time To Live) of the packets received and discard those packets with the TTL values in excess of the in-house access limitation TTL value 8101 in the TTL table 8100, thus blocking accesses from outside the user house 1.

For this purpose, the content transmitter apparatus 100 and the content receiver apparatus 300 set the TTL of each packet they are going to transmit smaller than the in-house access limitation TTL value 8101 of the TTL table 8100.

First, the content receiver apparatus 300 prepares an authentication request. The device authentication processing portion 108 of the content receiver apparatus 300 attaches to the authentication request information unique to it, including the device ID, and a certificate attesting to the unique information of the device and transmits the authentication request through the communication processing portion 113 to the content transmitter apparatus 100 (S601).

The device authentication processing portion 108 of the content transmitter apparatus 100 receives the authentication request through its communication processing portion 113 and transmits its receipt confirmation to the content receiver apparatus 300 (S602). Then, the device authentication processing portion 108 of the content transmitter apparatus 100 prepares its own authentication request and, as in the case of the content receiver apparatus, attaches unique information of the content transmitter apparatus 100 and its certificate to the authentication request before transmitting it to the content receiver apparatus 300 (S603).

The device authentication processing portion 108 of the content receiver apparatus 300 receives the authentication request and transmits its receipt confirmation to the content transmitter apparatus 100 (S604).

Next, the device authentication processing portion 108 of the content transmitter apparatus 100 checks the information received in response to the authentication request and transmits to the content receiver apparatus 300 an authentication response attached with a parameter necessary to generate key information (S605).

The device authentication processing portion 108 of the content receiver apparatus 300 receives the authentication response and transmits its receipt confirmation to the content transmitter apparatus 100 (S606). Then it prepares its own authentication response and, as with the content transmitter apparatus, transmits its authentication response attached with a parameter necessary to generate key information to the content transmitter apparatus 100 (S607). The device authentication processing portion 108 of the content receiver apparatus 300 now generates an authentication key common to the content transmitter apparatus 100 by using the necessary parameter.

The device authentication processing portion 108 of the content transmitter apparatus 100 receives the authentication response and transmits its receipt confirmation to the content receiver apparatus 300 (S608). It then generates an authentication key common to the content receiver apparatus 300 by using the necessary parameter, as with the content receiver apparatus.

In the procedure up to this point, the device authentication processing portion 108 of the content transmitter apparatus 100 and the device authentication processing portion 108 of the content receiver apparatus 300 generate and share the authentication key common to them.

Next, the content transmitter apparatus 100, to see whether the content receiver apparatus 300 is in the house or not, checks if the content receiver apparatus 300 is registered with the table of device information 5200 and if the in-house access counter value 5204 is set with a value. If the check finds that the in-house access counter value 5204 is not set with any value, the content transmitter apparatus 100 transmits a message to the content receiver apparatus 300, notifying that the content transmitter apparatus 100 will start a preparation for the in-house presence check (S609).

The device authentication processing portion 108 of the content receiver apparatus 300 receives the notification for in-house confirmation ready and transmits its receipt confirmation to the content transmitter apparatus 100 (S610). Then, it generates its own in-house confirmation ready notification before transmitting it to the content transmitter apparatus 100 (S611).

The device authentication processing portion 108 of the content transmitter apparatus 100 receives the in-house confirmation ready notification and transmits its receipt confirmation to the content receiver apparatus 300 (S612). Then it transmits an in-house confirmation setup request attached with necessary information for in-house presence check to the content receiver apparatus 300 (S613).

The device authentication processing portion 108 of the content receiver apparatus 300 receives the in-house confirmation setup request, performs a message authentication code generation operation based on data contained in the in-house confirmation setup request in preparation for in-house presence check, and transmits a receipt confirmation to the content transmitter apparatus 100 (S614).

After receiving the receipt confirmation, the device authentication processing portion 108 of the content transmitter apparatus 100 performs a message authentication code generation operation based on the data transmitted to the content receiver apparatus 300 at S613, starts the timer 1091 in the device information management portion 109 and, to check whether the content receiver apparatus 300 is in the house, transmits an in-house confirmation request including the message authentication code to the content receiver apparatus 300 (S615).

The device authentication processing portion 108 of the content receiver apparatus 300 receives the in-house confirmation request and transmits its receipt confirmation including the message authentication code generated at S614 to the content transmitter apparatus 100 (S616).

The device authentication processing portion 108 of the content transmitter apparatus 100, upon receiving the receipt confirmation, stops the timer 1091 to check that the measured time (T1) it took from when the in-house confirmation request was issued until the receipt confirmation was received is not in excess of the in-house presence check timeout value (T) 8201 in the in-house presence check threshold table 8200. It also checks whether the message authentication code contained in the received receipt confirmation is correct.

If the check finds that measured time (T1)≤in-house presence check timeout value (T) 8201 in the in-house presence check threshold table 8200 and if the received message authentication code is valid, then the device authentication processing portion 108 of the content transmitter apparatus 100 decides that the content receiver apparatus 300 exists in the house and within a range of personal use. It then transmits an in-house confirmation result to the content receiver apparatus 300 (S617).

If measured time (T1)>in-house presence check timeout value (T) 8201 in the in-house presence check threshold table 8200 or if the received message authentication code is not valid, the device authentication processing portion 108 of the content transmitter apparatus 100 decides that there is a possibility of the content receiver apparatus 300 existing outside the house or that the device is not an authorized one, thus suspending the operation at this point and aborting the device authentication processing. The device authentication processing portion 108 of the content receiver apparatus 300, upon receiving the in-house confirmation result for remote access, checks whether the message authentication code received at S615 is valid. If the code is found valid, the device authentication processing portion 108 transmits its receipt confirmation to the content transmitter apparatus 100 (S618).

The procedure from S609 to S618 represents the in-house presence check method for in-house access in the normal authentication. Here, the content receiver apparatus 300 is registered with the table of device information 5200. If the in-house access counter value 5204 is found to be set with a value, the in-house presence check is omitted.

If on the other hand the received message authentication code is not valid, the device authentication processing portion 108 of the content receiver apparatus 300 suspends the operation at this point, aborting the device authentication processing. Upon receiving the receipt confirmation, the device authentication processing portion 108 of the content transmitter apparatus 100 generates an exchange key, encrypts the exchange key by using the authentication key and transmits the encrypted exchange key along with an ID to identify the exchange key to the content receiver apparatus 300 (S619).

The device authentication processing portion 108 of the content receiver apparatus 300 decrypts the exchange key sent from the content transmitter apparatus 100 by using the authentication key and transmits its receipt confirmation (S620).

The device authentication processing portion 108 of the content transmitter apparatus 100, upon reception of the receipt confirmation, registers the information about the content receiver apparatus 300 with the table of device information 5200 in the device information management portion 109 (S621).

As shown in a record 5211 of ID5201 in the table of device information 5200, for example, the device ID of the content receiver apparatus 300 received at S601 is set in the device ID 5202; the IP address on the network of the content receiver apparatus 300 is set in the address information 5203; the maximum in-house access counter value 5103 in the management table 5100 is set in the in-house access counter value 5204; and "stop" is set in the access state 5206.

According to the procedure shown in FIG. 6, the device authentication processing portion 108 of the content transmitter apparatus 100 and the device authentication processing portion 108 of the content receiver apparatus 300 may share a common exchange key. The exchange key is used to generate a common key for encrypting and decrypting contents. It is possible to combine the step S609 and S613 into one step and also unify the step S617 and S619.

The procedure of FIG. 6 explains the in-house access device authentication processing executed between the content transmitter apparatus 100 and the content receiver apparatus 300 when content is delivered within the house.

The procedure of FIG. 6, when executed, allows the two communicating devices to mutually verify that they are normally authenticated devices and also to share a key for encryption and decryption of content.

FIG. 7 shows an remote registration processing executed between the content transmitter apparatus 100 and the mobile terminal (content receiver apparatus) 200 in the system configuration of FIG. 1. The remote access device is a device that accesses a device in the house from outside in order to view, copy and move copy-protected content. In FIG. 7, the mobile terminal (content receiver apparatus) 200 is the remote access device.

When this procedure is executed, it is assumed that the mobile terminal (content receiver apparatus) 200 is inside the user's house 1. The content transmitter apparatus 100 and the content receiver apparatus 200 monitor the TTL (Time To Live) of packets they receive, and discard those packets with their TTL values in excess of the in-house access limitation TTL value 8101 of the TTL table 8100 to block accesses to the user's house 1 from outside. For this purpose, the content transmitter apparatus 100 and the content receiver apparatus 200 set the TTL of the packets to be transmitted smaller than the in-house access limitation TTL value 8101 of the TTL table 8100.

First, the content transmitter apparatus 100 and the content receiver apparatus 200 executes the device authentication processing S600 explained in FIG. 6.

Then the device authentication processing portion 108 of the content receiver apparatus 200 prepares a remote registration request and transmits it to the content transmitter apparatus 100 (S701). The remote registration request may include random numbers generated using a predetermined calculation algorithm, the information unique to individual devices and a password that the user sets for making an access to the house from outside.

The device authentication processing portion 108 of the content transmitter apparatus 100 receives the remote registration request and confirms, from the remote access key 5205 of the table of device information 5200 and the value set in the remote access counter value 5207, that the number of devices registered as remote access devices is less than the maximum remote registration number 5102 of the management table 5100 (S720), before transmitting its receipt confirmation to the content receiver apparatus 200 (S702).

If the number of devices registered with the table of device information 5200 as the remote access devices has reached the maximum remote registration number 5102 in the management table 5100, the device authentication processing portion 108 suspends the operation. Next, to check if the content receiver apparatus 200 that has requested the remote access device registration is inside the house, the content transmitter apparatus 100 notifies the content receiver apparatus 200 that it will prepare for an in-house presence check for remote access device registration (S703).

The device authentication processing portion 108 of the content receiver apparatus 200, upon receiving the in-house confirmation ready for remote access notification for remote access device registration, transmits its receipt confirmation to the content transmitter apparatus 100 (S704). Then it generates its own in-house confirmation ready for remote access notification for remote access device registration and transmits it to the content transmitter apparatus 100 (S705).

Upon receiving the in-house confirmation ready for remote access notification for remote access device registration, the device authentication processing portion 108 of the content transmitter apparatus 100 transmits its receipt confirmation to the content receiver apparatus 200 (S706). It also transmits to the content receiver apparatus 200 an in-house confirmation setup for remote registration request for remote access device registration attached with information necessary for the in-house presence check for remote access device registration (S707).

The device authentication processing portion 108 of the content receiver apparatus 200, upon reception of the in-house confirmation setup for remote registration request for remote access device registration, initiates a preparation for the in-house presence check, i.e., performs a message authentication code generation operation based on the data contained in the in-house confirmation setup for remote registration request for remote access device registration, before transmitting a receipt confirmation to the content transmitter apparatus 100 (S708).

The device authentication processing portion 108 of the content transmitter apparatus 100, upon receiving the receipt confirmation, initiates the message authentication code generation operation based on the data transmitted to the content receiver apparatus 200 at S707. It then starts the timer 1091 in the device information management portion 109 and, to check whether the content receiver apparatus 200 is in the house, transmits an in-house confirmation request containing the message authentication code to the content receiver apparatus 200 (S709).

The device authentication processing portion 108 of the content receiver apparatus 200, upon receiving the in-house confirmation request for remote access device registration, transmits its receipt confirmation including the message authentication code generated at S708 to the content transmitter apparatus 100 (S710).

The device authentication processing portion 108 of the content transmitter apparatus 100, upon receiving the receipt confirmation, stops the timer 1091 to check that the measured time (T2) it took from when the in-house confirmation request for remote access device registration was issued until the receipt confirmation was received is not in excess of the in-house presence check timeout value (T') for remote access device registration 8202 in the in-house presence check threshold table 8200. Setting the in-house presence check timeout value (T') for remote access device registration 8202 smaller than the in-house presence check timeout value (T) 8201 allows for stricter in-house presence check on the remote access devices during the authentication process. The device authentication processing portion 108 of the content transmitter apparatus 100 also checks whether the message authentication code contained in the received receipt confirmation is correct.

If the check finds that measured time (T2)≤in-house presence check timeout value (T') for remote access device registration 8202 in the in-house presence check threshold table 8200 and if the received message authentication code is valid, then the device authentication processing portion 108 of the content transmitter apparatus 100 decides that the content receiver apparatus 200 exists in the house and within a range of personal use. It then transmits an in-house confirmation result for remote access to the content receiver apparatus 200 (S711).

If measured time (T2)>in-house presence check timeout value (T') for remote access device registration 8202 in the in-house presence check threshold table 8200 or if the received message authentication code is not valid, the device authentication processing portion 108 of the content transmitter apparatus 100 decides that there is a possibility of the content receiver apparatus 200 existing outside the house or that the device is not an authorized one, thus suspending the operation at this point and aborting the device authentication processing. The device authentication processing portion 108 of the content receiver apparatus 200, upon receiving the in-house confirmation result, checks whether the message authentication code received at S709 is valid. If so, it transmits its receipt confirmation to the content transmitter apparatus 100 (S712). The procedure from S703 to S712 represents the in-house presence check method for remote access device registration.

If on the other hand the received message authentication code is not valid, the device authentication processing portion 108 of the content receiver apparatus 200 suspends the operation at this point, aborting the device authentication processing. Upon receiving the receipt confirmation, the device authentication processing portion 108 of the content transmitter apparatus 100 generates a remote access key to be used for the device authentication and content encryption when accessing content from outside the house. It then encrypts the remote access key by using the authentication key for the remote registration processing S700 of FIG. 7 and transmits the encrypted remote access key to the content receiver apparatus 200 (S713).

The device authentication processing portion 108 of the content receiver apparatus 200 decrypts the remote access key sent from the content transmitter apparatus 100 by using the authentication key and transmits its receipt confirmation to the content receiver apparatus 200 (S714).

The device authentication processing portion 108 of the content transmitter apparatus 100, upon receiving the receipt confirmation, registers information on the content receiver apparatus 200 with the table of device information 5200 in the device information management portion 109 (S715).

For example, as shown in a record 5212 whose ID 5201 value in the table of device information 5200 is 2, the device authentication processing portion 108 of the content transmitter apparatus 100 sets the device ID of the content receiver apparatus 200 it received at S601 in the device ID 5202; sets the MAC address on the network of the content receiver apparatus 200 in the address information 5203; sets the maximum in-house access counter value 5103 of the management table 5100 in the in-house access counter value 5204; and registers the remote access key generated at 5713 with the remote access key 5205.

Further, "stop" is set in the access state 5206; and in the remote access counter value 5207, the maximum remote access counter value 5104 of the management table 5100 is set. On the other hand, the device authentication processing portion 108 of the content receiver apparatus 200 generates or updates a table of device information for remote access 60000 stored in the device information management portion 109 (S716).

By performing steps from S701 to S714 in addition to the device authentication processing S600, the device authentication processing portion 108 of the content transmitter apparatus 100 and the device authentication processing portion 108 of the content receiver apparatus 200 can share the common remote access key with those devices that have cleared the in-house presence check for remote access device registration, as well as sharing the common exchange key with those devices that have cleared the in-house access device authentication.

To simplify the procedure, as an in-house presence check for the remote access device registration, the same in-house presence check as used in the normal device authentication processing S600 of FIG. 6 may be used.

The exchange key is used to generate a common key to encrypt/decrypt content that is delivered and received inside the house. The remote access key is used for the device authentication and content encryption when accessing content from outside the house. Execution of step S715 allows those devices, which have successfully cleared the in-house presence check for remote access device registration and thus are sharing the remote access key, to be registered with the content transmitter apparatus 100. This in turn allows for a connection control which rejects, for example, a connection of an access made by an unregistered device from outside the house.

Here, to simplify the procedure, a device may be registered with the content transmitter apparatus 100 without exchanging the remote access key. Even with this simple step, a control may be done to permit a connection from only those devices that have already been registered in advance.

The procedure of FIG. 7 explains the remote registration processing S700 executed, prior to transmitting content to a device outside the house, by the content transmitter apparatus 100 and the content receiver apparatus 200 to share the remote access key between them and register the content receiver apparatus 200 with the content transmitter apparatus 100.

FIG. 8 shows an example of the table of device information for remote access 60000.

The table of device information for remote access 60000 comprises an ID 60001, a connection destination address information 60002, registration information 60003 and a remote access key 60004.

The ID 60001 represents a registration number of the table.

The address information 60002 represents an IP address and a MAC address of each device on the network.

The registration information 60003 represents a user name and a password required by the content receiver apparatus 200 when it logs in from outside the house to the content transmitter apparatus 100 and the router 12.

The remote access key 60004 represents remote access key information received at S714.

Executing the procedure shown in FIG. 6 and FIG. 7 allows the devices, only if they have successfully verified themselves to be authorized devices and exist in the house, to share the key used for encryption and decryption of content during in-house accesses and at the same time share the remote access key used for device authentication and content encryption during remote accesses. This in turn allows devices making in-house or remote accesses to be registered simultaneously with the content transmitter apparatus.

Further, different in-house presence check methods may be used in the normal authentication operation and in the remote access device registration so as to be able to impose desired access limitations depending on individual circumstances, as by requesting a shorter in-house presence check response time to more precisely confirm the device location as being inside the house. Furthermore, the use of the management table and the table of device information shown in FIG. 5 allows the in-house accesses and the remote accesses to be managed in different ways, imposing desired limitations on individual accesses.

The device authentication defined by steps S601 to S608 instead of steps S701 to S702 may be performed to share another authentication key, which may be used to encrypt the remote access key and transmit it to the content receiver apparatus 200. It is also possible to provide a time in which the content transmitter apparatus 100 can accept the authentication request for remote access and to require the content receiver apparatus 200 to issue the authentication request for remote access within a predetermined time (for example, 24 hours).

The procedure defined by the steps S701 to S712 may be performed immediately before S619 in the normal device authentication processing S600. In that case, steps S713 to S716 may be executed after the step S620, or the steps S619 and S713 combined into one.

Figure 9:
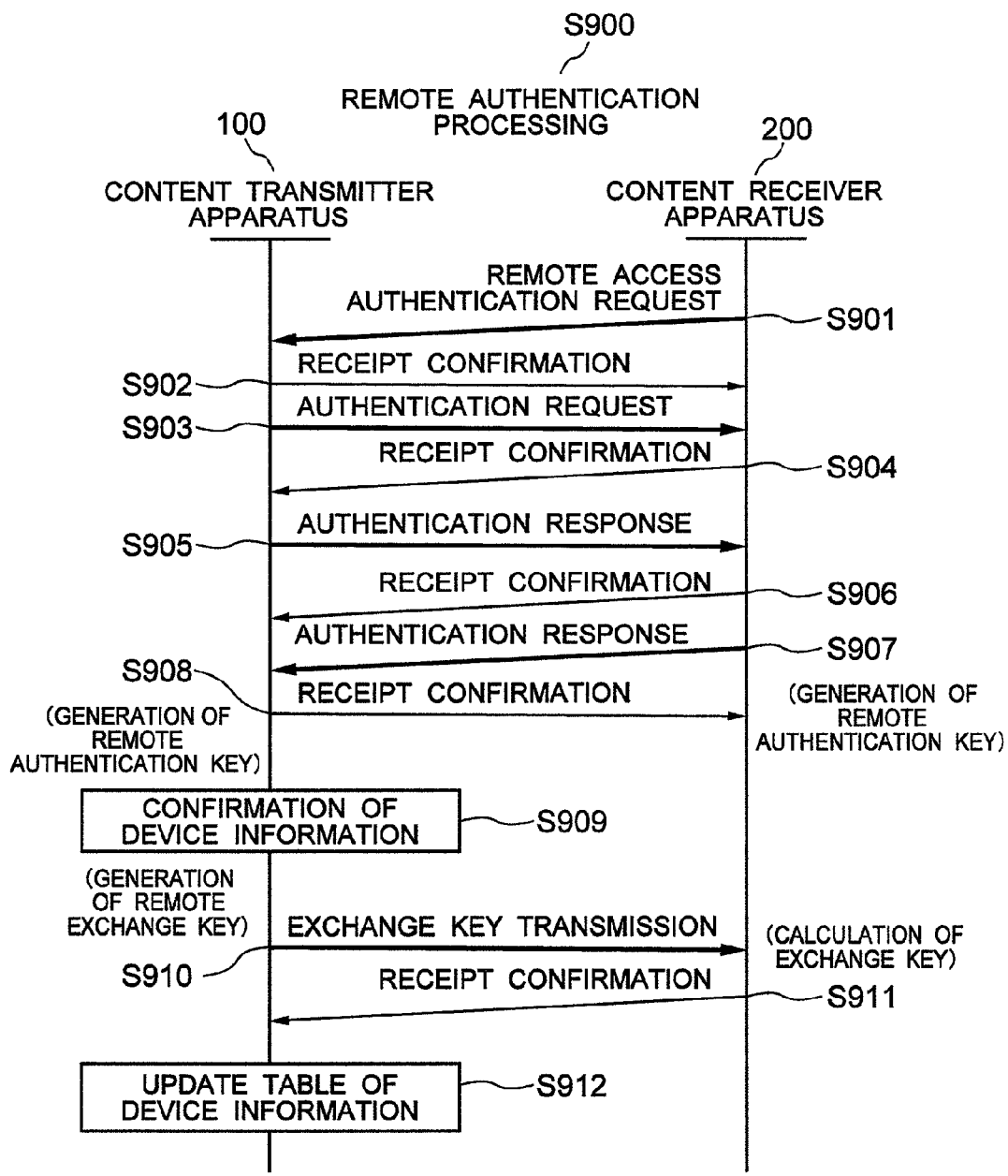
FIG. 9 is an explanatory diagram showing an example of a remote access device authentication sequence executed between the content receiver apparatus and the content transmitter apparatus.

FIG. 9 shows a device authentication processing for remote access that is performed between the content transmitter apparatus 100 and the content receiver apparatus 200 in the system configuration shown in FIG. 1 in order to view on or copy or move into the mobile terminal (content receiver apparatus) 200 outside the house the copy-protected content which has been entered into or accumulated in the content transmitter apparatus 100. It is assumed that the mobile terminal (content receiver apparatus) 200 is outside the house when this procedure is executed.

Here, the content transmitter apparatus 100 and the content receiver apparatus 200 do not monitor the TTL of the packets being received. To allow the packets to stream from a visited place 2 to the user house 1 through the Internet, the content transmitter apparatus 100 and the content receiver apparatus 200 sets the TTL of the packets to be transmitted not below the in-house access limitation TTL value 8101 of the TTL table 8100 but to the remote transmission TTL set value 8102 of the TTL table 8100. The remote transmission TTL set value 8102 is greater than the in-house access limitation TTL value 8101.

First, the device authentication processing portion 108 of the content receiver apparatus 200 prepares a remote access authentication request. It attaches to the request the device's unique information including the device ID, the remote access key or the calculated value generated by using the key, and a certificate before transmitting them to the content transmitter apparatus 100 (S901).

The device authentication processing portion 108 of the content transmitter apparatus 100, upon receiving the remote access authentication request, checks that the device ID of the content receiver apparatus 200 is registered with the table of device information 5200 managed within the device information management portion 109 and that the number of records in the table of device information 5200 whose access state 5206 is "remote" is smaller than the value of the maximum remote access number 5106 in the management table 5100. Then the device authentication processing portion 108 transmits its receipt confirmation to the content receiver apparatus 200 (S902).

If the device ID of the content receiver apparatus 200 is not registered with the table of device information 5200 or if the number of records in the table of device information 5200 whose access state 5206 is "remote" is equal to the value of the maximum remote access number 5106 in the management table 5100, the content transmitter apparatus 100 aborts the subsequent steps.

Next, the device authentication processing portion 108 of the content transmitter apparatus 100 prepares its own remote access authentication request. As with the case of the content receiver apparatus 200, the device authentication processing portion 108 attaches to the request the device's unique information, the remote access key or the calculated value generated by using the key, and a certificate before transmitting them to the content receiver apparatus 200 (S903).

The device authentication processing portion 108 of the content receiver apparatus 200 receives the remote access authentication request and transmits its receipt confirmation to the content transmitter apparatus 100 (S904).

Next, the device authentication processing portion 108 of the content transmitter apparatus 100 checks the information received as a result of the remote access authentication request and transmits to the content receiver apparatus 200 a remote access authentication response for remote access attached with the remote access key or the calculated value generated by using the key and with parameters necessary to generate the key information (S905).

The device authentication processing portion 108 of the content receiver apparatus 200, upon receiving the remote access authentication response for remote access, transmits its receipt confirmation to the content transmitter apparatus 100 (S906). Then it prepares its own remote access authentication response for remote access and, as with the content transmitter apparatus, transmits the remote access authentication response for remote access attached with parameters necessary to generate key information (S907). It then creates a remote access authentication key common to the content transmitter apparatus 100 by using the necessary parameters.

The device authentication processing portion 108 of the content transmitter apparatus 100, upon receiving the remote access authentication response for remote access, transmits its receipt confirmation to the content receiver apparatus 200 and, as with the content receiver apparatus, creates an authentication key common to the content receiver apparatus 200 by using the necessary parameters (S908).

In the procedure up to this point, the device authentication processing portion 108 of the content transmitter apparatus 100 and the device authentication processing portion 108 of the content receiver apparatus 200 have created and share the common authentication key.

Then, the content receiver apparatus 200 is registered with the table of device information 5200 and a checks is made to confirm that the remote access counter value 5207 of the content receiver apparatus 200 is not 0 (S909). After this, the device authentication processing portion 108 of the content transmitter apparatus 100 creates a remote exchange key to be used for encrypting the content, encrypts the remote exchange key using the remote access authentication key and transmits the encrypted remote exchange key together with its ID to the content receiver apparatus 200 (S910).

The device authentication processing portion 108 of the content receiver apparatus 200 decrypts the remote exchange key sent from the content transmitter apparatus 100 by using the remote access authentication key and transmits a receipt confirmation (S911).

The device authentication processing portion 108 of the content transmitter apparatus 100, upon receiving the receipt confirmation, updates information of the content receiver apparatus 200 on the table of device information 5200 inside the device information management portion 109 (S912). More specifically, it updates the access state 5206 from "stop" to "from out of house".

The above sequence of steps has explained the device authentication processing executed between the content transmitter apparatus 100 and the content receiver apparatus 200 to deliver content from inside the house to the outside.

With the above procedure executed, the two devices can confirm that they are authorized devices and share the key used to encrypt and decrypt the content when transmitting it to the outside of house.

Figure 10:
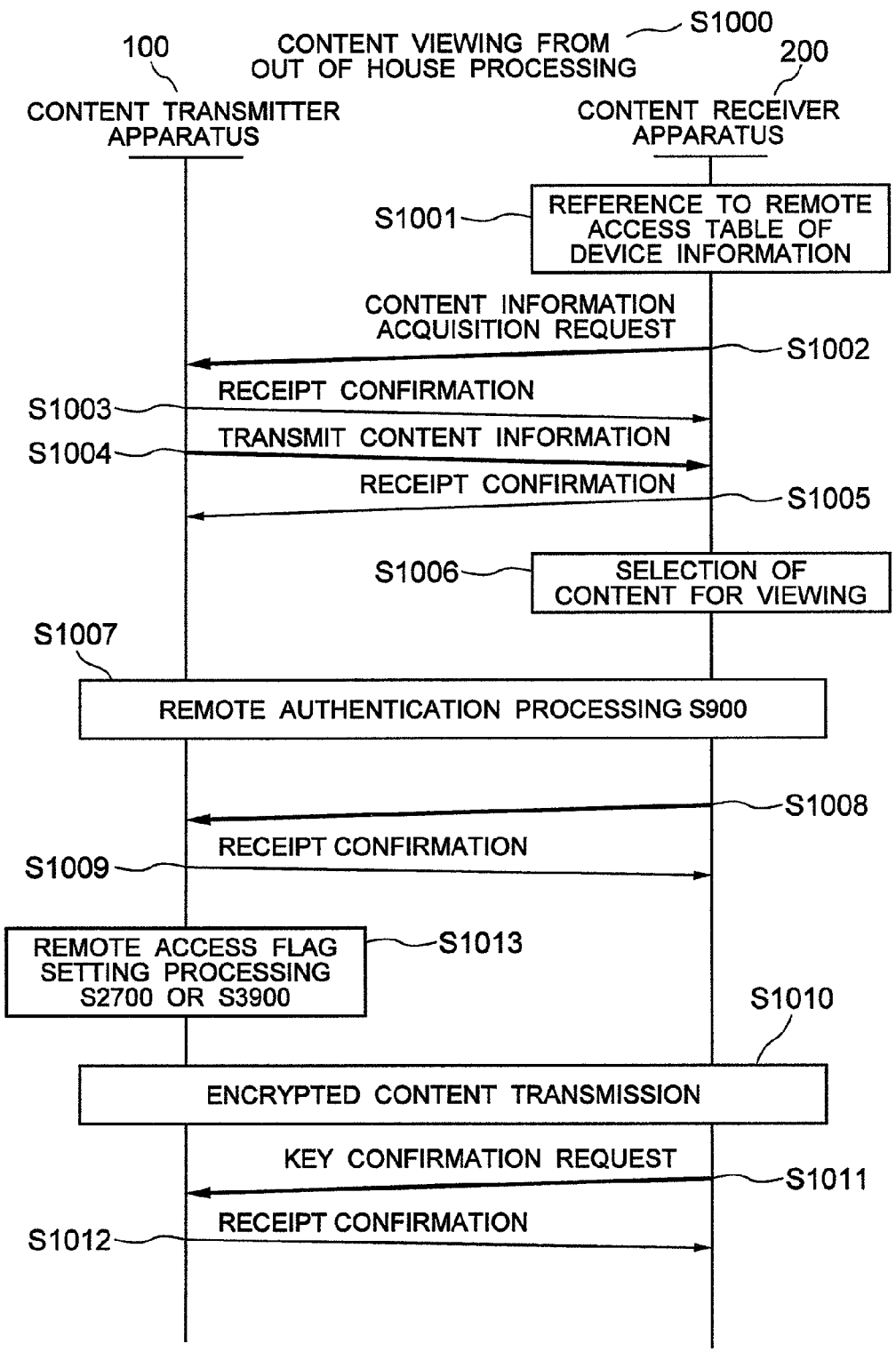
FIG. 10 is an explanatory diagram showing an example of a content viewing remote sequence executed between the content receiver apparatus and the content transmitter apparatus.

FIG. 10 shows a sequence of steps performed in the system configuration of FIG. 1 when a mobile terminal (content receiver apparatus) 200 is taken out of house and the user at a visited place 2 views broadcast programs entered through a tuner 101 into the content transmitter apparatus 100 or content accumulated in the recording portion 111.

First, the user using the input processing portion 107 of the content receiver apparatus 200 specifies a content viewing. Then, the controller 115 of the content receiver apparatus 200 displays a list of content transmitter apparatus on the display/speaker 105. On the content transmitter apparatus list is shown the content transmitter apparatus 100, the device registered with the table of device information for remote access 60000 (S1001).

Here the content receiver apparatus 200 may detect devices on the network and display them on the content transmitter apparatus list. One of the methods for detecting content transmitter apparatus on the network may involve, for example, multicasting UDP packets containing a "request for detecting devices with a content transmission function" to allow only those devices with this function to return their responses and recognizing them as the content transmitter apparatus. Another method may recognize content transmitter apparatus by receiving a network participation notification from the content transmitter apparatus connected to the network.

Next, when the user selects the content transmitter apparatus 100 from the displayed content transmitter apparatus list, the controller 115 of the content receiver apparatus 200 refers to the address information of the content transmitter apparatus 100 registered with the table of device information for remote access 60000 and transmits a content information acquisition request from the wireless communication processing portion 203 via the wireless access point 22 and the router 12 at the visited place 2 to the content transmitter apparatus 100 in the user's house 1 (S1002).

Here, rather than displaying the content transmitter apparatus list, the user may enter the address information of the content transmitter apparatus 100 through the input processing portion 107 to cause the content receiver apparatus 200 to access the content transmitter apparatus 100 based on the information entered.

The controller 115 of the content transmitter apparatus 100 transmits its receipt confirmation through the communication processing portion 113 to the content receiver apparatus 200 (S1003) and also transmits information on a part or all of the content stored in the recording portion 111 (e.g., title, date, copy control information and recorded time) to the content receiver apparatus 200 (S1004).

The controller 115 of the content receiver apparatus 200 transmits a receipt confirmation to the content transmitter apparatus 100 (S1005) and displays the received content information as a content list on the display/speaker 105. The user specifies from the content list the content he or she wants to view (S1006). In response to the user's selection, the device authentication processing portion 108 of the content receiver apparatus 200 performs the remote authentication processing S900 between it and the device authentication processing portion 108 of the content transmitter apparatus 100 (S1007).

After this, the controller 115 of the content receiver apparatus 200 transmits a desired content viewing request to the content transmitter apparatus 100 (S1008).

The viewing request may be attached with an ID to identify the remote exchange key received by the remote authentication processing S900.

The controller 115 of the content transmitter apparatus 100 returns a receipt confirmation in response to the content viewing request (S1009) and subsequently executes a remote access flag setting operation S2700 or S3900 (S1013). The remote access flag setting operation will be described later. Then, the controller 115 transmits the content encrypted by the encryption/decryption processing portion 112 using the key shared at S900 to the content receiver apparatus 200. As a method for managing in-house accesses and remote accesses separately and imposing different limitations on the in-house and remote accesses by using the management table and the table of device information of FIG. 5, it is possible to return a response that rejects the content viewing request depending on the access state in the table of device information 5200.

Once the content has begun to be transmitted, the device authentication processing portion 108 of the content receiver apparatus 200 transmits a key confirmation request at a desired timing to the content transmitter apparatus 100 (S1011). The device authentication processing portion 108 of the content transmitter apparatus 100, upon receiving the key confirmation request, transmits its receipt confirmation to the content receiver apparatus 200 depending on the result of confirmation (S1012).

The device authentication processing portion 108 checks whether the identifier ID of the remote exchange key is valid. The device information updating portion 1092 sets and starts the timer 1091 in the device information management portion 109 so that notifications are issued periodically (e.g., at intervals of 1 or 10 minutes). The device authentication processing portion 108 uses the remote exchange key to generate a common key for encrypting the content and sets the common key in the encryption/decryption processing portion 112.

Figure 17:
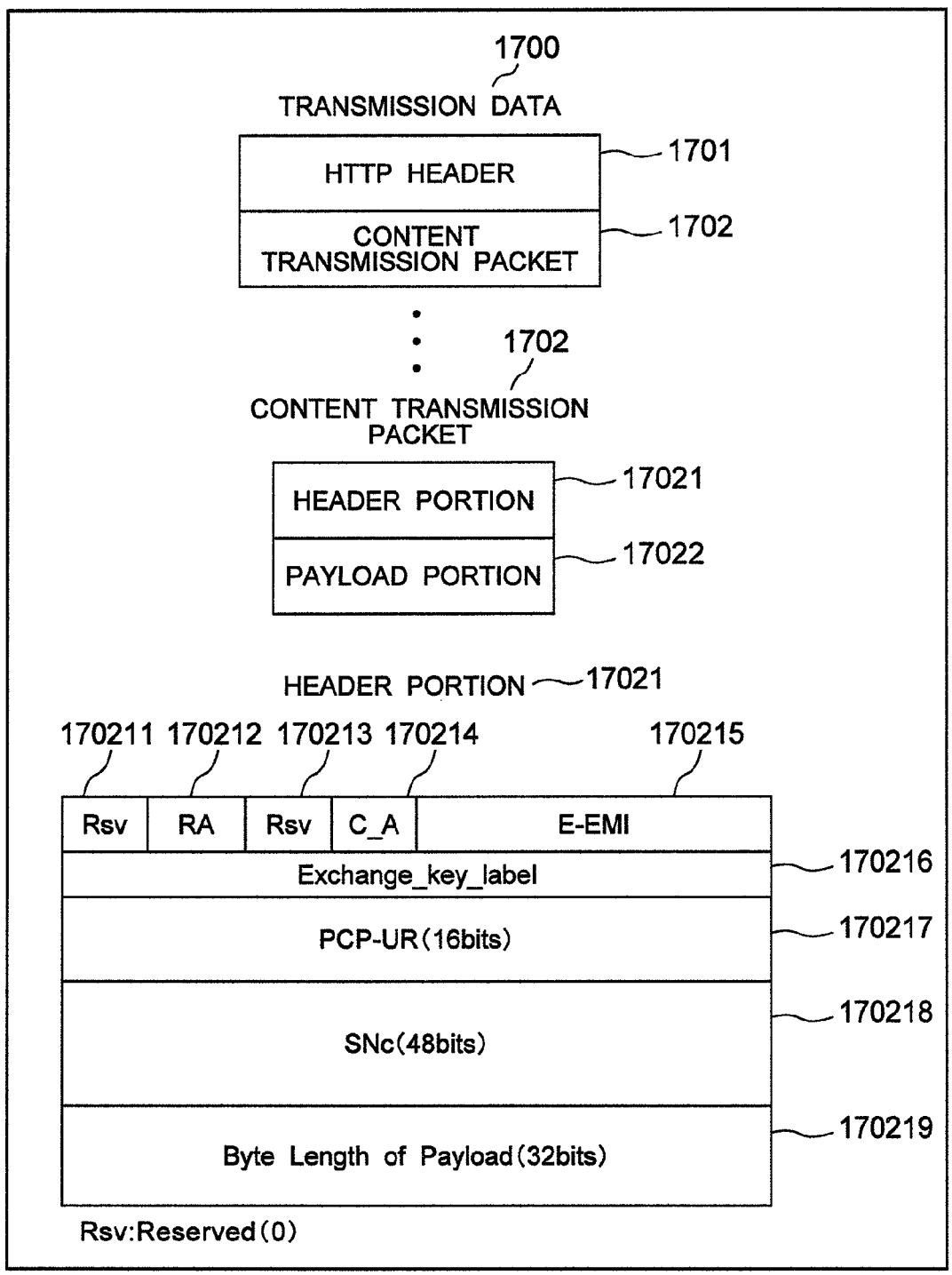
FIG. 17 is an explanatory diagram showing example data when the content is delivered using a HTTP protocol in the content viewing remote sequence executed between the content receiver apparatus and the content transmitter apparatus.

Then as it encrypts the requested content read from the recording portion 111 by the encryption/decryption processing portion 112, the device authentication processing portion 108 transmits the encrypted content in a format shown in FIG. 17 to the content receiver apparatus 200 (S1010). Here, each time a notification comes from the timer 1091 during the transmission of content, the device information updating portion 1092 updates the remote access counter value 5207 in the table of device information 5000 (for example, decrements the counter value). When the remote access counter value 5207 reaches 0, the associated device information in the table of device information 5000 is deleted.

If the in-house access counter value 5204 is also registered but not 0, only the information on the remote access key 5205 is eliminated. While an example of only the remote access counter value 5207 being updated has been described, the in-house access counter value 5204 may also be updated at the same time, allowing the similar management to be performed on the receiving devices both inside and outside house.

The device authentication processing portion 108 of the content receiver apparatus 200 uses the remote exchange key to create a common key for decrypting the content and sets the common key in the encryption/decryption processing portion 112. Then, as for the data received through the wireless communication processing portion 203 and the wireless encryption/decryption processing portion 202, the encryption/decryption processing portion 112 extracts the encrypted content from the payload of the format shown in FIG. 17 and decrypts it. The decrypted content is then decoded by the decoder 104 and output to the display/speaker 105.

As described above, content can be delivered from a content transmitter apparatus inside house to a content receiver apparatus outside house if the content transmitter apparatus and the content receiver apparatus are subjected to the remote registration processing S700 in house in advance, followed by the content receiver apparatus that has successfully been authenticated being taken out of house, followed by the remote authentication processing S900 being successfully performed.

FIG. 17 shows an example of data when content is transmitted using the HTTP protocol in an encrypted content transmission operation S1010 in a content viewing from out of house processing S1000. While the TCP is used as the transport layer protocol, the TCP header is omitted in the figure.

The transmission data 1700 used in transmitting content using the HTTP protocol comprises an HTTP header 1701 and a content transmission packet 1702.

The content transmission packet 1702 is made up of a header part 17021 and a payload part 17022.

The header part 17021 comprises reserved areas (Reserved) 170211 and 170213, a remote access flag (RA) 170212, an encryption method (C_A) 170214, an encryption mode (E-EMI) 170215, an exchange key label (Exchange_Key_Label) 170216, an usage rule (PCP-UR) 170217, a random number (SNc) 170218, and a payload size (Byte Length of Payload) 170219.

The Reserved 170211 and 170213 are reserved areas, in each of which 0 is set.

The remote access flag (RA) 170212 indicates whether the retransmission of content in the payload part is permitted or not. If the retransmission is allowed, the flag is set to 1. If not, it is set to 0. This lag has normally been set to 0 when content is delivered to a receiving device in house. So, when content is delivered to the existing receiving device which cannot transmit it to the outside of house, this flag is set to 0 as the content is delivered. This allows the receiving device to decrypt and play back the content in the same way as it has conventionally been doing.

Since this flag is set to 0 also when the content is delivered from the existing receiving device to another in-house receiving device capable of retransmitting it to the outside of house, a control can be made to block even the retransmittable receiving device from retransmitting the content to the outside of house.

The retransmission to the outside of house means that content delivered from a device in a user's house 1 to a device at a visited place 2, for example, is transmitted again from the visited place 2 to a second house 4 of the user. The remote access flag (RA) 170212 is set with a value that has been determined by the remote access flag setting operation S2700 or S3900 of FIG. 10.

The encryption method (C_A) 170214 indicates a method of encrypting the payload part. For example, it shows that the payload part is encrypted by AES of a 128-bit key length.

The encryption mode (E-EMI) 170215 represents an encryption mode of the payload part and is used in combination with the usage rule (PCP-UR) 170217 and the random number (SNc) 170218 to calculate the content key.

The exchange key label (Exchange_Key_Label) 170216 is set with a label identifying the key that was exchanged in the device authentication processing S600.

The usage rule (PCP-UR) 170217 represents copy control information of the payload part and comprises a copy control information mode (UR Mode) indicating the kind of copy control information; a content type (Content Type) indicating the kind of payload part; APS for limiting an analog output; and ICT for limiting a resolution.

The payload size (Byte Length of Payload) 170219 sets the size of the payload part 17022. The payload part 17022 is comprised of encrypted content.

The content transmission packet 1702 may be attached with a remote access flag (RA) to indicate whether the content being transmitted can be accessed from out of house. The remote access flag (RA) 170212, when added to the header part 17021, allows the receiving device to determine, before decoding, whether the content can be accessed from out of house.

Also when transmitting content using the RTP protocol, for example, the use of the RTP header in place of the HTTP header 1701 enables the content to be transmitted in the similar configuration to that of FIG. 17. Alternatively, both the RTP header and the content transmission packet 1702 may be included in every RTP packet to allow for reliable transmission of the copy control information including the remote access flag (RA) 170212.

Another arrangement may also be made in which, when the content transmission is completed, the content transmitter apparatus stops the timer 1091 and discards the remote exchange key so that, even if the content receiver apparatus subsequently issues another content viewing request, the content transmission will not be carried out unless the authentication procedure dedicated for remote access device is executed again.

The content transmitter apparatus can limit the number of content receiver apparatus that can access from outside the house by using the maximum remote access number 5106 in the management table 5100.

In the above step S1008, the content transmitter apparatus 100 receives a content "viewing request". If it receives other requests from out of house, such as "copy request" or "move request", the content transmitter apparatus 100 may reject these requests in order to avoid unauthorized use of content as much as possible. Here, the protocol used in transmitting content from the content transmitter apparatus 100 to the content receiver apparatus 200 is not limited to any particular one. In addition to HTTP and RTP, the RTP may also be used.

Using the device information shown in FIG. 5 and the procedure shown in FIG. 7, the content receiver apparatus seeking to access a device in house from outside carries out the normal device authentication operation and the remote access device authentication operation between it and the content transmitter apparatus beforehand in the house. The content receiver apparatus then shares a remote access key with only the content transmitter apparatus that has successfully passed the in-house presence check which is different from the normal device authentication operation. At the same time the content receiver apparatus has its information registered with the table of device information in the content transmitter apparatus.

With the above steps taken, the content receiver apparatus can be regarded as a device personally owned by the user, so that if it is taken out of house, the user using the content receiver apparatus can safely view the content without exceeding the range of personal use by following the procedures shown in FIG. 9 and FIG. 10.

[Embodiment 2]

In the preceding embodiment 1, the remote registration processing S700 is executed simultaneously with the in-house access device authentication processing S600. In this embodiment, an example case will be explained in which an in-house presence check, different from the in-house access device authentication, is performed and at the same time only the remote access device registration operation is executed to shorten the time required for the device authentication.

Figure 11:
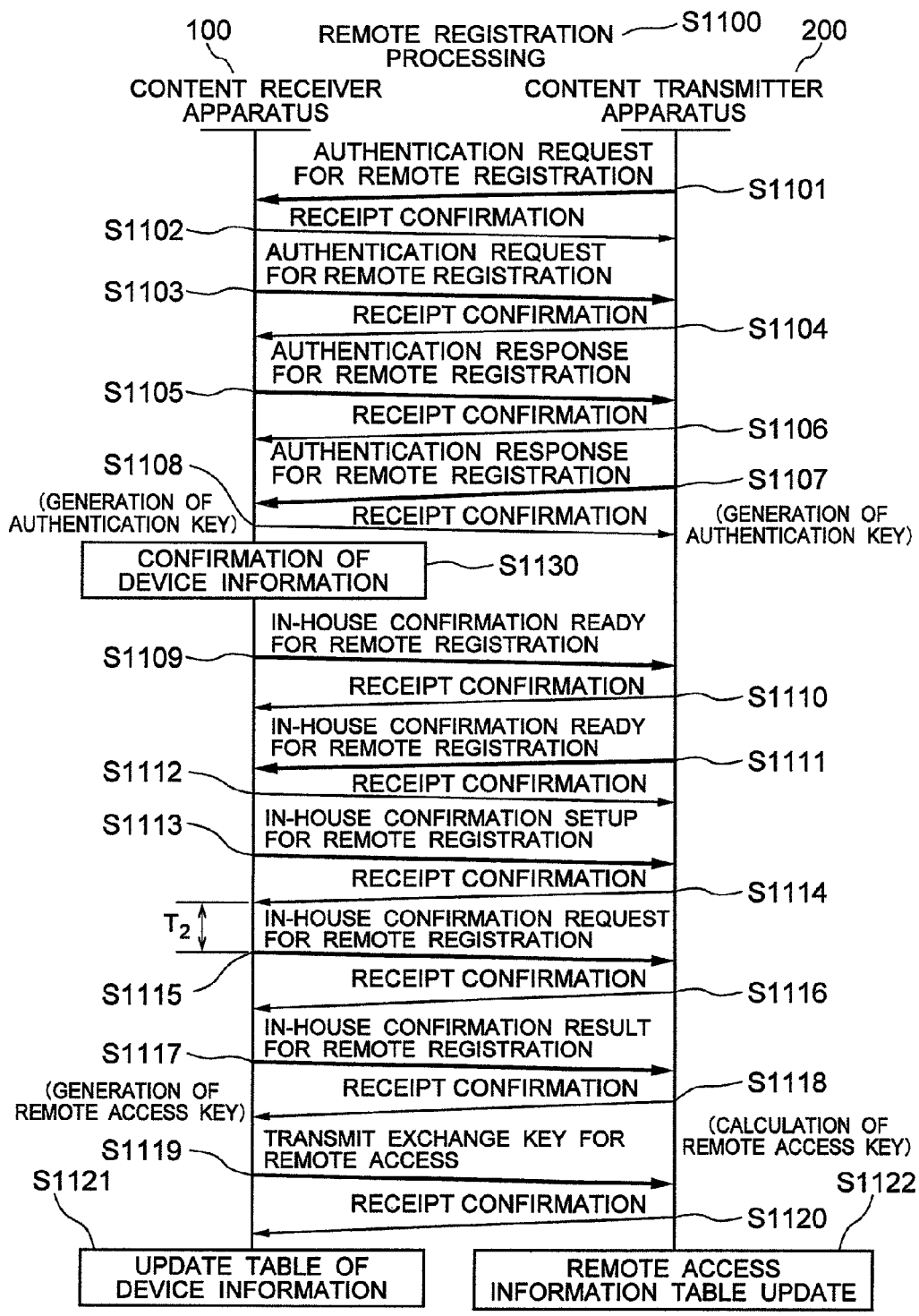
FIG. 11 is an explanatory diagram showing an example of a remote access device registration sequence executed between the content receiver apparatus and the content transmitter apparatus.

FIG. 11 shows a remote registration processing S1100 that is performed inside house in advance between the content transmitter apparatus 100 and the content receiver apparatus 200 in the system configuration shown in FIG. 1 in order to view or copy or move into the mobile terminal (content receiver apparatus) 200 located outside house the copy-protected content that has been entered into or accumulated in the content transmitter apparatus 100. It is assumed that during the execution of this procedure, the mobile terminal (content receiver apparatus) 200 is inside the user house 1.

The content transmitter apparatus 100 and the content receiver apparatus 200 also monitor the TTL (Time To Live) of the packets as they are received, and discard those packets whose TTL value exceeds the in-house access limitation TTL value 8101 of the TTL table 8100 to block accesses from outside the user house 1. For this purpose, the content transmitter apparatus 100 and the content receiver apparatus 200 set the TTL of the packets they are going to transmit below the in-house access limitation TTL value 8101 of the TTL table 8100.

First, the content receiver apparatus 200 prepares an authentication request for remote registration device registration. The device authentication processing portion 108 of the content receiver apparatus 200 attaches the device's unique information including the device ID and a certificate for the information to the authentication request before transmitting it to the content transmitter apparatus 100 via the communication processing portion 113 (S1101).

The device authentication processing portion 108 of the content transmitter apparatus 100, upon receiving the authentication request for remote registration device registration via the communication processing portion 113, returns its receipt confirmation to the content receiver apparatus 200 (S1102). The device authentication processing portion 108 of the content transmitter apparatus 100 then prepares its own authentication request for remote registration device registration and, as with the content receiver apparatus, attaches unique information of the content transmitter apparatus 100 and its certificate to the authentication request for remote registration before transmitting it to the content receiver apparatus 200 (S1103).

The device authentication processing portion 108 of the content receiver apparatus 200, upon receiving the authentication request for remote registration for the remote access device registration, returns a receipt confirmation to the content transmitter apparatus 100 (S1104).

Next, the device authentication processing portion 108 of the content transmitter apparatus 100 examines the information received as a result of its authentication request for remote registration and transmits an authentication response for remote access attached with parameters necessary for the generation of key information to the content receiver apparatus 200 (S1105).

The device authentication processing portion 108 of the content receiver apparatus 200, upon receiving the authentication response, returns a receipt confirmation to the content transmitter apparatus 100 (S1106). Then it prepares its own authentication response and, as with the content transmitter apparatus, transmits the authentication response attached with parameters necessary to generate key information to the content transmitter apparatus 100 (S1107). Then, using the necessary parameters, the device authentication processing portion 108 of the content receiver apparatus 200 generates an authentication key common to the content transmitter apparatus 100.

The device authentication processing portion 108 of the content transmitter apparatus 100, upon receiving the authentication response, returns a receipt confirmation to the content receiver apparatus 200 (S1108) and, as with the content receiver apparatus, generates an authentication key common to the content receiver apparatus 200 by using the necessary parameters.

In the procedure up to this point, the device authentication processing portion 108 of the content transmitter apparatus 100 and the device authentication processing portion 108 of the content receiver apparatus 200 generate and share the common authentication key. Next, using the remote access key 5205 of the table of device information 5200 and the value set in the remote access counter value 5207, the device authentication processing portion 108 of the content transmitter apparatus 100 checks that the number of devices registered as the remote access devices is less than the maximum remote registration number 5102 in the management table 5100 (S1130). To confirm that the content receiver apparatus 200 is inside the house, the device authentication processing portion 108 of the content transmitter apparatus 100 transmits to the content receiver apparatus 200 a notification that it starts preparing for an in-house presence check for remote access device registration (S1109). If it is found that the number of devices registered as the remote access devices in the table of device information 5200 has reached the maximum remote registration number 5102 in the management table 5100, the procedure is aborted.

The device authentication processing portion 108 of the content receiver apparatus 200, upon receiving the notification of the in-house presence check for remote access device registration, transmits a receipt confirmation to the content transmitter apparatus 100 (S1110). Then it creates a notification of an in-house presence check for remote access device registration and transmits it to the content transmitter apparatus 100 (S1111).

The device authentication processing portion 108 of the content transmitter apparatus 100, upon receiving the notification of the in-house presence check for remote access device registration, transmits a receipt confirmation to the content receiver apparatus 200 (S1112). It then transmits to the content receiver apparatus 200 an in-house confirmation setup for remote registration request for remote access device registration, attached with information necessary for the in-house presence check (S1113).

The device authentication processing portion 108 of the content receiver apparatus 200 receives the in-house confirmation setup for remote registration request for remote access device registration and, to prepare for the in-house presence check, performs a message authentication code generation operation based on the data contained in the in-house confirmation setup for remote registration request, before transmitting a receipt confirmation to the content transmitter apparatus 100 (S1114).

Upon receiving the receipt confirmation, the device authentication processing portion 108 of the content transmitter apparatus 100 performs a message authentication code generation operation based on the data it transmitted to the content receiver apparatus 200 at step S1113. It then starts the timer 1091 in the device information management portion 109 and, to check whether the content receiver apparatus 200 is inside the house, transmits an in-house confirmation request including the message authentication code to the content receiver apparatus 200 (S1115).

The device authentication processing portion 108 of the content receiver apparatus 200, upon receiving the in-house confirmation request for remote access device registration, transmits to the content transmitter apparatus 100 a receipt confirmation including the message authentication code generated by S1114 (S1116).

The device authentication processing portion 108 of the content transmitter apparatus 100, upon receiving the receipt confirmation, stops the timer 1091 and checks that the measured time (T2) it took from when the in-house confirmation request for remote access device registration was issued until the receipt confirmation was received is not in excess of the in-house presence check timeout value (T') for remote access device registration 8202 of the in-house presence check threshold table 8200. Setting the in-house presence check timeout value (T') for remote access device registration 8202 smaller than the in-house presence check timeout value (T) 8201 allows a stricter in-house presence check to be executed on those devices that makes remote access in the authentication operation. The device authentication processing portion 108 of the content transmitter apparatus 100 also checks whether the message authentication code contained in the received receipt confirmation is correct.

If the check finds that measured time (T2)≤in-house presence check timeout value (T') for remote access device registration 8202 in the in-house presence check threshold table 8200 and if the received message authentication code is valid, then the device authentication processing portion 108 of the content transmitter apparatus 100 decides that the content receiver apparatus 200 exists in the house and within a range of personal use. It then transmits an in-house confirmation result for remote access to the content receiver apparatus 200 (S1117).

If measured time (T2)>in-house presence check timeout value (T') for remote access device registration 8202 in the in-house presence check threshold table 8200 or if the received message authentication code is not valid, the device authentication processing portion 108 of the content transmitter apparatus 100 decides that there is a possibility of the content receiver apparatus 200 existing outside the house or that the device is not an authorized one, thus suspending the operation at this point and aborting the device authentication processing.

The device authentication processing portion 108 of the content receiver apparatus 200, upon receiving the in-house confirmation result for remote access, checks whether the message authentication code received at S1115 is valid. If the code is found valid, the device authentication processing portion 108 transmits its receipt confirmation to the content transmitter apparatus 100 (S1118). The procedure from S1109 to S1118 represents the in-house presence check method for remote access device registration.

If on the other hand the received message authentication code is not valid, the device authentication processing portion 108 of the content receiver apparatus 200 aborts the device authentication processing. Upon receiving the receipt confirmation, the device authentication processing portion 108 of the content transmitter apparatus 100 generates a remote access key for the device authentication operation and content encryption performed when accessing content from out of house. It then encrypts the remote access key by using the authentication key and transmits the encrypted remote access key to the content receiver apparatus 200 (S1119).

The device authentication processing portion 108 of the content receiver apparatus 200 decrypts the remote access key sent from the content transmitter apparatus 100 by using the authentication key and transmits its receipt confirmation (S1120).

The device authentication processing portion 108 of the content transmitter apparatus 100, upon reception of the receipt confirmation, registers the information about the content receiver apparatus 200 with the table of device information 5200 in the device information management portion 109 (S1121).

For example, as shown in a record 5213 of the table of device information 5200 with ID 5203 of 3, the device ID of the content receiver apparatus 200 received in S1101 is set in the device ID 5202; the MAC address on the network of the content receiver apparatus 200 is set in the address information 5203; and the remote access key created by S1119 is registered with the remote access key 5205.

In the access state 5206, "stop" is set; and the maximum remote access counter value 5104 in the management table 5100 is set in the remote access counter value 5207. On the other hand, the device authentication processing portion 108 of the content receiver apparatus 200 generates or updates the table of device information for remote access 60000 in the device information management portion 109 (S1122).

If T2 in the in-house confirmation result for remote access S1117 in the remote registration processing S1100 is less than the in-house presence check timeout value (T) 8201 of the in-house presence check threshold table 8200 in the in-house confirmation result for remote access S617 of the in-house access device authentication processing S600, the successful confirmation of only the in-house presence check S1117 for remote access device registration may be taken as a success in the in-house presence check for both the in-house access device authentication and the authentication for remote access device registration. At this time, the in-house exchange key is shared as well as the remote access key.

In the update table of device information procedure S1121, as shown in the record 5212 whose ID 5201 value in the table of device information 5200 is 2, the device ID of the content receiver apparatus 200 received at S601 is set in the ID 5202; the MAC address on the network of the content receiver apparatus 200 is set in the address information 5203; the maximum in-house access counter value 5103 of the management table 5100 is set in the in-house access counter value 5204; and the remote access key generated at S713 is registered with the remote access key 5205.

In the access state 5206, "stop" is set; and the maximum remote access counter value 5104 in the management table 5100 is set in the remote access counter value 5207.

Now, the device authentication processing portion 108 of the content transmitter apparatus 100 and the device authentication processing portion 108 of the content receiver apparatus 200 share the common remote access key. The remote access key is used for the device authentication and content encryption when content is viewed from outside the house.

By executing the authentication and registration of the remote access devices in the steps of S1101 to S1120, in addition to the normal device authentication and key exchange shown in FIG. 6, the common remote access key can be shared with only the device that has successfully completed the remote authentication processing and the in-house presence check for remote access device registration, which is different from the normal authentication.

Further, by executing only the remote registration processing, the time taken by the procedure for registering the remote access devices can be shortened. The step S1121 allows the devices, which have successfully passed the in-house presence check for remote access device registration, to be registered with the content transmitter apparatus 100. This in turn enables the content transmitter apparatus 100 to perform an appropriate connection control when an unregistered device makes a remote access.

If T2 in the in-house confirmation result for remote access S1117 in the remote registration processing S1100 is less than the in-house access limitation TTL value 8101 of TTL table 8100 in the in-house confirmation result for remote access S617 in the in-house access device authentication processing S600, the successful confirmation of the in-house presence check S1117 for remote access device registration is taken as the success in the in-house presence check for both the in-house access device authentication and the authentication for remote access device registration. So, the in-house access counter value 5204 in the table of device information 5200 is also set at the same time. With this process, it is possible to execute both the normal device authentication and the authentication for remote access device registration at one time and to eliminate the in-house presence check for in-house access device in the in-house access device authentication processing 5600, thus shortening the time required for device authentication.

After the remote registration processing S1100 is executed in the house in advance between the content transmitter apparatus and the content receiver apparatus according to FIG. 11, the content receiver apparatus that has successfully completed the authentication procedure is taken out of house. If the remote authentication processing S900 is successfully executed, the content transmitter apparatus in the house can deliver content to the content receiver apparatus outside the house according to the content viewing from out of house processing S1000 of FIG. 10.

An arrangement may be made in which, when the transmission of the content is completed, the content transmitter apparatus stops the timer 1091 and discards the remote exchange key so that, even if the content receiver apparatus subsequently issues another content viewing request, the content transmission will not be carried out unless the authentication procedure dedicated for remote access device is executed again.

The content transmitter apparatus can limit the number of content receiver apparatus that can make remote accesses simultaneously, by using the maximum remote access number 5106 in the management table 5100.

The content receiver apparatus that makes an access from out of house to the device inside house according to the procedure of FIG. 11 executes the remote access device authentication between it and the content transmitter apparatus beforehand inside the house to share a remote access key. At the same time, the content receiver apparatus has its information registered with the table of device information in the content transmitter apparatus. With the above steps taken, the content receiver apparatus can be regarded as a device personally owned by the user, so that when it is taken out of house, the user using the content receiver apparatus can safely view the content without exceeding the range of personal use.

FIG. 45 is a remote registration processing S4500 executed between the content transmitter apparatus 100 and the mobile terminal (content receiver apparatus) 200 in advance in the system configuration of FIG. 1 in order to view, copy or move the copy-protected content input or stored in the content transmitter apparatus 100.

First, the content receiver apparatus 200 makes a remote access device registration authentication start request. The device authentication processing portion 108 of the content receiver apparatus 200 transmits the authentication start request to the content transmitter apparatus 100 through the communication processing portion 113 (S4501).

The device authentication processing portion 108 of the content transmitter apparatus 100, upon receiving the authentication start request through the communication processing portion 113, transmits a receipt confirmation to the content receiver apparatus 200 (S4502). The subsequent steps are similar to steps S1101 to S1122 of FIG. 11.

As described above, in the remote registration processing, by first receiving the authentication start request, the content transmitter apparatus 100 can determine the object of the session. Therefore, various commands—the remote access device registration authentication start request, authentication response for remote access, in-house confirmation ready for remote registration procedure, notification for the in-house confirmation ready for remote access, in-house confirmation setup for remote registration request and in-house confirmation request—do not need to be used. These commands may be replaced with the same commands used in the normal device authentication processing of FIG. 6, which include the normal authentication request for remote registration, authentication response for remote access, in-house confirmation ready for remote access, notification of in-house confirmation ready for remote access, in-house confirmation setup for remote registration request, and in-house confirmation request.

[Embodiment 3]

In the preceding embodiment, the device that makes an access from out of house for receiving content performs a remote access registration in the user's house in advance. The third embodiment describes a procedure in which the content receiver apparatus in a visited place views content without executing the remote access registration inside the house in advance.

Figure 12:
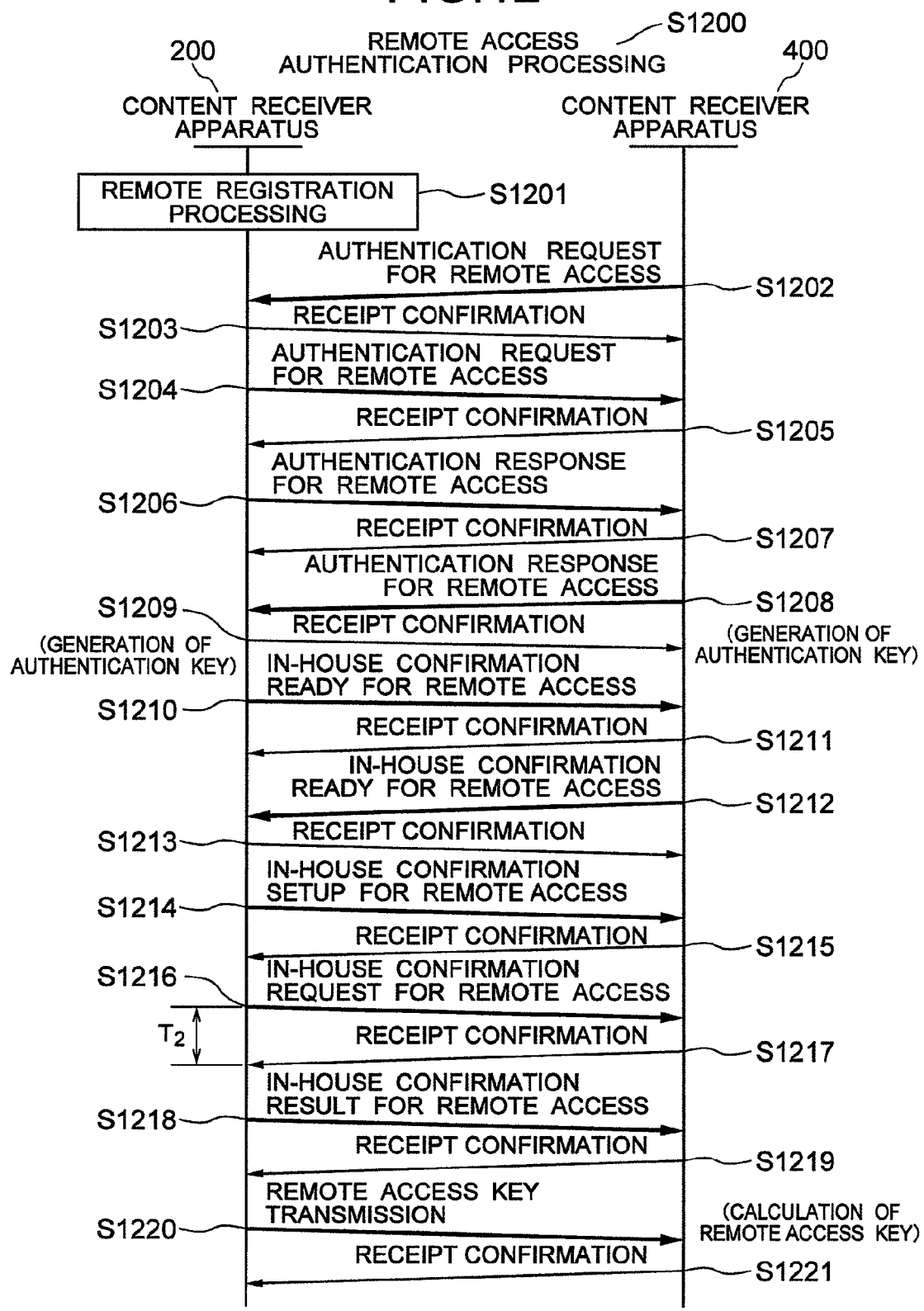
FIG. 12 is an explanatory diagram showing an example of a remote access device authentication sequence executed between the content receiver apparatus and the content transmitter apparatus.

FIG. 12 shows a remote authentication processing S1200 to be performed between the mobile terminal 200 and the content receiver apparatus 400 in the system configuration of FIG. 1 to view, copy or move copy-protected content entered into or accumulated in the content transmitter apparatus 100, by using the information in the mobile terminal 200 registered with the content transmitter apparatus 100. It is assumed that during the execution of this procedure, the mobile terminal (content receiver apparatus) 200 is at a visited place 2.

The content receiver apparatus 200 executes beforehand the remote registration processing S700 or remote registration processing S1100 between it and the content transmitter apparatus 100 and obtains a remote access key from the content transmitter apparatus, a delivery source (S1201).

First, the content receiver apparatus 400 prepares a remote access device authentication request for remote registration. The device authentication processing portion 108 of the content receiver apparatus 400 attaches the device's unique information including the device ID and a certificate for the information to the authentication request for remote registration before transmitting it to the content receiver apparatus 200 via the communication processing portion 113 (S1202).

The device authentication processing portion 108 of the content receiver apparatus 200, upon receiving the remote access authentication request through the communication processing portion 113, returns a receipt confirmation to the content receiver apparatus 400 (S1203). Then, the device authentication processing portion 108 of the content receiver apparatus 200 prepares its own remote access authentication request and, as in the case of the content receiver apparatus 400, attaches the device's unique information and a certificate for the information to the authentication request before transmitting it to the content receiver apparatus 400 (S1204).

The device authentication processing portion 108 of the content receiver apparatus 400, upon receiving the remote access authentication request, transmits a receipt confirmation to the content receiver apparatus 200 (S1205).

Next, the device authentication processing portion 108 of the content receiver apparatus 200 examines the information received as a result of its authentication request and transmits an authentication response for remote access attached with parameters necessary for the generation of key information to the content receiver apparatus 400 (S1206).

The device authentication processing portion 108 of the content receiver apparatus 400, upon receiving the authentication response, transmits a receipt confirmation to the content receiver apparatus 200 (S1207). After this, it creates its own authentication response and, as with the content transmitter apparatus, transmits the authentication response attached with parameters necessary for the generation of key information to the content receiver apparatus 200 (S1208). Using the necessary parameters, it generates an authentication key common to the content receiver apparatus 200.

The device authentication processing portion 108 of the content receiver apparatus 200, upon receiving the authentication response, transmits a receipt confirmation to the content receiver apparatus 400 (S1209) and, as with the content receiver apparatus, generates an authentication key common to the content receiver apparatus 400 by using necessary parameters.

In the procedure up to this point, the device authentication processing portion 108 of the content receiver apparatus 200 and the device authentication processing portion 108 of the content receiver apparatus 400 generate and share the common authentication key.

Next, the content receiver apparatus 200, to confirm that the content receiver apparatus 400 is inside the house, transmits to the content receiver apparatus 400 a notification that it starts preparing for an in-house presence check for remote access device (S1210).

The device authentication processing portion 108 of the content receiver apparatus 400, upon receiving the notification for the preparation of the in-house presence check for remote access device, transmits a receipt confirmation to the content receiver apparatus 200 (S1211). It then creates its own notification for the preparation of remote access device in-house presence check and transmits it to the content receiver apparatus 200 (S1212).

The device authentication processing portion 108 of the content receiver apparatus 200, upon receiving the notification of preparation for the remote access device in-house presence check, returns a receipt confirmation to the content receiver apparatus 400 (S1213). It then transmits a remote access device in-house confirmation setup request attached with information necessary for in-house presence check to the content receiver apparatus 400 (S1214).

The device authentication processing portion 108 of the content receiver apparatus 400, upon receiving the remote access device in-house confirmation setup for remote registration request, initiates preparation for the in-house presence check by generating a message authentication code based on the data contained in the in-house confirmation setup for remote registration request for remote access device registration. It then transmits a receipt confirmation to the content receiver apparatus 200 (S1215).

The device authentication processing portion 108 of the content receiver apparatus 200 that has received the receipt confirmation generates a message authentication code based on the data transmitted to the content receiver apparatus 400 at step S1214. It then starts the timer 1091 in the device information management portion 109. Then, to check whether the content receiver apparatus 400 is inside the house, the device authentication processing portion 108 of the content receiver apparatus 200 transmits an in-house confirmation request containing the message authentication code to the content receiver apparatus 400 (S1216).

The device authentication processing portion 108 of the content receiver apparatus 400, upon receiving the in-house confirmation request, transmits a receipt confirmation containing the message authentication code generated by S1215 to the content receiver apparatus 200 (S1217).

The device authentication processing portion 108 of the content receiver apparatus 200, upon receiving the receipt confirmation, stops the timer 1091 and checks that the measured time (T2) it took from when the remote access device in-house confirmation request was issued until the receipt confirmation was received is not in excess of the in-house presence check timeout value (T') for remote access device registration 8202 of the in-house presence check threshold table 8200. Setting the in-house presence check timeout value (T') for remote access device registration 8202 smaller than the in-house presence check timeout value (T) 8201 allows a stricter in-house presence check to be executed on those devices that makes remote access in the authentication operation. The device authentication processing portion 108 of the content receiver apparatus 200 also checks whether the message authentication code contained in the received receipt confirmation is correct.

If the check finds that measured time (T2)≤in-house presence check timeout value (T') for remote access device registration 8202 in the in-house presence check threshold table 8200 and if the received message authentication code is valid, the device authentication processing portion 108 of the content receiver apparatus 200 decides that the content receiver apparatus 400 exists inside house and within a range of personal use. It then transmits an in-house confirmation result for remote access to the content receiver apparatus 400 (S1218).

If measured time (T2)>in-house presence check timeout value (T') for remote access device registration 8202 in the in-house presence check threshold table 8200 or if the received message authentication code is not valid, the device authentication processing portion 108 of the content receiver apparatus 200 decides that there is a possibility of the content receiver apparatus 400 existing outside the house or that the device is not an authorized one, thus aborting the device authentication processing at this point.

The device authentication processing portion 108 of the content receiver apparatus 400, upon receiving the in-house confirmation result for remote access, examines whether the message authentication code received at S1216 is valid. If the code is found valid, the device authentication processing portion 108 transmits its receipt confirmation to the content receiver apparatus 200 (S1219) The procedure from S1210 to S1219 represents the in-house presence check method for remote access device registration.

If on the other hand the received message authentication code is not valid, the device authentication processing portion 108 of the content receiver apparatus 400 aborts the device authentication processing. Upon receiving the receipt confirmation, the device authentication processing portion 108 of the content receiver apparatus 200 encrypts the remote access key obtained at S1201 by using the authentication key and transmits the encrypted access key to the content receiver apparatus 400 (S1220).

The device authentication processing portion 108 of the content receiver apparatus 400 decrypts the remote access key transmitted from the content receiver apparatus 200 by using the authentication key and transmits a receipt confirmation (S1221).

By executing the procedure of FIG. 12 from S1202 to S1221, the content receiver apparatus 400, without having to perform the authentication operation inside the user house 1, can share with the content receiver apparatus 200 the remote access key that the content receiver apparatus 200 shares with the content transmitter apparatus 100. Further, the content receiver apparatus 200, by executing the steps from S1210 to S1219, is allowed to share with only the devices having successfully passed the remote access device in-house presence check the remote access key which is currently shared with the content transmitter apparatus 100.

The procedure described above explains the remote access device authentication operation and the remote access key exchange operation, both performed between the content receiver apparatus 200 and the content receiver apparatus 400 prior to transmitting content to devices outside the user house.

Figure 13:
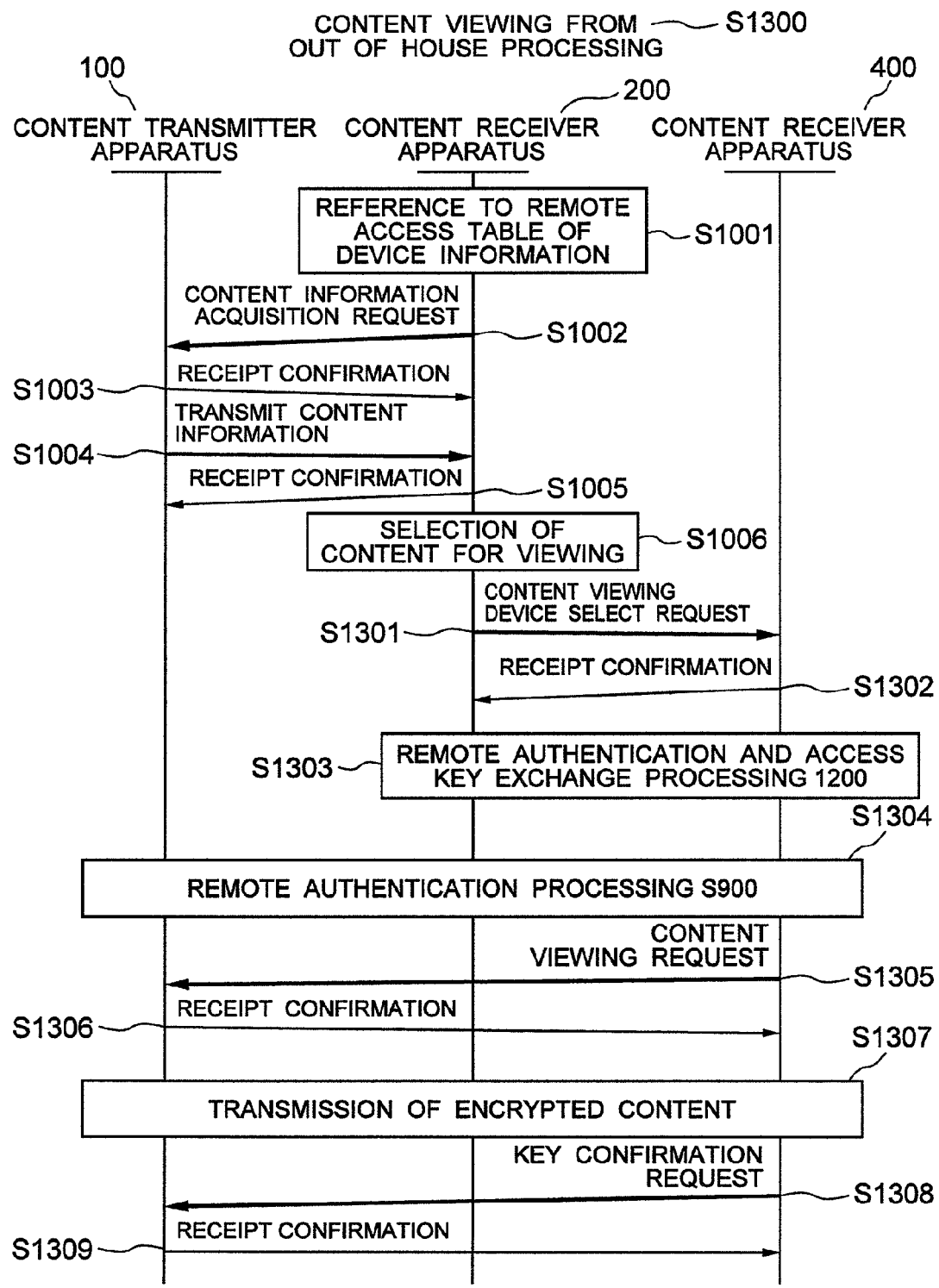
FIG. 13 is an explanatory diagram showing an example of a content viewing remote sequence executed between the content receiver apparatus and the content transmitter apparatus.

FIG. 13 shows a procedure 1300 executed when the mobile terminal (content receiver apparatus) 200 is taken to a visited place 2 in the system configuration of FIG. 1 and the content receiver apparatus 400 in the visited place 2 is used to view content recorded in the recording portion 111 of the content transmitter apparatus 100.

The user executes beforehand in the user house 1 the remote registration processing S700 or S1100 between the content transmitter apparatus 100 and the mobile terminal (content receiver apparatus) 200 so that a remote access key is shared by the two devices.

When the user wishes to carry the mobile terminal (content receiver apparatus) 200 to the visited place 2 and use the content receiver apparatus 400 in the visited place 2 to view content recorded in the content transmitter apparatus 100 installed in the user house 1, the acquisition of content information and the remote authentication processing S900 are performed between the content transmitter apparatus 100 and the content receiver apparatus 200 in the same procedure as instructed by S1001 to S1007 of FIG. 10.

After the remote access device authentication operation is successfully completed, allowing the two devices to share a remote exchange key, the controller 115 of the content receiver apparatus (controller) 200 checks to see if there are any other content playback devices on the network, as by multicasting UDP packets containing a "request to detect devices with playback function" to all devices on the network to allow only those devices with a playback function to return a response message. If such playback devices are found, a content playback device list is displayed on the display/speaker 105.

If the user selects from the list a content playback device (content receiver apparatus 400 in this case) through the input processing portion 107, the controller 115 of the content receiver apparatus 200 transmits a content viewing device select request to the content receiver apparatus 400 (S1301). The content viewing device select request includes information about content to be viewed and the address information 60002 of the content transmitter apparatus 100 registered with the table of device information for remote access 60000. It may also include the registration information 60003.

The content receiver apparatus 400, upon receiving the content viewing device select request, transmits a receipt confirmation to the controller 200 (S1302) and executes the remote authentication processing S1200 between it and the controller 200 (S1303). At this time, as the remote access key to be sent to the content receiver apparatus 400 in S1220, the device authentication processing portion 108 of the controller 200 uses the remote access key shared with the content transmitter apparatus 100 in step S1303. Now, the content transmitter apparatus 100, the controller 200 and the content receiver apparatus 400 are able to share the same remote access key.

After this, the content receiver apparatus 400 executes the remote authentication processing S900 between it and the content transmitter apparatus 100 by using the access key to obtain the remote exchange key and its ID (S1304). At this time, new device information of the content receiver apparatus 400 is registered in the table of device information updating operation at S912. That is, the device authentication processing portion 108 of the content transmitter apparatus 100, upon receiving a receipt confirmation, registers the information about the content receiver apparatus 400 with the table of device information 5200 in the device information management portion 109 (S1222).

For example, as shown in the record 5214 whose ID 5201 is 4 in the table of device information 5200, the device authentication processing portion 108 of the content transmitter apparatus 100 sets in the device ID 5202 the device ID of the content receiver apparatus 400 it received at S901; sets the MAC address on the network of the content receiver apparatus 400 in the address information 5203; and registers with the remote access key 5205 the remote access key transmitted to the content receiver apparatus 200. It also sets "stop" in the access state 5206 and sets in the remote access counter value 5207 the maximum remote access counter value 5104 of the management table 5100.

Then, the content receiver apparatus 400 transmits a content viewing request to the content transmitter apparatus 100 (S1305). The content viewing request is attached with an ID of the remote exchange key. Further, to allow the content transmitter apparatus 100 to perform a format conversion or image quality conversion as required on the content to be transmitted, the content receiver apparatus 400 may add information about reproducible data format (e.g., MPEG2-TS and H.264) and image quality (HD or SD; and 760p or 1080i) to the content viewing request. These information may be issued in other request than the content viewing request.

The controller 115 of the content transmitter apparatus 100, upon receiving the content viewing request, transmits a receipt confirmation to the content receiver apparatus 400 (S1306). Then the device authentication processing portion 108 checks that the ID of the remote exchange key is valid.

The device information management portion 109 sets and starts the timer 1091 in the device information management portion 109 so that notifications are issued periodically.

The device authentication processing portion 108, using the remote exchange key, generates a common key to encrypt the content and sets the common key in the encryption/decryption processing portion 112. It then encrypts the desired content read out from the recording portion 111 by the encryption/decryption processing portion 112 while at the same time transmitting it in the format shown in FIG. 17 to the content receiver apparatus 400 (S1307). Here, during the content transmission, each time a notification comes from the timer 1091, the device information updating portion 1092 updates the remote access counter value 5207 in the table of device information 5200.

The content receiver apparatus 400, using the remote exchange key, creates a common key to decrypt the content and sets the common key in the encryption/decryption processing portion 112. Then the encryption/decryption processing portion 112 then extracts the encrypted content from the payload of the format of FIG. 17, received via the router 21 and the communication processing portion 113, and decrypts it while at the same time decoding and outputting it to the display/speaker 105.

After the content transmission has started, the device authentication processing portion 108 of the content receiver apparatus 400 transmits a key confirmation request to the content transmitter apparatus 100 at a desired timing (S1308). The device authentication processing portion 108 of the content transmitter apparatus 100, upon receiving the key confirmation request, transmits a receipt confirmation to the content receiver apparatus 400 depending on the confirmation result.

When the controller 200, which shares a remote access key with the content transmitter apparatus through an operation performed beforehand in a user house, is taken out of house, the execution of the remote authentication processing S1200 at S1303 allows the controller to hand over the remote exchange key to the content receiver apparatus located outside house that has successfully passed the authentication procedure, only if the content transmitter apparatus and the controller can share the remote access key.

The above process does not require the content receiver apparatus to be taken to the user house 1 but still allows the user at a visited place to safely view the content stored in house without exceeding the range of personal use of content by using a content receiver apparatus installed at the visited place.

[Embodiment 4]

In the preceding embodiment, the remote registration processing is performed beforehand in the user house 1. This fourth embodiment explains a remote registration processing S1400 that is executed from outside the user house.

Figure 14:
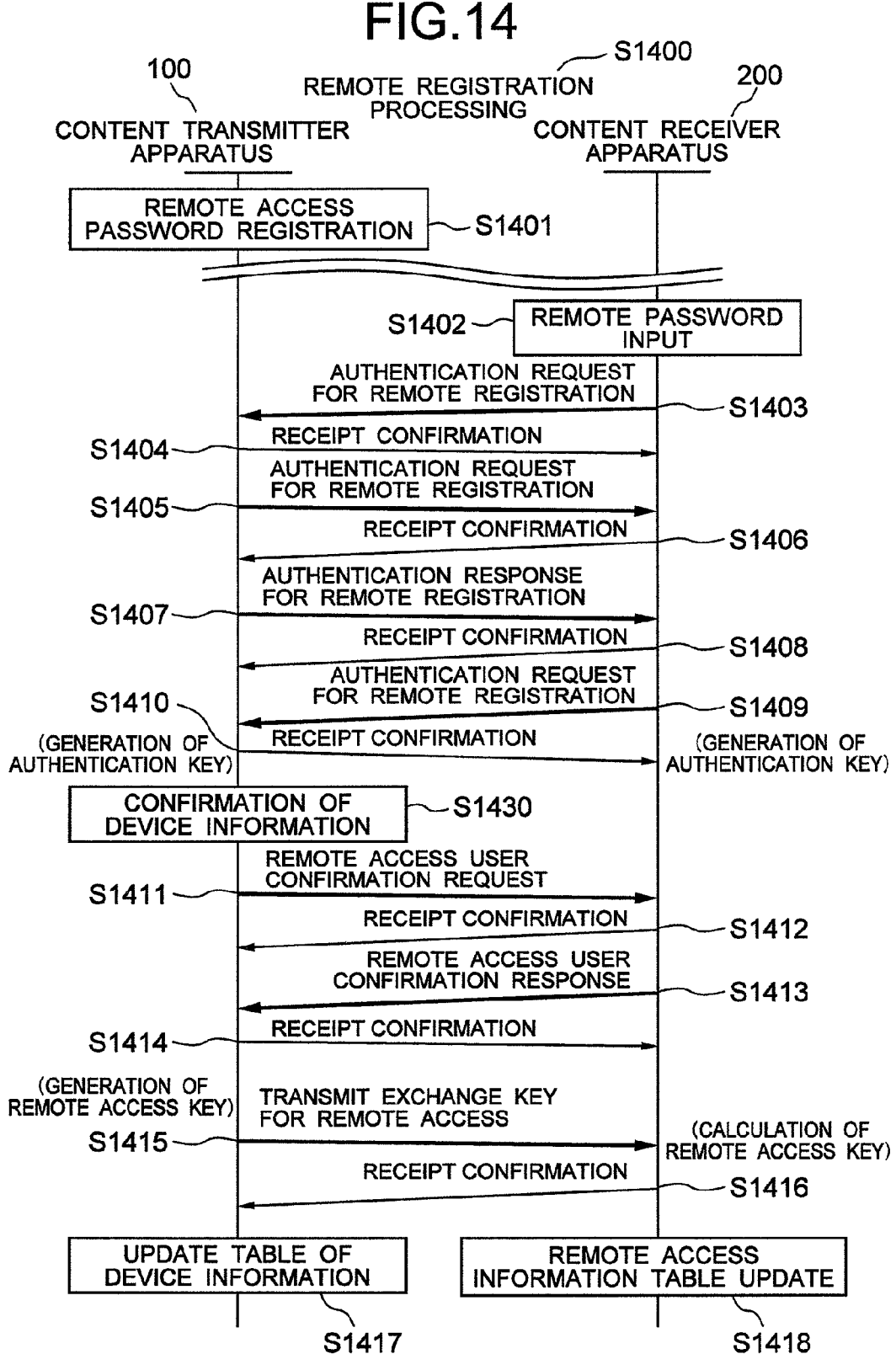
FIG. 14 is an explanatory diagram showing an example of a remote access device registration sequence executed between the content receiver apparatus and the content transmitter apparatus.

FIG. 14 shows a remote registration processing that is executed beforehand outside the user house between the content transmitter apparatus 100 and the mobile terminal 200 in the system configuration shown in FIG. 1 for the user to view, copy or move copy-protected content entered into or accumulated in the content transmitter apparatus 100 by using the mobile terminal (content receiver apparatus) 200. During the execution of this procedure, the mobile terminal (content receiver apparatus) 200 is assumed to be at a visited place 2.

Here, the content transmitter apparatus 100 and the content receiver apparatus 200 do not monitor TTL of packets being received. Further, the content transmitter apparatus 100 and the content receiver apparatus 200, rather than setting the TTL of the packets being transmitted below the in-house access limitation TTL value 8101 of the TTL table 8100, uses for the TTL the remote transmission TTL set value 8102 of the TTL table 8100 so that packets from the visited place 2 can get to the user house 1 through the Internet. The remote transmission TTL set value 8102 is assumed to be greater than the in-house access limitation TTL value 8101.

First, the user in the user house 1 gives a remote access password setting instruction to the content transmitter apparatus 100 through the input processing portion 107. In response to this, the device information management portion 109 of the content transmitter apparatus 100 sets a remote access password requested in a remote access password 5107 of a management table 5300 shown in FIG. 15 (S1401). FIG. 15 will be explained later.

Next, the user enters a password through the input processing portion 107 into the content receiver apparatus 200 taken out to the visited place 2 (S1402). When the user instructs the content receiver apparatus 200 to initiate the authentication, the device authentication processing portion 108 of the content receiver apparatus 200 creates an authentication request for remote registration device registration. The device authentication processing portion 108 of the content receiver apparatus 200 attaches device's unique information including the device ID and a certificate for the information to the authentication request and transmits it to the content transmitter apparatus 100 through the communication processing portion 113 (S1403).

The device authentication processing portion 108 of the content transmitter apparatus 100, upon receiving the authentication request for remote registration through the communication processing portion 113, transmits a receipt confirmation to the content receiver apparatus 200 (S1404) and then creates its own authentication request for remote registration device registration. As with the content receiver apparatus, the device authentication processing portion 108 of the content transmitter apparatus 100 attaches unique information of content transmitter apparatus 100 and a certificate for the information to the authentication request for remote registration and transmits it to the content receiver apparatus 200 (S1405).

The device authentication processing portion 108 of the content receiver apparatus 200, upon receiving the authentication request for remote registration, transmits a receipt confirmation to the content transmitter apparatus 100 (S1406).

Next, the device authentication processing portion 108 of the content transmitter apparatus 100 examines various information received as a result of its authentication request for remote registration and transmits an authentication response for remote access attached with parameters necessary for the generation of key information to the content receiver apparatus 200 (S1407).

The device authentication processing portion 108 of the content receiver apparatus 200, upon receiving the authentication response, transmits its receipt confirmation to the content transmitter apparatus 100 (S1408). It then creates its own authentication response and, as with the content transmitter apparatus, transmits the authentication response attached with parameters necessary for the generation of key information to the content transmitter apparatus 100 (S1409). After this, it creates an authentication key common to the content transmitter apparatus 100 by using the necessary parameters.

The device authentication processing portion 108 of the content transmitter apparatus 100, upon receiving the authentication response, transmits its receipt confirmation to the content receiver apparatus 200 (S1410) and, as with the content receiver apparatus, creates an authentication key common to the content receiver apparatus 200 by using the necessary parameters.

In the procedure up to this point, the device authentication processing portion 108 of the content transmitter apparatus 100 and the device authentication processing portion 108 of the content receiver apparatus 200 create and share the common authentication key. Next, using the remote access key 5205 of the table of device information 5200 and the value set in the remote access counter value 5207, the device authentication processing portion 108 of the content transmitter apparatus 100 checks that the number of devices registered as the remote access devices is less than the maximum remote registration number 5102 in the management table 5100 (S1430). To confirm that the request from the content receiver apparatus 200 is the one from the user, the device authentication processing portion 108 of the content transmitter apparatus 100 transmits a remote access user confirmation request to the content receiver apparatus 200 (S1411). If the number of devices registered as the remote access devices in the table of device information 5200 has reached the maximum remote registration number 5102 of the management table 5100, the procedure is aborted.

The device authentication processing portion 108 of the content receiver apparatus 200, upon receiving the remote access user confirmation request, transmits its receipt confirmation to the content transmitter apparatus 100 (S1412). It then creates the remote access user confirmation response including the remote access password entered by the user at S1402 and encrypted by the common authentication key, before transmitting it to the content transmitter apparatus 100 (S1413).

The device authentication processing portion 108 of the content transmitter apparatus 100, upon receiving the remote access user confirmation response, examines the management table 5300. If the password contained in the received information is found to agree with the password set at S1401, the device authentication processing portion 108 transmits its receipt confirmation to the content receiver apparatus 200 (S1414).

The device authentication processing portion 108 of the content transmitter apparatus 100 creates a remote access key, which is used for device authentication operation and content encryption when the content is viewed from outside the house. Using the authentication key, the device authentication processing portion 108 encrypts the remote access key before transmitting it to the content receiver apparatus 200 (S1415).

If the password contained in the information received does not match the password set at S1401, or if the remote access password is not set in the management table 5300, the device authentication processing is aborted.

The device authentication processing portion 108 of the content receiver apparatus 200 decrypts the remote access key transmitted from the content transmitter apparatus 100 by using the authentication key and transmits a receipt confirmation (S1416).

The device authentication processing portion 108 of the content transmitter apparatus 100, upon receiving the receipt confirmation, registers the information about the content receiver apparatus 200 with the table of device information 5200 in the device information management portion 109 (S1417).

For example, as shown at record 5213 whose ID 5201 is 3 in the table of device information 5200, the device authentication processing portion 108 sets the device ID of the content receiver apparatus 200 received at S1101 in the device ID 5202, sets the MAC address on the network of the content receiver apparatus 200 in the address information 5203, and registers the remote access key created at S1119 with the remote access key 5205.

The device authentication processing portion 108 of the content transmitter apparatus 100 also sets "stop" in the access state 5206 and also sets the maximum remote access counter value 5104 of the management table 5100 in the in-house access counter value 5204. On the other hand, the device authentication processing portion 108 of the content receiver apparatus 200 creates or updates the table of device information for remote access 60000 stored in the device information management portion 109 (S1418).

The execution of the remote registration processing S1400 from S1401 to S1418 allows the device authentication processing portion 108 of the content transmitter apparatus 100 and the device authentication processing portion 108 of the content receiver apparatus 200 to share a common remote access key only if the two devices can recognize each other as authorized devices and if the passwords managed individually by the two devices agree.

The remote access key is used for device authentication processing and content encryption when content is viewed from outside the house. The two steps S1412 and S1413 or the steps S1414 and S1415 may be combined into single steps. Further, by using the management table and the table of device information shown in FIG. 5, the in-house accesses and the remote accesses may be managed separately, allowing for the use of individual access limitations.

Further, the passwords used by the content transmitter apparatus 100 and the content receiver apparatus 200 may be those randomly generated by the content transmitter apparatus 100, rather than being set by the user. The remote access password may be common to all remote access devices or may be unique to individual remote access devices.

The procedure described above is the detail of the remote registration processing executed between the content transmitter apparatus 100 and the content receiver apparatus 200 prior to content transmission to a device outside the user house.

Following the remote registration processing S1400 of FIG. 14, the execution of the content viewing from out of house processing S1000 explained with reference to FIG. 10 allows the user at a visited place 2 to view content accumulated in the recording portion 111 of the content transmitter apparatus 100 by using the content receiver apparatus 200.

FIG. 15 shows an example of the management table 5300 stored in the device information registration portion 1093 that is used in the remote registration processing.

The management table 5300 comprises a maximum device authentication number 5101, maximum remote registration number 5102, maximum in-house access counter value 5103, maximum remote access counter value 5104, maximum simultaneous access number 5105, maximum remote access number 5106 and remote access password 5107. The remote access password 5107 represents a password used by the user when he or she makes an access from out of house.

Other constitutional elements are similar to those of the management table 5100.

Here, an example case has been described in which the remote access password is common to all remote access devices. But the remote access password may take individual values for individual devices. If the remote access password takes individual values for individual remote access devices, the individual values need only to be registered with the table of device information.

Only if it is confirmed in the steps from S1411 to S1414 of FIG. 14 that the two devices mutually recognize themselves as authorized devices and that the passwords managed individually by the two devices agree, allowing the two devices to share the remote access key, then the successful execution of the remote authentication processing 5900 enables the content transmitter apparatus in the user's house to deliver content to the content receiver apparatus located outside house according to the content viewing from out of house processing S1000 of FIG. 10.

As a result, the user can safely view the content stored in the house by using the content receiver apparatus located outside house, without exceeding the range of personal use of the content.

[Embodiment 5]

In the above embodiment, in both the in-house registration, in which the remote registration processing is performed inside the user house, and the out-of-house registration, in which the remote registration processing is performed from the visited place 2, the device information registration is performed in the same way and the validity periods are managed by using the common remote counter value. This fifth embodiment explains a table configuration and a device registration procedure when different device registration limitations are used for different registration modes—the in-house registration and the out-of-house registration—and the validity periods are managed by using different remote access counter values for different registration modes.

FIG. 18 shows an example configuration of device information 6000 stored in the device information registration portion 1093 of FIG. 4 when the validity period is managed by using different remote access counter values for two different registration modes—one in which the remote registration processing is performed inside the user house and one in which the registration procedure is performed from the visited place 2. The device information 6000 comprises a management table 5800 and a table of device information 5400.

The management table 5800 is composed of a maximum device authentication number 5101, maximum remote access device registration number (in-house registration) 5801, maximum remote access device registration number (out-of-house registration) 5802, maximum in-house access counter value 5103, maximum remote access counter value (in-house registration) 5803, maximum remote access counter value (out-of-house registration) 5804, maximum simultaneous access number 5105, maximum simultaneous remote access number 5106 and remote access password 5107.

The maximum remote access device registration number (in-house registration) 5801 represents the maximum number of remote access devices that can be registered from inside the house by executing the remote registration processing S700 or S1100.

The maximum remote access device registration number (out-of-house registration) 5802 represents the maximum number of remote access devices that can be registered from outside the house by using the remote registration processing S1400.

The maximum remote access counter value (in-house registration) 5803 represents a maximum counter value to be set in the timer 1091 to manage the validity period of device information that has been registered from inside the house by using the remote registration processing S700 or S1100.

The maximum remote access counter value (out-of-house registration) 5804 represents a maximum counter value to be set in the timer 1091 to manage the validity period of device information that has been registered from outside the house by using the remote registration processing S1400. In other respects, this table is similar to the management table 5300. The table of device information 5400 comprises an in-house access table of device information 5500, a remote access device (in-house registration) information table 5600 and a remote access device (out-of-house registration) information table 5700.

The in-house access table of device information 5500 is a table in which to register devices that intend to make in-house accesses. It comprises an ID 5201, device ID 5202, address information 5203, in-house access counter value 5204 and access state 5206. The ID 5201, device ID 5202, address information 5203, in-house access counter value 5204 and access state 5206 are similar to those of the table of device information 5200 of FIG. 5.

The remote access device (in-house registration) information table 5600 is a table in which to register those remote access devices which have executed the remote registration processing S700 or S1100. The table comprises ID 5201, device ID 5202, address information 5203, remote access key 5205, remote access counter value 5601 and access state 5206.

The remote access counter value 5601 represents a current counter value to manage the validity period of registration information of devices that have undergone the remote registration processing S700 or S1100 from inside the house. In other respects, this table is similar to the table of device information 5200.

The remote access device (out-of-house registration) information table 5700 is a table in which to register those remote access devices which have undergone the remote registration processing S1400 from outside the house. It comprises an ID 5201, device ID 5202, address information 5203, remote access key 5205, remote access counter value 5701 and access state 5206. The remote access counter value 5701 represents a current counter value to manage the validity period of registration information of devices that have undergone the remote registration processing S1400 from outside the house. In other respects, this table is similar to the table of device information 5200.

In the management table 5800, the use of two values—maximum remote access device registration number (in-house registration) 5801 and maximum remote access device registration number (out-of-house registration) 5802—makes it possible to impose different limitations on device registration in different device registration procedures, realizing an appropriate limitation that matches the security level of the registration method employed.

By using two tables—remote access device (in-house registration) information table 5600 and remote access device (out-of-house registration) information table 5700—and by using two values in the management table 5800—maximum remote access counter value (in-house registration) 5803 and maximum remote access counter value (out-of-house registration) 5804—it is possible to perform different managements of validity period of registered devices in different registration procedures.

When the device information 6000 is used, the update table of device information operation S621 in the normal device authentication processing S600 executed from inside house causes the device authentication processing portion 108 of the content transmitter apparatus 100 to register the information about the content receiver apparatus 300 with the in-house access table of device information 5500 in the device information management portion 109.

For example, as shown at record 5511 whose ID 5201 in the in-house access table of device information 5500 is 1, the device authentication processing portion 108 of the content transmitter apparatus 100 sets the device ID of the content receiver apparatus 300 received at S601 in the device ID

5202, sets the IP address on the network of the content receiver apparatus 300 in the address information 5203, sets the maximum in-house access counter value 5103 of the management table 5800 in the in-house access counter value 5204, and sets "stop" in the access state 5206.

Further, in the remote registration processing S700 executed from inside house, the device information confirmation step of S720 has the device authentication processing portion 108 of the content transmitter apparatus 100 check that the number of devices registered with the remote access device (in-house registration) information table 5600 is less than the maximum remote access device registration number (in-house registration) 5801 of the management table 5800.

In the update table of device information step of S715, the device authentication processing portion 108 of the content transmitter apparatus 100 registers the information about the content receiver apparatus 200 with the remote access device (in-house registration) information table 5600 in the device information management portion 109.

For example, as shown at record 5611 whose ID 5201 in the remote access device (in-house registration) information table 5600 is 1, the device authentication processing portion 108 of the content transmitter apparatus 100 sets the received device ID of the content receiver apparatus 200 in the device ID 5202, sets the MAC address on the network of the content receiver apparatus 200 in the address information 5203, sets the maximum remote access counter value (in-house registration) 5803 of the management table 5800 in the remote access counter value 5601, registers the remote access key created at S713 with the remote access key 5205, and sets "stop" in the access state 5206.

Further, in the remote registration processing S1100 executed from inside house, the device information confirmation step of S1130 has the device authentication processing portion 108 of the content transmitter apparatus 100 check that the number of devices registered with the remote access device (in-house registration) information table 5600 is less than the maximum remote access device registration number (in-house registration) 5801 of the management table 5800.

Further, in the update table of device information step of S1121, the device authentication processing portion 108 of the content transmitter apparatus 100 registers the information about the content receiver apparatus 200 with the remote access device (in-house registration) information table 5600 in the device information management portion 109. The information to be registered may be a successful in-house presence check for both the in-house access device authentication and the authentication for remote access device registration.

In the remote registration processing S1100, if the in-house exchange key is also shared in addition to the remote access key, the device authentication processing portion 108 of the content transmitter apparatus 100 registers the information about the content receiver apparatus 200 also with the in-house access table of device information 5500 as shown at 5512.

In the remote registration processing S1400 executed from out of house, the device information confirmation step of S1430 has the device authentication processing portion 108 of the content transmitter apparatus 100 check that the number of devices registered with remote access device (out-of-house registration) information table 5700 is less than the maximum remote access device registration number (out-of-house registration) 5802 of the management table 5800.

Further, in the update table of device information step of S1417, the device authentication processing portion 108 of the content transmitter apparatus 100 registers the information about the content receiver apparatus 200 with the remote access device (out-of-house registration) information table 5700 in the device information management portion 109.

For example, as shown at record 5711 whose ID 5201 in the remote access device (out-of-house registration) information table 5700 is 1, the device authentication processing portion 108 of the content transmitter apparatus 100 sets the received device ID of the content receiver apparatus 200 with the device ID 5202, sets the MAC address on the network of the content receiver apparatus 200 in the address information 5203, sets the maximum remote access counter value (out-of-house registration) 5804 of the management table 5800 in the remote access counter value 5601, registers the remote access key created at S713 with the remote access key 5205, and sets "stop" in the access state 5206.

The remote access counter value 5601 and the remote access counter value 5701 registered by the procedure described above are decremented at a predetermined interval (e.g., once every hour) during the content transmission to the outside of house. When the counter value reaches 0, the associated record is deleted from the table.

With this process, checking the number of records in two separate tables—remote access device (in-house registration) information table 5600 and remote access device (out-of-house registration) information table 5700—allows the device registration limitation to be managed differently in different device registration procedures. This in turn realizes an appropriate limitation that matches the security level of the registration method employed.

Further, by registering the device information with two tables—remote access device (in-house registration) information table 5600 and remote access device (out-of-house registration) information table 5700—in each device registration procedure and by using the maximum remote access counter value (in-house registration) 5803 and the maximum remote access counter value (out-of-house registration) 5804, the validity period of registered devices can be managed differently for different device registration procedures, realizing an appropriate validity period management according to the security level of the registration method employed.

In this embodiment, an example case has been explained in which different device registration limitations are used for different registration modes—in-house registration and out-of-house registration—and in which the validity periods are managed by using different remote access counter values for different registration modes. It is also possible to choose one of the two methods—one in which different device registration limitations are used for the in-house registration and the out-of-house registration and one in which the validity periods are managed by using different remote access counter values for the in-house registration and the out-of-house registration.

[Embodiment 6]

In the preceding embodiment, when the device registration procedure is performed from outside the user's house, e.g., from the visited place 2, the password is not given a validity period. This embodiment explains a device registration procedure executed from out of house when the validity period is set in the password.

FIG. 19 shows one example configuration when a validity period is set in the remote access password of the management table 5900 in the device information 6000 stored in the device information registration portion 1093.

The management table 5900 comprises a maximum device authentication number 5101, a maximum remote access device registration number (in-house registration) 5801, a maximum remote access device registration number (out-of-house registration) 5802, a maximum in-house access counter value 5103, a maximum remote access counter value (in-house registration) 5803, a maximum remote access counter value (out-of-house registration) 5804, a maximum simultaneous access number 5105, maximum simultaneous access number 5106, a remote access password 5107, a maximum remote access password validity period 5901 and an unregistered remote access password validity period 5902.

The maximum remote access password validity period 5901 represents a validity period of the remote access password 5107. The unregistered remote access password validity period 5902 represents a validity period of the remote access password 5107 when, with the remote access password 5107 already registered, the remote access device has yet to be registered from out of house. In other respects the management table 5900 is similar to the management table 5800.

The provision of the maximum remote access password validity period 5901 in the management table 5900 improves security because it deletes from the table the information of devices that have passed a predetermined time after registration, without requiring the associated content to be moved. Further, the provision of the unregistered remote access password validity period 5902 limits the period in which the remote access devices can be registered from out of house, thus blocking repetitive attempts by unspecified users to register remote access devices from out of house, which in turn improves the security.

When the management table 5900 is used in the remote registration processing S1400 executed from out of house, the remote access password registration step of S1401 allows the user in the user's house 1 to make a remote access password setting instruction to the content transmitter apparatus 100 through the input processing portion 107.

The device information management portion 109 of the content transmitter apparatus 100 sets the remote access password, that was requested to be set by the user instruction, in the remote access password 5107 of the management table 5900. Further, the device information management portion 109 registers the maximum remote access password validity period 5901 and the unregistered remote access password validity period 5902 with the time management portion 120 so that it issues a notification when these validity periods are reached.

Upon receiving the notification from the time management portion 120 that the unregistered remote access password validity period 5902 has been reached, the device information management portion 109 of the content transmitter apparatus 100 refers to the remote access device (out-of-house registration) information table 5700 to check the presence or absence of the registered device. If the registered device is not found, the remote access password 5107 is deleted from the management table 5900.

If on the other hand the registered device is found in the remote access device (out-of-house registration) information table 5700, the device information management portion 109 does nothing. Further, when notified from the time management portion 120 that the maximum remote access password validity period 5901 has been reached, the device information management portion 109 of the content transmitter apparatus 100 deletes the remote access password 5107 from the management table 5900.

As described above, based on the maximum remote access password validity period 5901 in the management table 5900, the remote access password that has passed a predetermined time after registration is deleted to enhance the security. Furthermore, the remote access password that has passed a predetermined time after registration but whose remote access device has remained unregistered is deleted, based on the unregistered remote access password validity period 5902. This makes it possible to limit the period in which the remote access device can be registered from out of house, blocking repetitive attempts for remote access registration by unspecified users.

The period management may also be done by using the relative time from registration measured with the timer 1091, rather than using the time managed by the time management portion 120. In that case, as with the in-house counter value, what needs to be done involves setting the maximum value of the counter in the management table and adding to the table of device information an item of counter value representing the validity period of password. Furthermore, rather than using the time as the password validity period, the number of times that content has been viewed may be used in applying limitations.

By deleting the remote access password 5107 according to the maximum remote access password validity period 5901 and at the same time deleting from the remote access device (out-of-house registration) information table 5700 the device information registered through the password of interest, it is possible to manage the remote access devices in connection with the registered password validity periods, deleting useless registration information.

[Embodiment 7]

In the preceding embodiment, when remote access devices are registered from out of house using a password, the password applies commonly to all registered devices. In this embodiment, a procedure will be described for a case in which a remote access password is set for each registered device.

FIG. 21 shows an example of remote access device (out-of-house registration) information table 7000 in the device information 6000 stored in the device information registration portion 1093 of FIG. 4 when the remote access password is set for every registered device.

The remote access device (out-of-house registration) information table 7000 comprises an ID 5201, device ID 5202, address information 5203, remote access key 5205, remote access counter value 5701, password 7001, password validity period 7002, and access state 5206. The password 7001 is a remote access password for a device ID registered in the device ID 5202. The password validity period 7002 represents a validity period of the password 7001.

In the remote access password registration procedure S1401 of FIG. 14 that uses this table, when the user in user house 1 gives a device ID and a remote access password setting instruction for the device ID to the content transmitter apparatus 100 through the input processing portion 107, the device information management portion 109 of the content transmitter apparatus 100 sets the device ID in the device ID 5202, as shown at a record (7012) whose ID 5201 in the remote access device (out-of-house registration) information table 7000 is 2. It also sets the remote access password, which was requested to be set, in the password 7001, sets the predetermined validity period of the remote access password in the password validity period 7002, and updates the access state to "unregistered".

Further, in the remote access user confirmation steps (S1413 to S1414) of FIG. 14, the device information management portion 109 checks whether the device ID agrees with the registered one, in addition to the check on the remote access password for the content receiver apparatus 200.

In the update table of device information operation S1417 of FIG. 14, the device information management portion 109 of the content transmitter apparatus 100, as shown at a record (7011) whose ID 5201 value is 1, registers the address information, exchanged remote access key and remote access counter value and sets "stop" in the access state 5206.

By using the remote access device (out-of-house registration) information table 7000 of FIG. 21 and managing the password for each device ID, limitations can be put on devices that are permitted to make an access, allowing the user to view content from out of house without exceeding a range of personal use of content.

[Embodiment 8]

This embodiment describes a case where the remote access device information registered with the table of device information 5200 or the remote access device (out-of-house registration) information table 5700 is deleted from out of house.

FIG. 20 shows an example of remote access registration information deletion processing S2000 when the content receiver apparatus 200 deletes, from outside the house, remote access device information registered with the table of device information 5200 or the remote access device (out-of-house registration) information table 5700.

The device authentication processing portion 108 of the content receiver apparatus 200 transmits a registration information deletion request to the content transmitter apparatus 100 (S2001). The registration information deletion request includes the device ID and password of the content receiver apparatus 200. Further, if information with which the content transmitter apparatus 100 verifies the device ID of the content receiver apparatus 200 is also included, the remote access device information can be prevented from being deleted by unauthorized devices.

The device information management portion 109 of the content transmitter apparatus 100, upon receiving the registration information deletion request from the content receiver apparatus 200, checks if the password contained in the received request agrees with the remote access password in the management table 5300, 5800 or 5900 and transmits a receipt confirmation to the content receiver apparatus 200 (S2002). If the password fails to match, the device information management portion 109 of the content transmitter apparatus 100 aborts the procedure without deleting the registered device information.

After transmitting the receipt confirmation, the device information management portion 109 of the content transmitter apparatus 100 deletes information about the device corresponding to the received device ID from among the devices registered with the table of device information 5200 or remote access device (out-of-house registration) information table 5700.

The deletion of registered device information from the content transmitter apparatus 100 according to the procedure described above allows the user at a visited place, who finds that the content transmitter apparatus 100 has device registrations to its capacity and can no longer accept new registration, to delete registered information about devices not in use so as to register a new device.

[Embodiment 9]

This embodiment describes an example procedure for acquiring information about access destination that is to be used in the remote registration processing.

FIG. 23 shows an example of device information 23000 of the content transmitter apparatus 100 that supports remote accesses. The device information 23000 of the content transmitter apparatus 100 that supports remote accesses includes information shown at 23001. The remote access information 23001 comprises remote access support information 230011, access destination information for remote access device in-house registration 230012 and access destination information for remote access device out-of-house registration 230013.

The remote access support information 230011 indicates whether the content transmitter apparatus 100 supports remote accesses.

The access destination information for remote access device in-house registration 230012 describes the IP address and port number of the content transmitter apparatus 100 when the remote access device registration is performed from inside the house.

The access destination information for remote access device out-of-house registration 230013 describes the IP address and port number of the content transmitter apparatus 100 when a remote access device is registered from out of house. The IP address described here may be a host name.

By adding to the device information the remote access support information, the access destination information for remote access device in-house registration and the access destination information for remote access device out-of-house registration, the content receiver apparatus 200 can detect the content transmitter apparatus 100 on the network and at the same time acquire information necessary for the device registration.

Further, describing both information—access destination information for remote access device in-house registration and access destination information for remote access device out-of-house registration—as the remote access information, it is possible to make access destinations for the in-house and out-of-house registration independent of each other, securing independence between different registration procedures and enhancing security. For this purpose, different access port numbers are used for the in-house registration and the out-of-house registration, as shown at 230012 and 230013 of FIG. 23. When packets for out-of-house registration are received, i.e., when an access is made to 230013, the filtering through TTL is not done but only the registration packet is accepted.

On the other hand, when packets for the in-house registration are received, i.e., when an access is made to 230012, the filtering through TTL is done and the packets for the normal authentication procedure S600 and the packets for acquiring the state of the content transmitter apparatus 100 are also accepted.

FIG. 31 shows an example of a packet monitoring table 9100 used when the communication processing portion of the content transmitter apparatus performs the filtering based on TTL for each port number. The packet monitoring table 9100 comprises an ID9101, a port number 9102 and a TTL limit 9103. The ID9101 represents a registration number of a record. The port number 9102 represents a destination port number of the received packet of TCP or UDP being monitored.

The TTL limit 9103 represents an upper limit of TTL in the filtering operation that is applied to the packets received at the port set in the port number 9102. This limit takes values from 0 to 255. When it is 0, the TTL limitation or filtering is not performed. For example, as shown at a record 9111 whose ID9101 value of FIG. 31 is 1, when the destination port number of a received packet is 53219, if the TTL value of the received packet is greater than 3, the received packet is discarded.

Further, in the case of a record 9112 whose ID 9101 value is 2, if the destination port number of the received packet is 53220, the filtering based on the TTL value of the received packet is not performed. The records of this table may be registered statically or they may be dynamically registered when in use.

Figure 32:
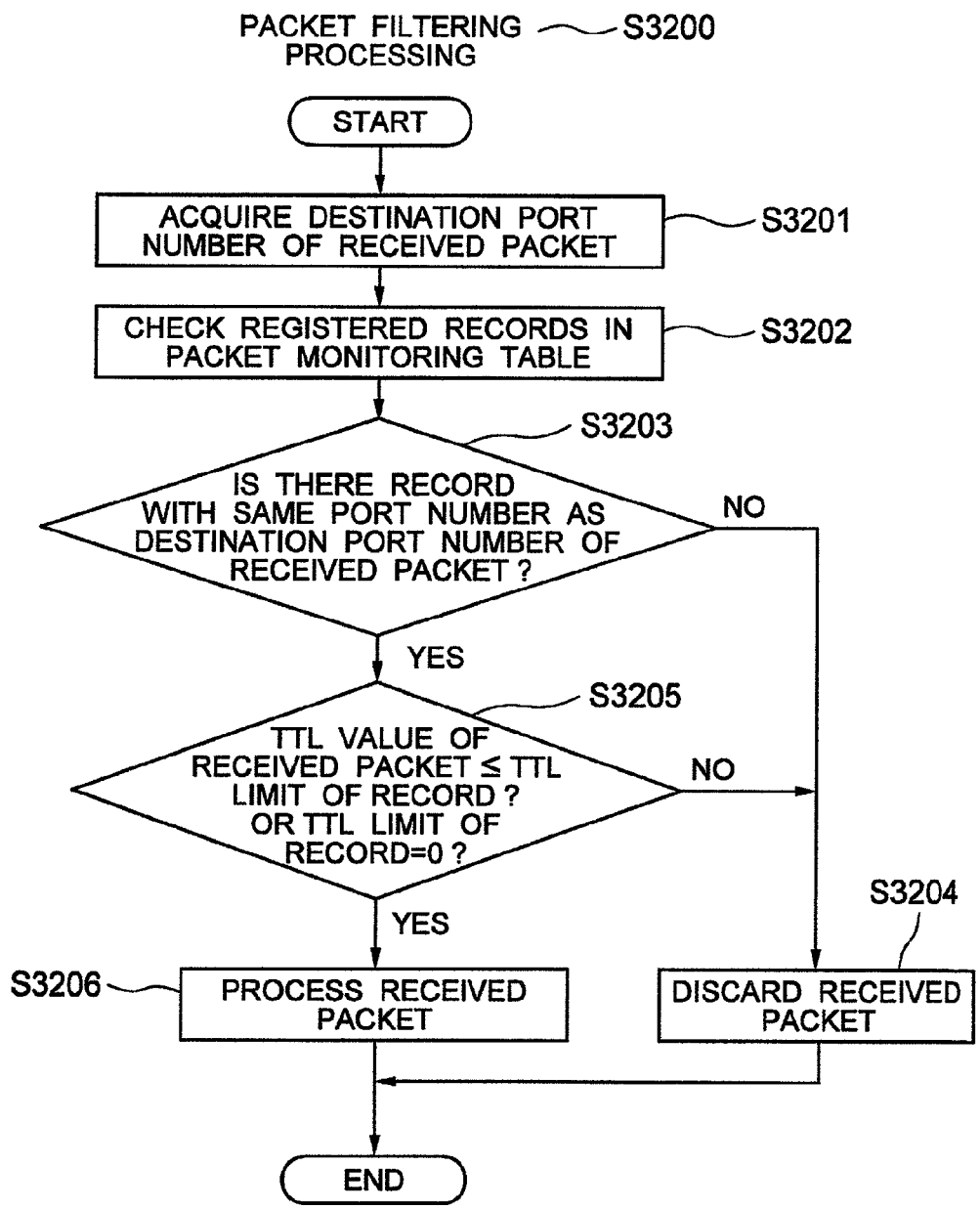
FIG. 32 shows an example of packet filtering procedure S3200 when filter is performed for each port number by using TTL.

FIG. 32 shows an example of a packet filtering procedure S3200 when the TTL-based filtering is performed for each port number.

First, the communication processing portion 113 of the content transmitter apparatus 100 acquires the destination port number of the received packet (S3201). Next, it checks the packet monitoring table 9100 for registered records (S3202). If there is no record in the packet monitoring table 9100 whose port number 9102 matches the destination port number of the received packet (No branch in S3203), the communication processing portion 113 discards the received packet (S3204).

If, on the other hand, there is a record in the packet monitoring table 9100 with a port number 9102 that matches the destination port number of the received packet (Yes branch in S3203), the communication processing portion compares the TTL value of the received packet with the value of the TTL limit 9103 set in the record that has the same port number 9102 as that of the received packet. If the comparison finds that the TTL value of the received packet is greater than the TTL limit 9103 of the record (No branch in S3205), the communication processing portion discards the received packet (S3204) and aborts the procedure.

If, on the other hand, the TTL value of the received packet is equal to or less than the TTL limit 9103 of the record or if the value of the TTL limit 9103 of the record is 0 (Yes branch in S3205), the communication processing portion processes the received packet (S3206) and ends the procedure.

As described above, by setting the TTL limit value in the packet monitoring table for each port and by executing the packet filtering according to the setting, it is possible to sort accesses into the in-house access port and the remote access port. That is, an arrangement can be made such that when an access is made from inside the house, the filtering is performed by monitoring the TTL and that when an access comes from out of house, the filtering is not performed.

FIG. 22 shows an example of a device information acquisition processing S2200 for remote access device registration. When connected to the network of the user house 1, the controller 115 of the content transmitter apparatus 100 issues a network participation notification to the content receiver apparatus 200 (S2201).

The controller 115 of the content receiver apparatus 200, upon receiving the network participation notification from the content transmitter apparatus 100, issues a device information acquisition request to the content transmitter apparatus 100 (S2202). Upon receiving the device information acquisition request from the content receiver apparatus 200, the controller 115 of the content transmitter apparatus 100 returns a device information acquisition response including the device information shown at 23000 of FIG. 23 (S2204).

If, upon receiving the device information acquisition response from the content transmitter apparatus 100, the controller 115 of the content receiver apparatus 200 checks with the remote access support information 230011 of FIG. 23 and decides that the content transmitter apparatus 100 supports the remote access, the device authentication processing portion 108 of the content receiver apparatus 200 executes the remote access device registration operation S2204 between it and the content transmitter apparatus 100.

If the content receiver apparatus 200 exists in the user house 1, it accesses the IP address and port specified by the access destination information for remote access device in-house registration 230012 of FIG. 23. If, on the other hand, the content receiver apparatus 200 exists in the visited place 2, it accesses the IP address and port specified by the access destination information for remote access device out-of-house registration 230013.

When accessed at the IP address and port specified by the access destination information for remote access device in-house registration 230012, the content transmitter apparatus 100 performs the remote registration processing S700 or the remote registration processing S1100.

When accessed at the IP address and port specified by the access destination information for remote access device out-of-house registration 230013, the content transmitter apparatus 100 performs the remote registration processing S1400.

By acquiring the remote access support information, the access destination information for in-house registration of remote access device and the access destination information for out-of-house registration of remote access device, all from the device information, the content receiver apparatus 200 can detect the content transmitter apparatus 100 on the network and at the same time obtain information necessary for the remote access device registration.

The content transmitter apparatus 100 can perform individual device registration procedures in different ways according to the access destination. Here an arrangement may be made such that, if the content receiver apparatus 200 that is making an access is confirmed from its IP address to not exist in the same subnet as the address of the access destination, the content transmitter apparatus 100 may decide that this is an illicit access, enhancing the security.

[Embodiment 10]

In the preceding embodiment, the remote registration processing is performed in advance and the content viewing from outside the house is made possible only through the registered devices. This embodiment will explain a procedure that allows the content viewing from out of house to be carried out with only the remote access device authentication and the key exchange without having to execute the remote registration processing in advance.

Figure 16:
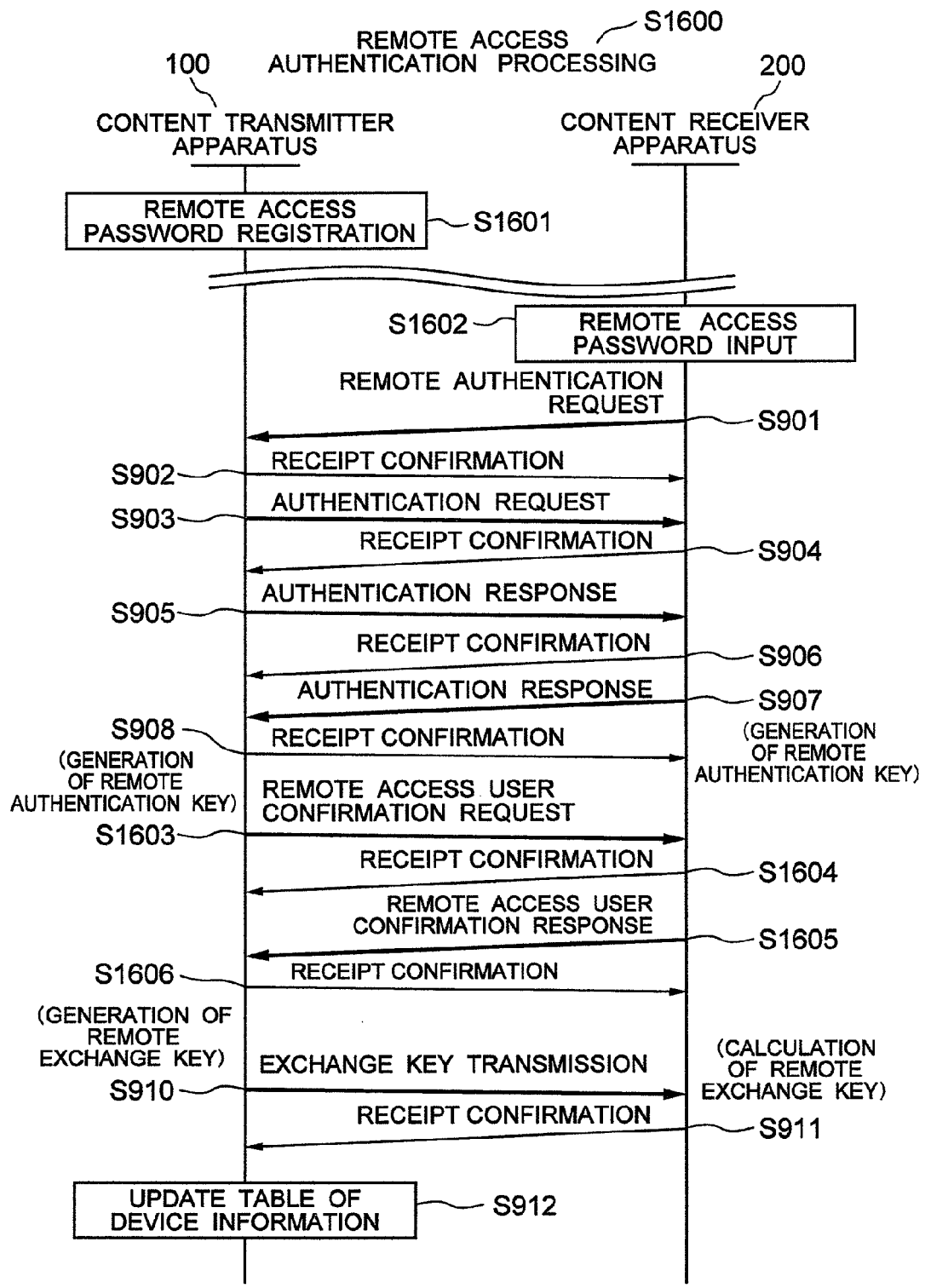
FIG. 16 is an explanatory diagram showing an example of a remote access device authentication sequence executed between the content receiver apparatus and the content transmitter apparatus.

FIG. 16 is a remote authentication processing S1600 executed between the content transmitter apparatus 100 and the mobile terminal (content receiver apparatus) 200 in the system configuration of FIG. 1. When this procedure is executed, the mobile terminal (content receiver apparatus) 200 is assumed to be in the visited place 2.

Here, the content transmitter apparatus 100 and the content receiver apparatus 200 do not monitor TTL of the received packets. Further, the content transmitter apparatus 100 and the content receiver apparatus 200, rather than setting the TTL of the packets to be transmitted to less than the in-house access limitation TTL value 8101 in the TTL table 8100, set the TTL to the remote transmission TTL set value 8102 in the TTL table 8100 so that the packets can reach the user house 1 from the visited place 2 via the Internet. The remote transmission TTL set value 8102 is assumed to be greater than the in-house access limitation TTL value 8101.

First, the user in the user house 1 gives a remote access password setting instruction to the content transmitter apparatus 100 through the input processing portion 107. Then the device information management portion 109 of the content transmitter apparatus 100 sets the requested remote access password in the remote access password 5107 of the management table 5300 of FIG. 15 (S1601).

FIG. 16 shows a remote authentication processing executed between the content transmitter apparatus 100 and the mobile terminal (content receiver apparatus) 200 in the system configuration of FIG. 1. During the execution of this procedure, the mobile terminal (content receiver apparatus) 200 is assumed to be at the visited place 2.

Next, the user enters a password through the input processing portion 107 into the content receiver apparatus 200 taken to the visited place 2 (S1602) and instructs it to start an authentication. Then the device authentication processing portion 108 of the content receiver apparatus 200 creates a remote access authentication request and transmits it through the communication processing portion 113 to the content transmitter apparatus 100 (S901). The procedure from S902 to S908 is similar to that shown in FIG. 9.

In the procedure to this point, the device authentication processing portion 108 of the content transmitter apparatus 100 and the device authentication processing portion 108 of the content receiver apparatus 200 have created and share a common authentication key.

Next, the content transmitter apparatus 100, to check that the request from the content receiver apparatus 200 has come from the user, transmits a remote access user confirmation request to the content receiver apparatus 200 (S1603).

The device authentication processing portion 108 of the content receiver apparatus 200, upon receiving the remote access user confirmation request, transmits an receipt confirmation to the content transmitter apparatus 100 (S1604). And it creates a remote access user confirmation response, which includes the remote access password entered by the user at S1402 and encrypted by the common authentication key, and transmits it to the content transmitter apparatus 100 (S1605).

The device authentication processing portion 108 of the content transmitter apparatus 100, upon receiving the remote access user confirmation response, looks up the management table 5300. If the password included in the transmitted information agrees with the password set at S1601, it performs the same steps from S910 to S912 of FIG. 9. If the password included in the transmitted information differs from the password set at S1401, it aborts the processing and ends the device authentication processing.

In the above we have explained the remote authentication processing that is executed between the content transmitter apparatus 100 and the content receiver apparatus 200 before the content transmission to a device located outside house is initiated.

If, in the content viewing from out of house processing S1000 of FIG. 10, the remote authentication processing S1600 is used instead of the remote authentication processing S900, the user at the visited place 2 can view, through the content receiver apparatus 200, content accumulated in the recording portion 111 of the content transmitter apparatus 100, without having to perform the device registration in advance.

Only if the execution of the content viewing from out of house processing S1000 from S1601 to S1606 shown in FIG. 10 has checked that the devices mutually recognize themselves as authorized devices and that the passwords they manage agree, and if these devices successfully share the exchange key, is it possible to deliver content from the content transmitter apparatus at house to the content receiver apparatus outside house. Now the user can safely view content stored inside the house through the content receiver apparatus located outside house, without exceeding the range of personal use of content.

[Embodiment 11]
(Arrangement to Make the Challenge-Response Sequence During Remote Access Device Authentication Equal to that of Normal Device Authentication)

In the preceding embodiment, the remote authentication processing is performed as follows. At the start of device authentication, a remote authentication request, different from the authentication request in the normal device authentication processing, is transmitted. This embodiment explains a remote authentication processing that is executed by using the same authentication request as that of the normal device authentication processing.

Figure 25:
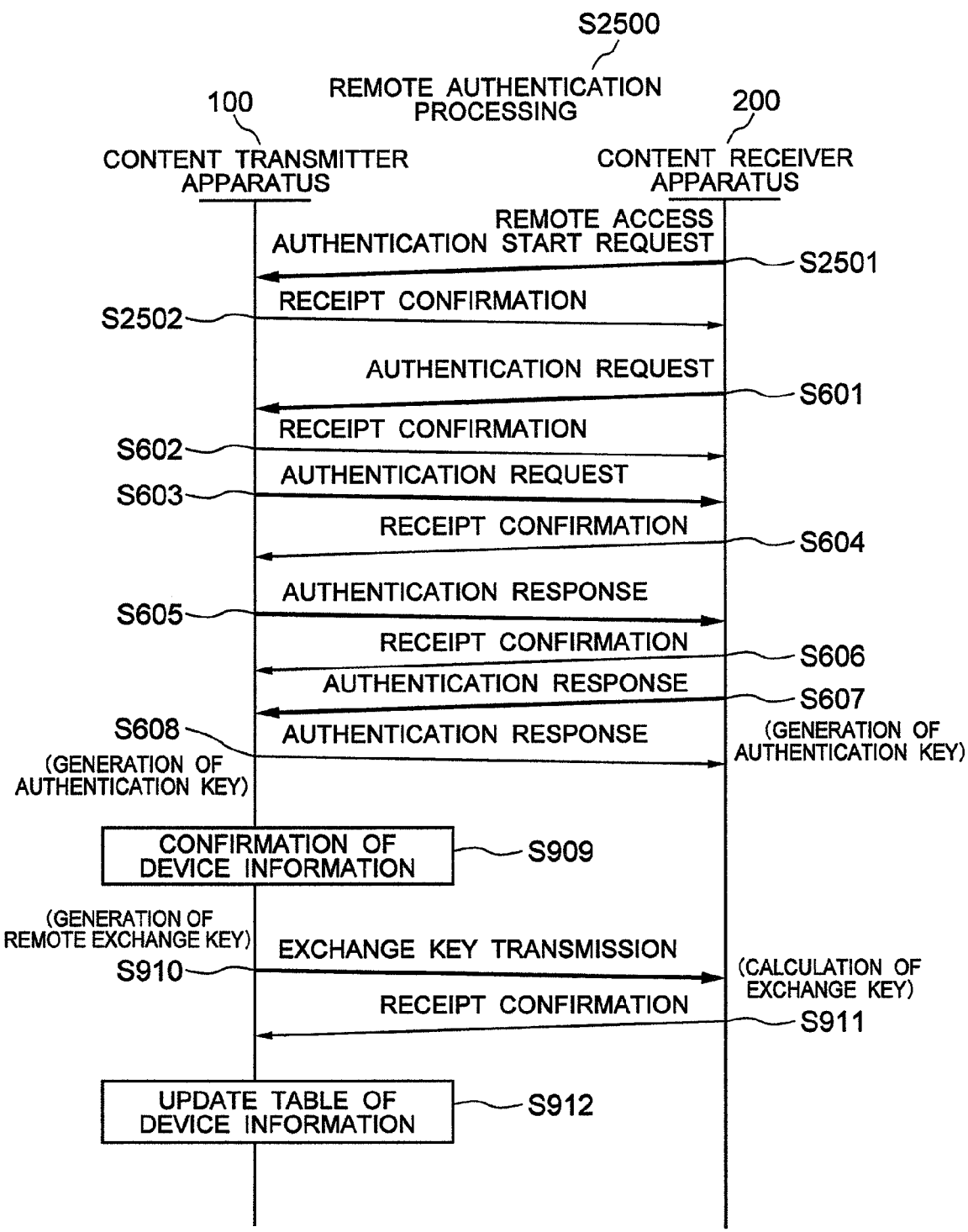
FIG. 25 shows a remote authentication processing executed between the content transmitter apparatus 100 in user house 1 and the content receiver apparatus 200 at a visited place 2 when the remote authentication processing is performed by using the same authentication request as used in the normal device authentication processing.

FIG. 25 shows a remote authentication processing S2500 that is executed between the content transmitter apparatus 100 at the user house 1 and the content receiver apparatus 200 located at the visited place 2 by using the same authentication request as the one used in the normal device authentication processing. It is assumed that, prior to this authentication procedure, the remote registration processing S700 or S1100 has been done between the content transmitter apparatus 100 and the content receiver apparatus 200.

Here, the content transmitter apparatus 200 does not monitor TTL of the received packets. Further, the content receiver apparatus 200, rather than setting the TTL of the packets to be transmitted to less than the in-house access limitation TTL value 8101 in the TTL table 8100, sets the TTL to the remote transmission TTL set value 8102 in the TTL table 8100 so that the packets can reach the user house 1 from the visited place 2 via the Internet.

First, the device authentication processing portion 108 of the content receiver apparatus 200 creates a remote access authentication start request and transmits it to the content transmitter apparatus 100 (S2501). The device authentication processing portion 108 of the content transmitter apparatus 100, upon receiving the start request, makes setting so that the monitoring of TTL received in the TCP connection will no longer be carried out from now on. At the same time it sets the TTL of the packet to be transmitted to the remote transmission TTL set value 8102 of the TTL table 8100. It further transmits a receipt confirmation to the content receiver apparatus 200 (S2502).

Here, the remote access authentication start request may include a device ID of the content receiver apparatus 200 and a calculation value created by using the remote access key exchanged at S700 or S1100. The content transmitter apparatus 100 may also calculate the similar value and, if there is a match, return a receipt confirmation. This process makes more stringent the condition under which the TTL monitoring is not performed, allowing the remote authentication procedure to be initiated more safely.

Alternatively, rather than confirming the match between the calculation values from the remote access key, the content transmitter apparatus 100 may check that the device ID included in the remote access authentication start request is registered with the table of device information 5200, before returning the receipt confirmation. This also makes it possible to safely initiate the remote authentication procedure by not performing the TTL monitoring on only the communications with those devices that have their device IDs registered.

Next, in a procedure similar to the steps S601 to S608 of the normal device authentication processing S600, the device authentication and the creation of authentication key are carried out. It is noted, however, that, unlike the normal device authentication processing S600, the content transmitter apparatus 100 and the content receiver apparatus 200 in this procedure do not perform the TTL monitoring on the packets being received. The procedure performed at the time of packet reception will be described later.

The content transmitter apparatus 100 and the content receiver apparatus 200, rather than setting the TTL of the packets to be transmitted to less than the in-house access limitation TTL value 8101 of the TTL table 8100, set the TTL to the remote transmission TTL set value 8102 of the TTL table 8100 so that the packets can reach the user house 1 from the visited place 2 via the Internet.

Next, in a procedure similar to the steps S909 to S912 of the remote authentication processing S900, the remote exchange key is exchanged. Here, as a key with which to encrypt the remote exchange key, the authentication key is used.

FIG. 33 shows an example of a connection management table 9200 that is used by the device authentication processing portion of the content transmitter apparatus when it performs the TTL-based filtering on the device authentication packets for each TCP connection.

The connection management table 9200 comprises an ID 9201, a socket descriptor 9202 and a TTL limit 9203. The ID 9201 represents a registration number of a record. The socket descriptor 9202 is an identifier to uniquely identify a TCP connection in the content transmitter apparatus.

The TTL limit 9203 represents an upper limit of TTL in the filtering operation that is applied to the device authentication packet received on the TCP connection specified by the socket descriptor 9202. This takes a value ranging from 0 to 255. If this value is 0, it means that the TTL limitation or filtering is not performed. Take for example a record 9211 in FIG. 33 whose ID 9201 value is 1. In the case of a connection whose socket descriptor 9202 value is 2, if the TTL value of the received packet is greater than 3, the device authentication packet will be discarded.

Take another record 9212 whose ID 9201 value is 2. In a connection with a socket descriptor 9202 value of 4, the TTL-based filtering will not be performed on the received device authentication packet. As for still another record 9213 whose ID 9201 value is 3, in a connection having a socket descriptor 9202 value of 6, the connection will be established and a record newly registered, but the TTL limit 9203 will not be set. That is, the registration of the record with this table will be done when the connection is established.

Figure 34:
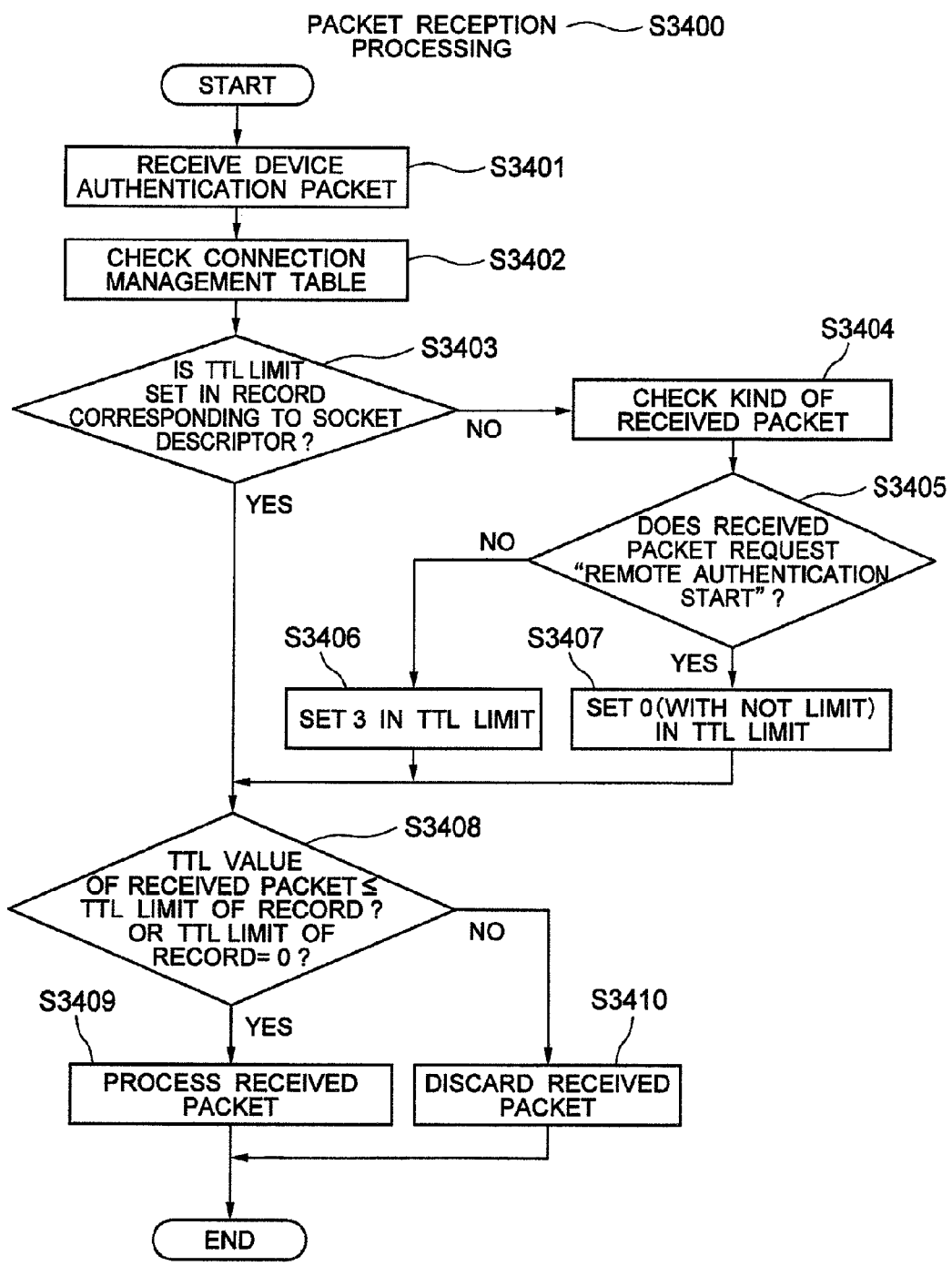
FIG. 34 shows an example of packet reception processing S3400 when the device authentication packets are filtered by using the connection management table.

FIG. 34 shows an example of a packet reception processing S3400 executed when the device authentication packets are filtered by using the connection management table. First, the device authentication processing portion 108 of the content transmitter apparatus 100 receives a device authentication packet through the communication processing portion 113 (S3401). Next, it checks the connection management table 9200 (S3402) to see if a TTL limit value is already registered in the record that matches the socket descriptor of the connection that has received the packet (S3403).

If the TTL limit value is already set in the record (Yes branch in S3403), it is checked whether the TTL value of the received packet is less than the set TTL limit value, or that the set TTL limit value is 0 (S3408). If so (Yes branch in S3408), the device authentication processing portion 108 of the content transmitter apparatus 100 processes the received packet according to the kind of the packet (S3409) before ending the process.

If, on the other hand, the TTL value of the received packet is greater than the set TTL limit value (No branch in S3408), the received packet is discarded (S3410), aborting the procedure.

If the TTL value is not yet set in the record (No branch in S3403), the device authentication processing portion 108 of the content transmitter apparatus 100 checks the kind of the received packet (S3404). If the received packet is a remote access authentication start request issued at S2501 of FIG. 25 (Yes branch in S2405), 0 is set in the TTL limit 9203 of the record in the connection management table 9200 (S3407).

If the received packet is not the remote access authentication start request issued at S2501 of FIG. 25 (No branch in S2405), 3 is set in the TTL limit 9203 of the record in the connection management table 9200 (S3406) and then S3408 and subsequent steps are executed.

As described above, by setting a TTL limit value in the connection management table according to the kind of the device authentication packet received first, desired TTL limitations can be applied depending on whether the access is made from inside house or from out of house. That is, for accesses from inside the house, the filtering may be performed on the received device authentication packet by monitoring the TTL; and, for accesses from outside the house, the same filtering may not be performed.

As described above, by setting a desired TTL limit for each connection and transmitting a remote access authentication start request at the start of the authentication to explicitly notify the start of the authentication, the content transmitter apparatus can be made to stop the TTL monitoring from that point on and to change the TTL value set in the device authentication packet to be transmitted. As a result, the device authentication can be done and the authentication key shared by using the authentication request and authentication response used in the normal device authentication processing S600.

While in this embodiment the kind of the received packet has been used to determine the application of TTL-based limitation, the port number that transmits and receives packets may be used instead in the table and procedure of FIG. 31 and FIG. 32 to determine the application of the limitation. If the application of limitation is decided by the port number, there is no need to transmit or receive the remote access authentication start request, allowing for a quick initiation of authentication procedure.

[Embodiment 12]
(Handling of Remote Access Flag During To-Inside-House Transmission)

This embodiment describes an example case where, when content is delivered from a content transmitter apparatus to a content transmitter and receiver apparatus in the user house, a remote access flag is used to control a retransmission of the content to out of the house that the content transmitting/receiving device has received.

The remote access flag is an identifier that determines whether or not to permit the content transmitter and receiver apparatus to retransmit the content it has received to the outside of house. To control the content retransmission from the content transmitter and receiver apparatus by using the remote access flag means that if 1 is set in the remote access flag, the content that the content transmitting/receiving device has received is treated as retransmittable to out of the house and is retransmitted to out of the house as situation demands. If the remote access flag is set with 0, it is decided that the content received by the content transmitter and receiver apparatus is not permitted to be retransmitted to the outside, blocking the remote retransmission of the content.

Figure 35:
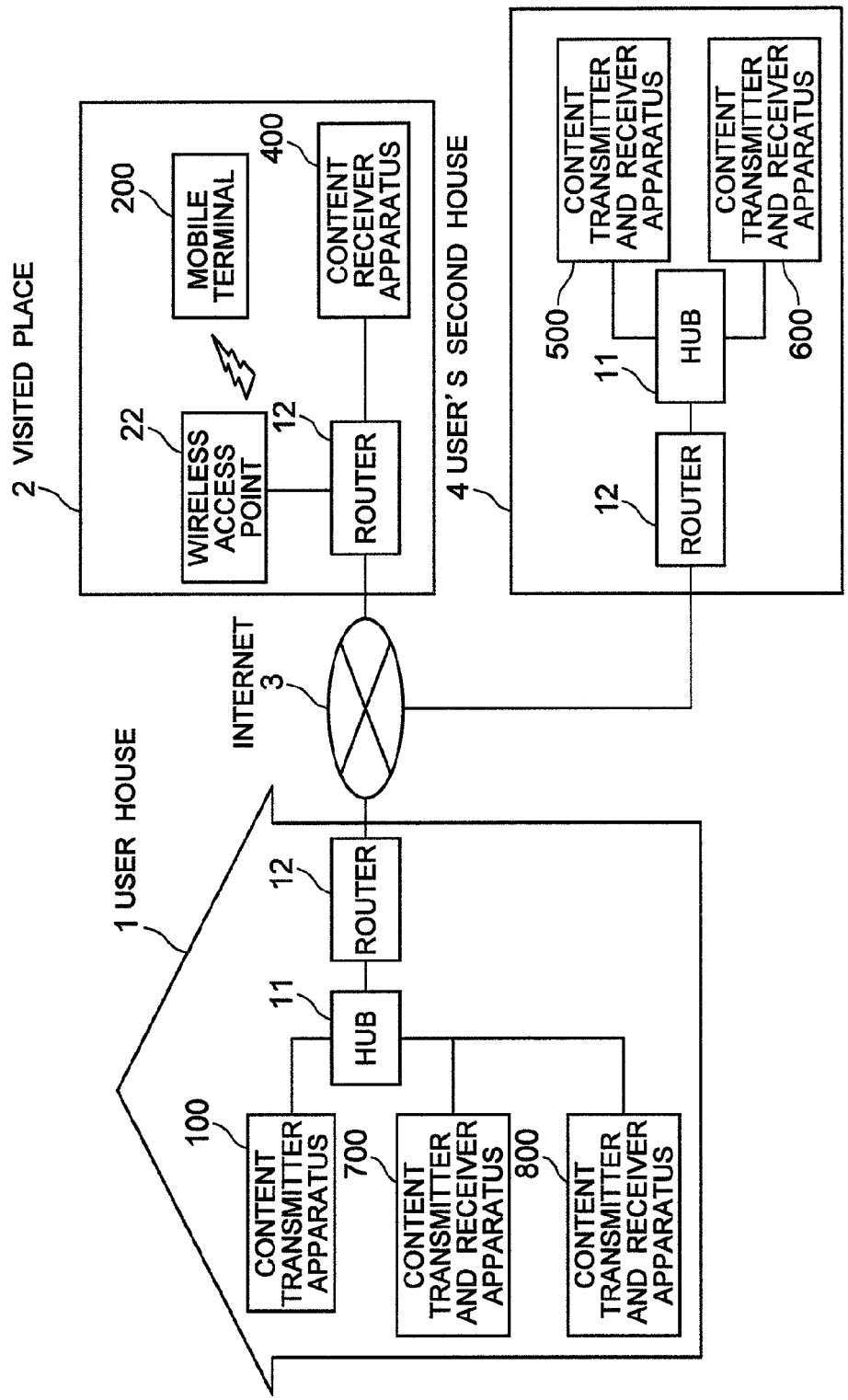
FIG. 35 is a configuration diagram showing an example of system configuration and a flow of content.

FIG. 35 shows an example of a system configuration in this embodiment.

In the user house 1, the content transmitter apparatus 100 and the content transmitter and receiver apparatus 700, 800 are connected through LAN cables to the network hub device 11, which is connected to the router 12. The router 12 is connected to the Internet 3 through a modem and an opto-electric converter. In other respects, this system is similar to FIG. 1. The content transmitter and receiver apparatus 700 and 800 are similar in configuration to the content receiver apparatus 200.

Figure 40:
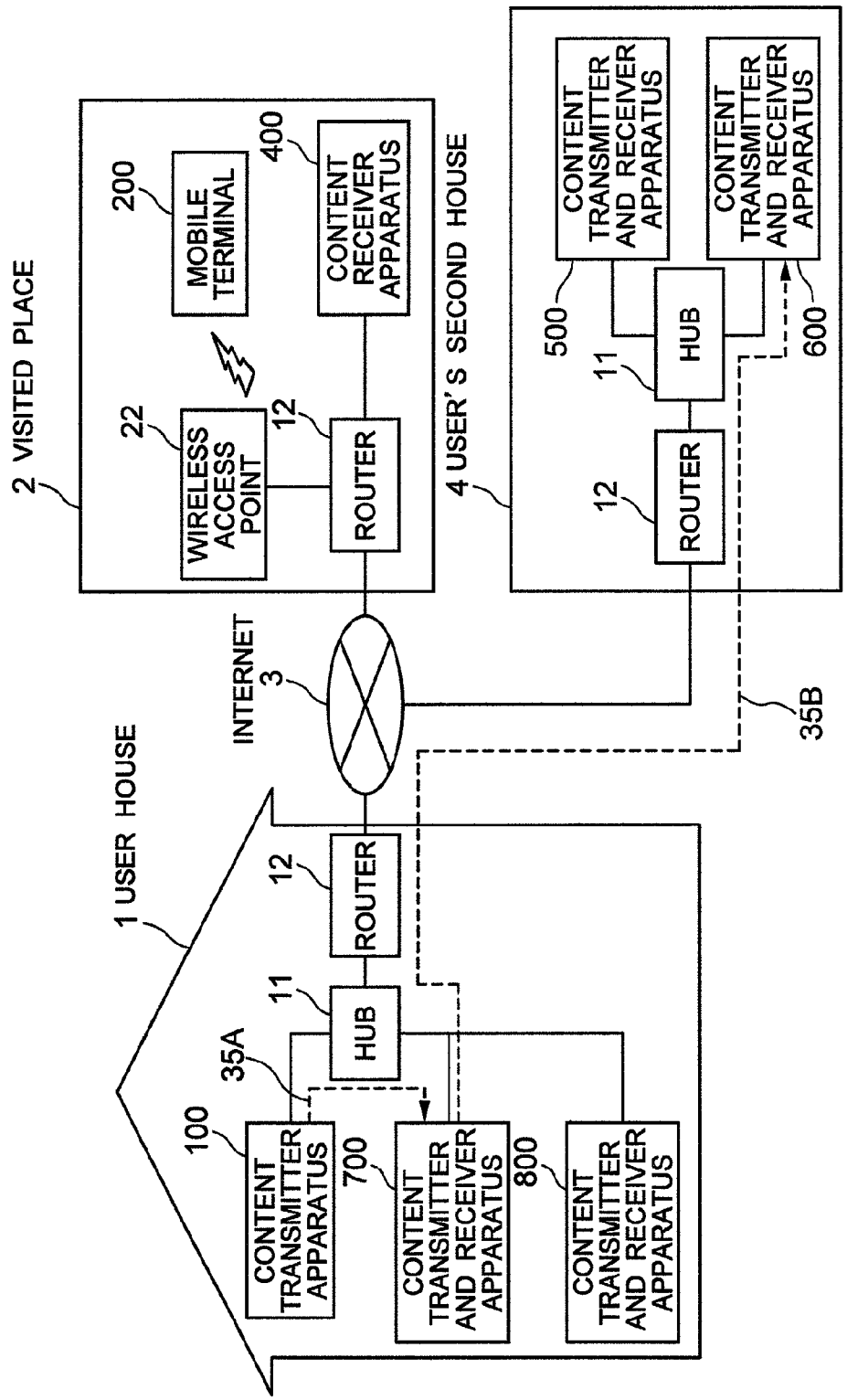
FIG. 40 is a configuration diagram showing an example flow of content in embodiment 12.

FIG. 40 shows how content flows in this example. In the user house 1, the content transmitter apparatus 100 delivers content to the content transmitter and receiver apparatus 700 (35A), which then delivers the content it has received further to the content transmitter and receiver apparatus 600 located at user's second house 4, which is outside the first user house (35B). Here, the retransmission to out of the house refers to a retransmission of content from the content transmitter and receiver apparatus 700 to the content transmitter and receiver apparatus 600.

FIG. 28 shows an example of a retransmission condition table 9000 that stipulates the conditions under which the content received from the content transmitter apparatus is permitted to be retransmitted to the outside of house. This table is used by the content transmitter apparatus 100. The retransmission condition table 9000 comprises two conditions—copy control information 9001 and input media 9002. The copy control information 9001 is classified into such categories as "Copy free (permitted to be copied without limit)", "Copy free with EPN asserted (permitted to be copied without limit but with output protection), "Copy one generation (permitted to be copied for one generation)", "No more copies (re-copy prohibited)" and "Copy never (copy prohibited)".

The input media 9002 has "broadcast wave", "HDD", "optical disc 1", "optical disc 2", "semiconductor memory", "IP broadcast" and "in-house network". The input media shows through which route the content to be transmitted has been entered. Of the input media, the "broadcast wave" indicates that the content has been entered from an antenna of the content transmitter apparatus 100; the "HDD", "optical disc 1", "optical disc 2" and "semiconductor memory" indicate that the content has come from the recording portion of the content transmitter apparatus; and the "IP broadcast" and "in-house network" indicate that the content has come from the digital input/output terminal 114 of the content transmitter apparatus 100.

When the copy control information 9001 is used, the copy control information 9001 and the input media 9002 are checked to see if the content of interest is permitted to be retransmitted to out of the house. For example, if the copy control information 9001 is "Copy free" and the input media 9002 is "broadcast wave", it is decided that the retransmission of the content to out of the house is "permitted". It is noted that, if the input media is "in-house network", this table is not used.

The use of the copy control information and input media of the content in the retransmission condition table 9000 in determining the remote retransmission condition makes it possible to perform an appropriate remote retransmission control as the content provider has intended.

FIG. 29 shows an example of an in-house access table of device information 7100 managed by the device information management portion 109 of the content transmitter apparatus 100 when the remote retransmission of content from the content receiver apparatus is controlled by using the remote access flag. The in-house access table of device information 7100 is a table in which to register devices designed to make in-house accesses. This table comprises an ID 5201, device ID 5202, address information 5203, in-house access counter value 5204, access state 5206 and remote retransmission controllability 7101.

The remote retransmission controllability 7101 indicates whether the registered content receiver apparatus is remote retransmission-controllable by the remote access flag. If the content receiver apparatus is remote retransmission-controllable, "controllable" is set. If not, "not controllable" is set. In other respects, this table is similar to the in-house access table of device information 5500.

By adding the remote retransmission controllability to the in-house access table of device information, the content transmitter apparatus can manage the remote retransmission controllability of the content receiver apparatus and, at time of content transmission, set the remote access flag appropriately.

Figure 26:
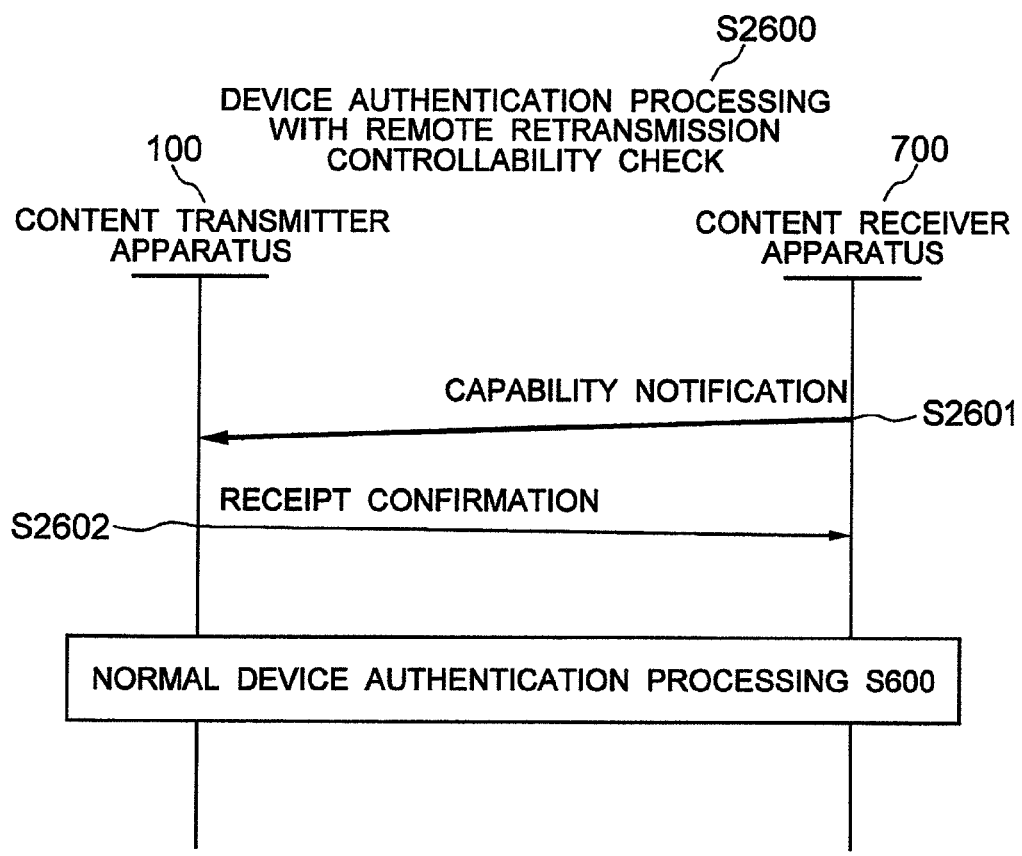
FIG. 26 is an example of a device authentication processing with a remote retransmission controllability check S2600 that checks whether the content receiver apparatus is capable of controlling a remote retransmission according to a remote access flag when content is delivered from the content transmitter apparatus in user house 1 to the content receiver apparatus inside the same house.

FIG. 26 shows an example of a Device authentication processing with remote retransmission controllability check S2600. This procedure checks whether, when the content transmitter apparatus 100 in the user house 1 delivers content to the content transmitter and receiver apparatus 700 in the same house, it is possible to control the remote retransmission with the content transmitter and receiver apparatus 700 using the remote access flag. That is, this procedure checks whether the content transmitter and receiver apparatus 700 has a capability of controlling the remote retransmission.

First, the device authentication processing portion 108 of the content transmitter and receiver apparatus 700 transmits a capability notification indicating the remote retransmission controllability to the content transmitter apparatus 100 (S2601). The content transmitter apparatus 100, upon receiving the capability notification, transmits its receipt confirmation to the content transmitter and receiver apparatus 700. Here, the capability notification may include random numbers and signature to prevent possible alteration or falsification.

Next, the normal device authentication processing S600 is executed between the content transmitter and receiver apparatus 700 and the content transmitter apparatus 100 to perform the device authentication and exchange the keys. In this embodiment, however, the update table of device information operation S621 in the content transmitter apparatus 100 uses the in-house access table of device information 7100 and sets the remote retransmission controllability 7101 of the content transmitter and receiver apparatus 700. If the content transmitter and receiver apparatus 700 notifies that it is capable of the remote retransmission control, the content transmitter apparatus 100 sets "controllable" in the remote retransmission controllability 7101.

When the content transmitter and receiver apparatus 700 notifies that it is not capable of the remote retransmission control, "not controllable" is set in the remote retransmission controllability 7101. Further, if the content transmitter and receiver apparatus 700 performs the normal device authentication processing S600 without issuing the capability notification, the remote retransmission controllability 7101 is also set with "not controllable".

By issuing the remote retransmission controllability from the content transmitter and receiver apparatus 700 to the content transmitter apparatus 100 prior to the device authentication, the content transmitter apparatus 100 can know the capability of the content transmitter and receiver apparatus 700 and, at time of content transmission, set an appropriate remote access flag.

Figure 27:
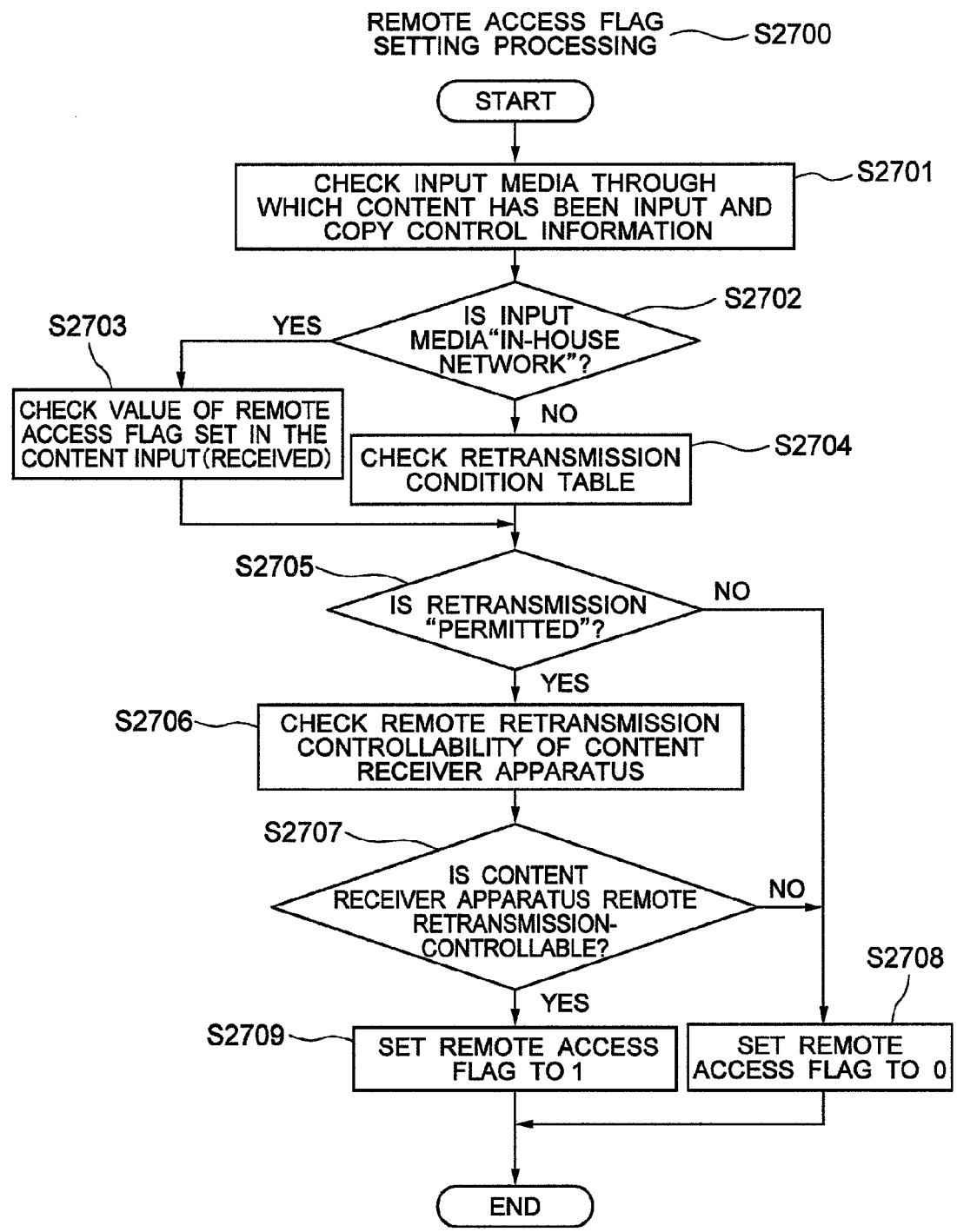
FIG. 27 shows an example of a remote access flag setting processing in the controller of the content transmitter apparatus.

FIG. 27 shows an example of a remote access flag setting operation S2700 by the controller 115 of the content transmitter apparatus 100. The controller 115 of the content transmitter apparatus 100 first checks the input media and copy control information of the content to be delivered (S2701). If the input media of the content to be delivered is "in-house network" (Yes branch in S2702), the controller 115 checks the value of the remote access flag set in the received content (S2703).

If, on the other hand, the input media is other than the "in-house network", the controller 115 checks the retransmission condition table 9000 (S2704). Next, the controller 115 of the content transmitter apparatus 100 checks the value of the remote access flag set in the received content or the retransmission condition table 9000 to see if the content requested to be transmitted is permitted to be retransmitted to out of the house (S2705).

If the retransmission is not permitted, i.e., the value of the remote access flag set in the received content is 0 or the value set in the retransmission condition table 9000 is "not permitted" (No branch in S2705), the controller 115 of the content transmitter apparatus 100 sets the remote access flag to 0 (S2705) before ending the procedure. If on the other hand the retransmission is permitted, i.e., the value of the remote access flag set in the received content is 1 or the value set in the retransmission condition table 9000 is "permitted" (Yet branch in S2705), the controller 115 of the content transmitter apparatus 100 checks the remote retransmission controllability 7101 of the content transmitter and receiver apparatus 700 in the in-house access table of device information 7100 (S2706).

Next, from the remote retransmission controllability 7101 of the content transmitter and receiver apparatus 700 in the in-house access table of device information 7100, a check is made as to whether the content transmitter and receiver apparatus 700 is remote retransmission-controllable (S2707). If the content transmitter and receiver apparatus 700 is found not controllable, i.e., the remote retransmission controllability 7101 is "not controllable" (No branch in S2707), the controller 115 of the content transmitter apparatus 100 sets the remote access flag to 0 before ending the processing. On the other hand if the device 700 is found controllable, i.e., the remote retransmission controllability 7101 is "controllable" (Yes branch in S2707), the controller 115 of the content transmitter apparatus 100 sets the remote access flag to 1 (S2709) before terminating the processing.

Setting the value of remote access flag based on both of the information—the content retransmission condition and the remote retransmission controllability of the content transmitter and receiver apparatus—allows for a more stringent control. Further, for the content receiver apparatus not capable of the remote retransmission control, the remote access flag is set to 0 before transmitting the content. This enables even the device not capable of interpreting the remote access flag to decrypt the content correctly for viewing.

Figure 30:
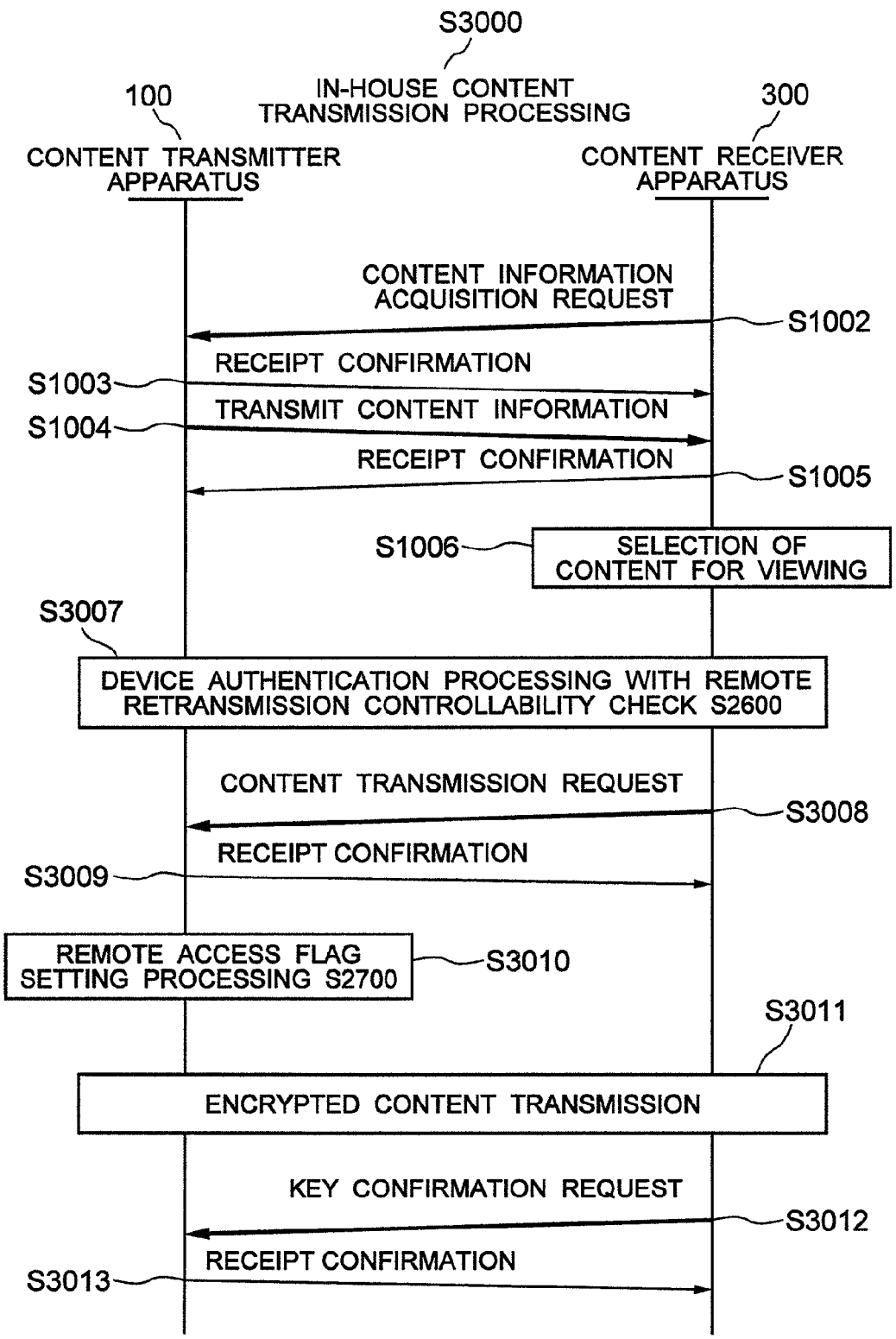
FIG. 30 shows an example of in-house content transmission processing executed between the content transmitter apparatus and the content receiver apparatus when the remote content retransmission of the content receiver apparatus is controlled by a remote access flag.

FIG. 30 shows an example of a in-house content transmission processing S3000 executed between the content transmitter apparatus 100 and the content transmitter and receiver apparatus 700 when the remote retransmission control on the content transmitter and receiver apparatus is performed using the remote access flag.

The procedure ranging from the content information acquisition request S1002 to the selection of content to be viewed S1006 needs to be performed in the same way as the content viewing from out of house processing S1000. Next, the Device authentication processing with remote retransmission controllability check S2600 is executed. The device authentication processing portion 108 of the content transmitter apparatus 100 registers the remote retransmission controllability of the content transmitter and receiver apparatus 700 with the in-house access table of device information 7100 (S3007).

The controller 115 of the content transmitter and receiver apparatus 700 transmits a content transmission request to the content transmitter apparatus 100 (S3008). Here the content transmission request may be a content viewing request or a content moving request. The delivery request may be attached with an ID to identify the exchange key received in the device authentication processing S2600. The controller 115 of the content transmitter apparatus 100 transmits a receipt confirmation in response to the content transmission request (S3009).

Next, the controller 115 of the content transmitter apparatus 100 performs the remote access flag setting operation S2700 (S3010). The controller 115 of the content transmitter apparatus 100 delivers to the content transmitter and receiver apparatus 700 the content that has been encrypted by the encryption/decryption processing portion 112 using the key shared in the device authentication processing S2600.

After the content transmission has started, the device authentication processing portion 108 of the content transmitter and receiver apparatus 700 transmits a key confirmation request to the content transmitter apparatus 100 at a desired timing (S3012). The device authentication processing portion 108 of the content transmitter apparatus 100, upon receiving the key confirmation request, transmits a receipt confirmation to the content transmitter and receiver apparatus 700 according to the result of confirmation (S3013).

The device authentication processing portion 108 checks whether the ID of the exchange key is correct. The device information updating portion 1092 sets and starts the timer 1091 in the device information management portion 109 so that notifications are issued periodically (e.g., at intervals of 1 or 10 minutes). The device authentication processing portion 108, using the exchange key, creates a common key to encrypt the content and sets it in the encryption/decryption processing portion 112.

While the encryption/decryption processing portion 112 encrypts the desired content read from the recording portion 111 or supplied from demultiplexer, the content transmitter apparatus 100 transmits the encrypted content in the format shown in FIG. 17 to the content transmitter and receiver apparatus 700 (S3011). At this time, the value determined by the remote access flag setting operation S2700 is set in the RA 170212 of the header part 17021 of the content transmission packet 1702.

Here, each time a notification comes from the timer 1091 during the content transmission, the device information updating portion 1092 updates the in-house access counter value 5204 of the in-house access table of device information 7100 (for example, by decrementing the counter value). When the in-house access counter value 5204 reaches 0, the information of the corresponding device is deleted from the in-house access table of device information 7100.

The device authentication processing portion 108 of the content transmitter and receiver apparatus 700 creates a common key for decrypting the content by using the remote exchange key and sets the common key in the encryption/decryption processing portion 112. Then the encryption/decryption processing portion 112 extracts the encrypted content from the payload of the format of FIG. 17, received via the communication processing portion 113, and decrypts it while at the same time decoding and outputting it to the display/speaker 105.

According to the procedure described above, more stringent remote retransmission control can be carried out by (1) having the content transmitter and receiver apparatus 700 notify the content transmitter apparatus 100 of the remote retransmission controllability, (2) having the content transmitter apparatus 100 set the remote access flag according to the remote retransmission controllability of the content transmitter and receiver apparatus 700 and the conditions specified in the retransmission condition table and (3) transmitting the encrypted content with the remote access flag value included in the content transmission packets. Further, for the content receiver apparatus not capable of the remote retransmission control, the remote access flag is set to 0 before transmitting the content. This enables even the device not capable of interpreting the remote access flag to decrypt the content correctly for viewing.

Here, being able to perform the remote retransmission control means that the content receiver apparatus can determine whether or not to execute the remote retransmission of the received content according to the remote access flag. It also means that, if the content receiver apparatus has received a remote access flag along with the content, the content receiver apparatus is able to attach the remote access flag to the content when it retransmits the received content to another content receiver apparatus in the user house.

Figure 36:
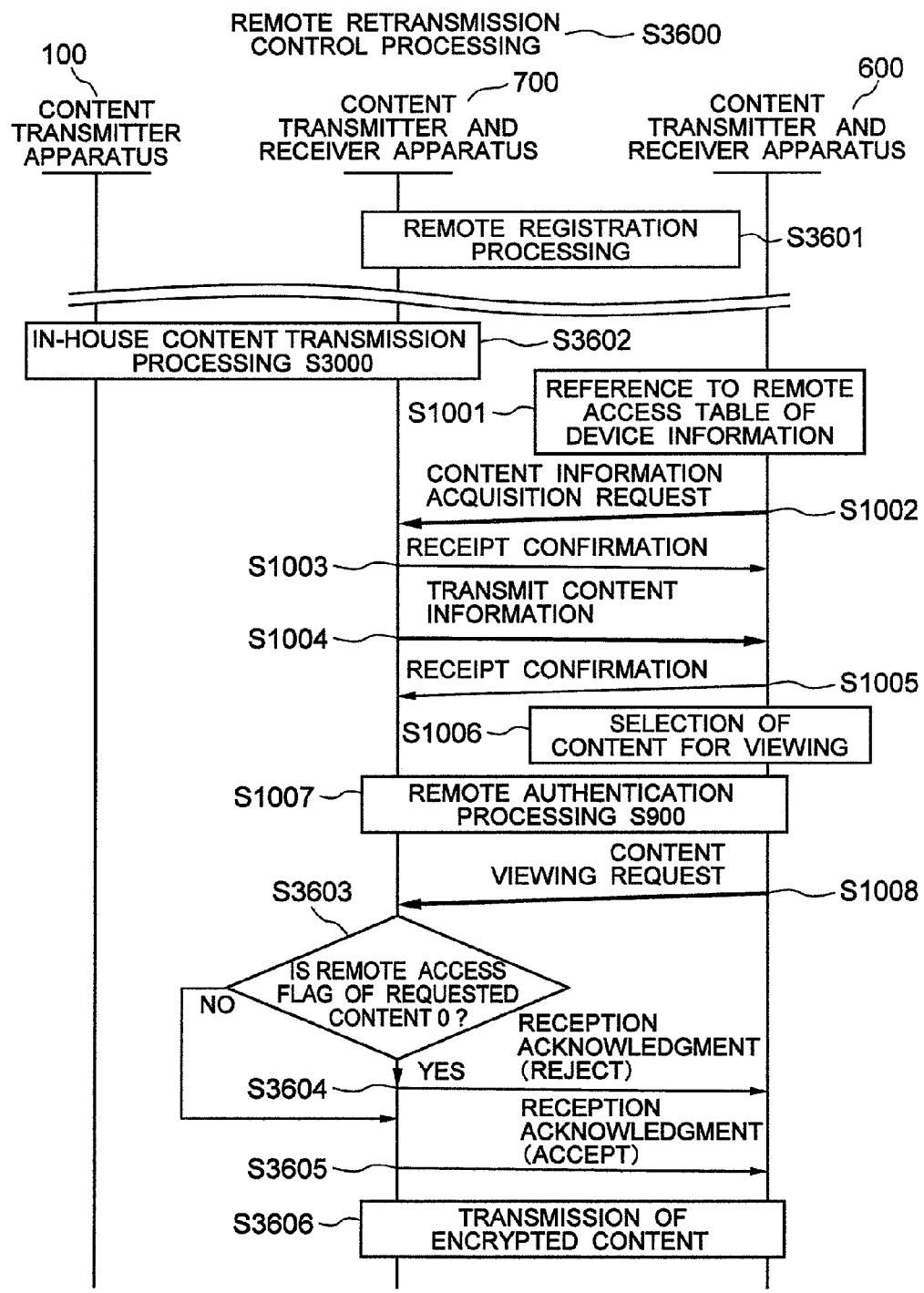
FIG. 36 shows an example procedure of retransmission control when the content, that was delivered from the content transmitter apparatus 100 in user house 1 to a content transmitter and receiver apparatus 700, is further retransmitted to a content transmitter and receiver apparatus 600 at a user's second house 4, which is outside the house.

FIG. 36 shows an example procedure for retransmission control when the content transmitter and receiver apparatus 700 in the user house 1 retransmits the content it has received from the content transmitter apparatus 100 (35A in FIG. 40) further to a content transmitter and receiver apparatus 600 located in second house 4 of the user's (35B in FIG. 40), which is outside the house 1.

Before executing this procedure, the content transmitter and receiver apparatus 700 and the content transmitter and receiver apparatus 600 perform one of the remote registration processing S700, S1100 and S1400 (S3601). Then, the in-house content transmission processing S3000 is carried out between the content transmitter apparatus 100 and the content transmitter and receiver apparatus 700 (S3602). Next, between the content transmitter and receiver apparatus 600 and the content transmitter and receiver apparatus 700, steps ranging from S1001 (reference to remote access table of device information) to S1008 (content viewing request) are performed in the same way as the procedure of FIG. 10.

Here it is assumed that the content selected is one that has begun to be delivered from the content transmitter apparatus 100 to the content transmitter and receiver apparatus 700 at step S3602. The controller 115 of the content transmitter and receiver apparatus 700 checks whether the remote access flag attached to the content requested by the content transmitter and receiver apparatus 600, i.e., the content received from the content transmitter apparatus 100, is 0 (retransmission prohibited) (S3603). If the remote access flag is found to be 0 (Yes branch in S3603), the controller 115 transmits a receipt confirmation indicating that the content viewing request is rejected (S3604).

If on the other hand the remote access flag is 1 (No branch in S3603), the controller 115 returns a receipt confirmation indicating that the content viewing request is accepted (S3605) and transmits the encrypted content (S3606). The encrypted content transmission operation (S3606) is similar to S1010 and the subsequent steps of FIG. 10.

As described above, by referencing the value of the remote access flag attached to the content when the content viewing request is received from the content transmitter and receiver apparatus 600 located outside the user house, the content transmitter and receiver apparatus 700 can decide whether to reject or accept the content viewing request.

As described above, when content is delivered from the content transmitter apparatus to the content transmitter and receiver apparatus in the user house, the remote access flag is used to control the remote retransmission of the content that the content receiver apparatus has received. This process prevents content that is not given a retransmission permission from the content provider from being retransmitted to the outside of the house.

[Embodiment 13]

The preceding embodiment concerns the retransmission control in which the content delivered from the content transmitter apparatus to a content transmitter and receiver apparatus in the same house is retransmitted to a content transmitter and receiver apparatus located outside the user house. In this embodiment another retransmission control procedure will be explained in which the content that was delivered from the content transmitter apparatus to a content transmitter and receiver apparatus located outside the user house is retransmitted further to separate location outside the house.

Figure 41:
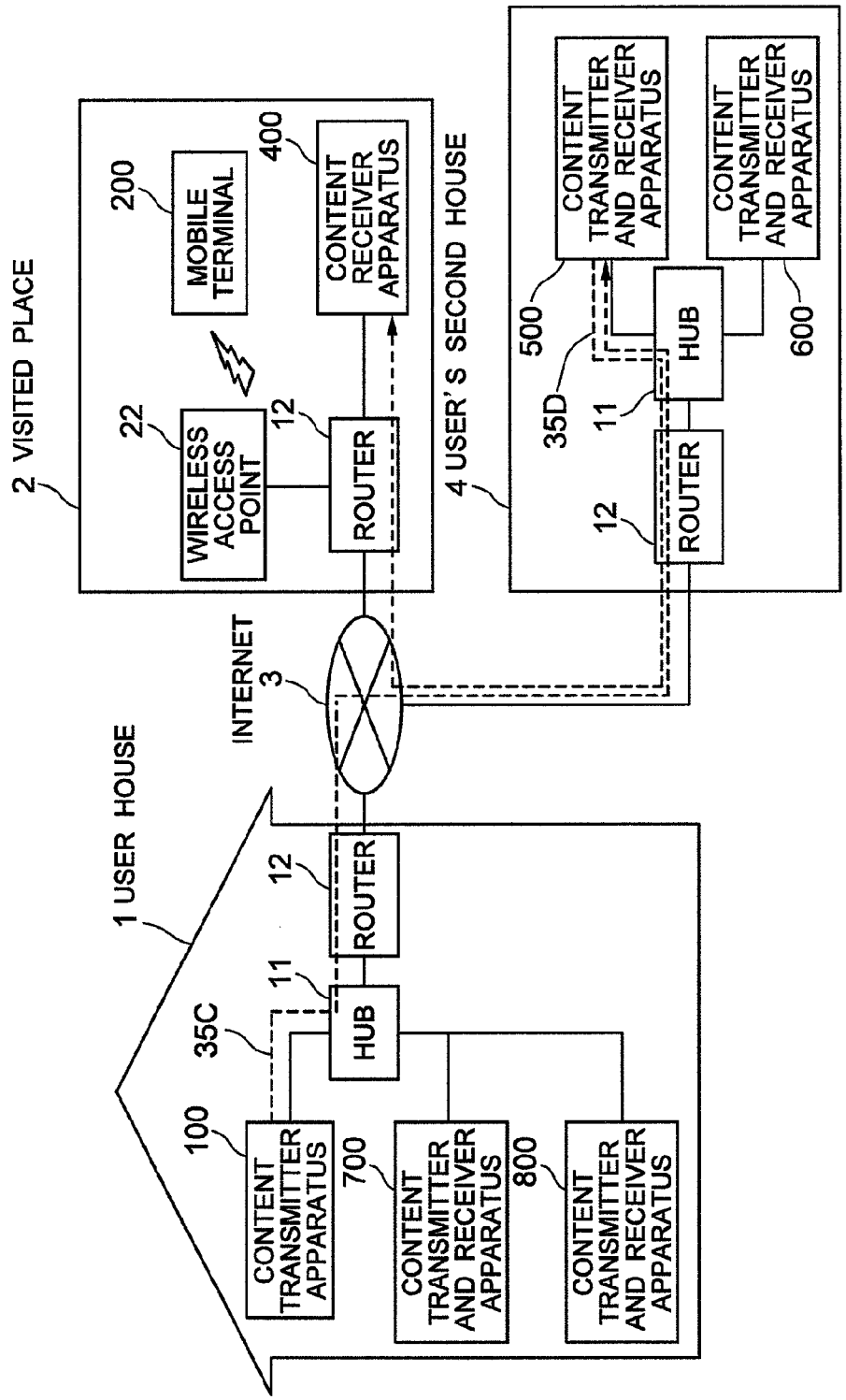
FIG. 41 is a configuration diagram showing an example flow of content in embodiment 13.

FIG. 41 is a configuration diagram showing a flow of content in this embodiment. Content, which was delivered from the content transmitter apparatus 100 in the user house 1 of FIG. 35 to a content transmitter and receiver apparatus 500 in user's second house 4 (35C), is delivered again to a content receiver apparatus 400 located in another visited place 2 outside house (35D). Here, the remote retransmission refers to a content retransmission from the content transmitter and receiver apparatus 500 to the content receiver apparatus 400.

Figure 39:
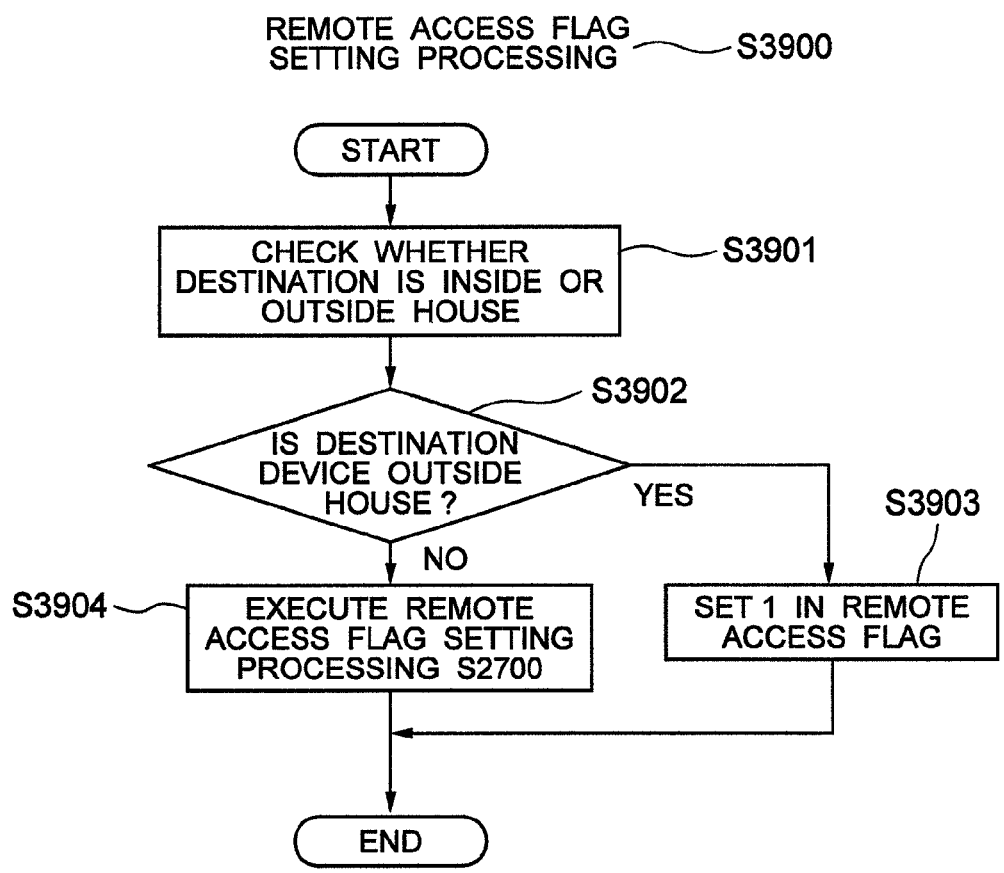
FIG. 39 shows an example of remote access flag setting operation S3900 in the controller 115 of the content transmitter apparatus 100.

FIG. 39 shows an example of remote access flag setting processing S3900 performed by the controller 115 of the content transmitter apparatus 100. The controller 115 of the content transmitter apparatus 100 first checks if the content transmission destination is a device inside the house or a device outside the house (S3901). If the delivery destination is found to be a device outside the house (Yes branch in S3902), the controller 115 sets the remote access flag to 1 (S3903). If on the other hand the delivery destination is found to be a device inside the house, the controller 115 executes the remote access flag setting operation S2700 (S3904) to set the remote access flag.

As described above, the information about where the content transmission destination device exists is also taken into consideration in determining the remote access flag setting. If the destination device is located outside the house, the remote access flag is set to 1 at all times. This procedure can prevent the content that was delivered to the outside of house from being retransmitted further to another device located outside the house.

Figure 37:
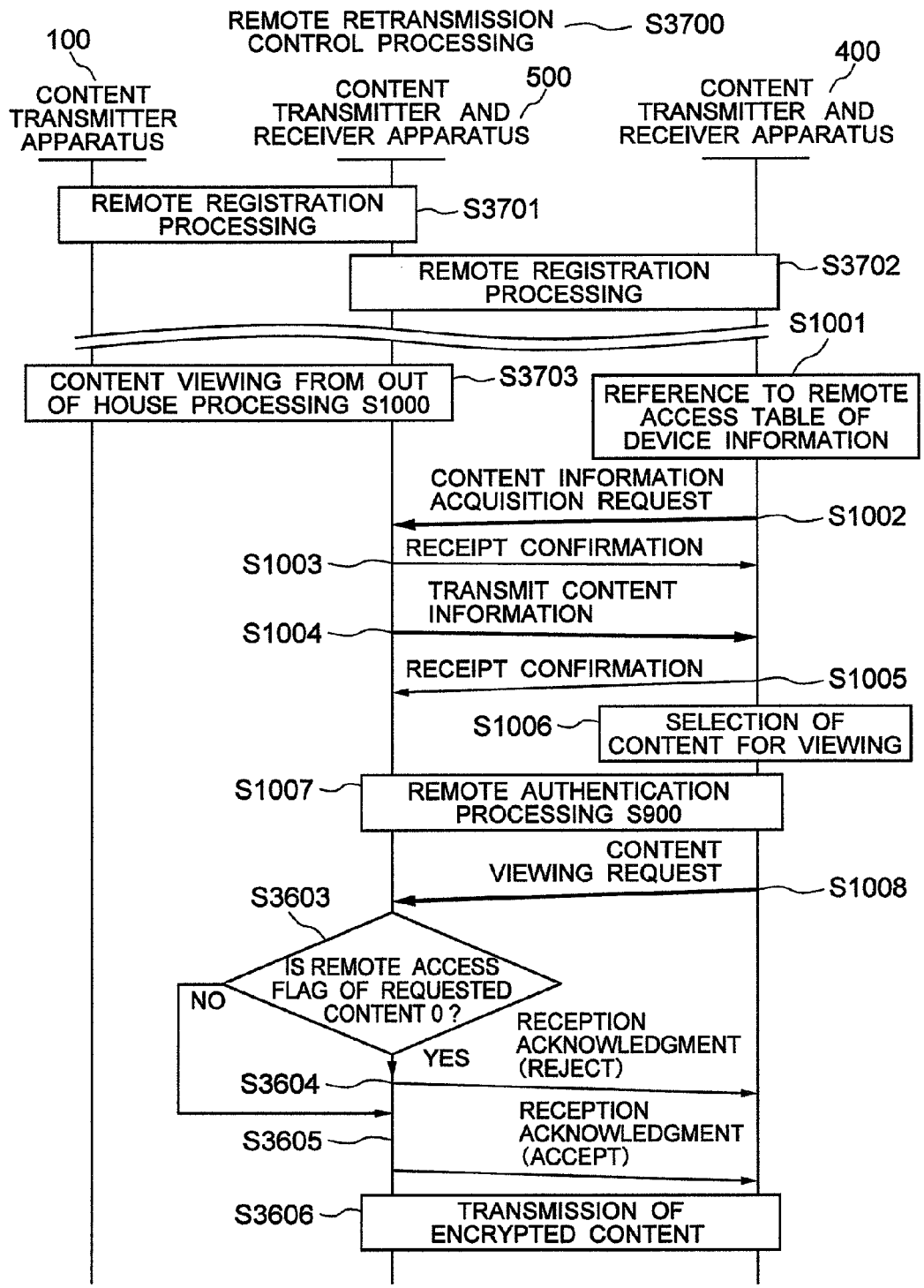
FIG. 37 shows an example procedure of retransmission control when the content, that was transmitted from the content transmitter apparatus 100 in user house 1 to a content transmitter and receiver apparatus 500 at a user's second house 4, is further retransmitted to a content transmitter and receiver apparatus 400 at a visited place 2, which is outside the house.

FIG. 37 shows an example procedure for content retransmission control when the content, which was delivered from the content transmitter apparatus 100 located inside the user house 1 to the content transmitter and receiver apparatus 500 located in the user's another house 4 (35C), is retransmitted to the content transmitter and receiver apparatus 400 located at a visited place 2 outside house (35D).

Prior to executing this procedure, one of the remote registration processing S700, S1100 and S1400 is performed between the content transmitter apparatus 100 and the content transmitter and receiver apparatus 500 (S3701). Also, one of the remote registration processing S700, S1100 and S1400 is performed between the content transmitter and receiver apparatus 500 and the content receiver apparatus 400 (S3702).

After this preliminary step, the content viewing from out of house processing S1000 is executed between the content transmitter apparatus 100 and the content transmitter and receiver apparatus 500, initiating the content transmission from the content transmitter apparatus 100 to the content transmitter and receiver apparatus 500 (S3703). Next, between the content transmitter and receiver apparatus 400 and the content transmitter and receiver apparatus 500, steps ranging from S1001 (reference to remote access table of device information) to S1008 (content viewing request) are performed in the same way as the procedure of FIG. 10.

Here it is assumed that the content selected is one that has begun to be delivered from the content transmitter apparatus 100 to the content transmitter and receiver apparatus 500 at step S3603. The controller 115 of the content transmitter and receiver apparatus 500 checks whether the remote access flag attached to the content requested by the content transmitter and receiver apparatus 400, i.e., the content received from the content transmitter apparatus 100, is 0 (retransmission prohibited) (S3603).

If the remote access flag is found to be 0 (Yes branch in S3603), the controller 115 of the content transmitter and receiver apparatus 500 transmits a receipt confirmation indicating that the content viewing request is rejected (S3604). If on the other hand the remote access flag is 1 (No branch in S3603), the controller 115 returns a receipt confirmation indicating that the content viewing request is accepted (S3605) and transmits the encrypted content (S3606). The encrypted content transmission operation (S3606) is similar to S1010 and the subsequent steps of FIG. 10.

As described above, when it receives the content viewing request from the content receiver apparatus 400 located outside the house, the content transmitter and receiver apparatus 500 references the value of the remote access flag attached to the content. This procedure enables a decision to be made as to whether the content viewing request should be rejected or accepted.

As described above, when content is delivered from the content transmitter apparatus to the content transmitter and receiver apparatus located outside the house, the remote access flag is used to control the remote retransmission of the content that the content transmitter and receiver apparatus outside the house has received. This procedure prevents content that is not given a retransmission permission from the content provider from being retransmitted to the outside of the house.

[Embodiment 14]

The preceding embodiment concerns the retransmission control in which the content delivered from the content transmitter apparatus to a content transmitter and receiver apparatus in the same house is retransmitted to a content transmitter and receiver apparatus located outside the user house. In this embodiment, another retransmission control will be explained in which the content delivered from the content transmitter apparatus to a content transmitter and receiver apparatus located outside the house is further delivered to a device located in the same place before being retransmitted to another place outside the house.

Figure 42:
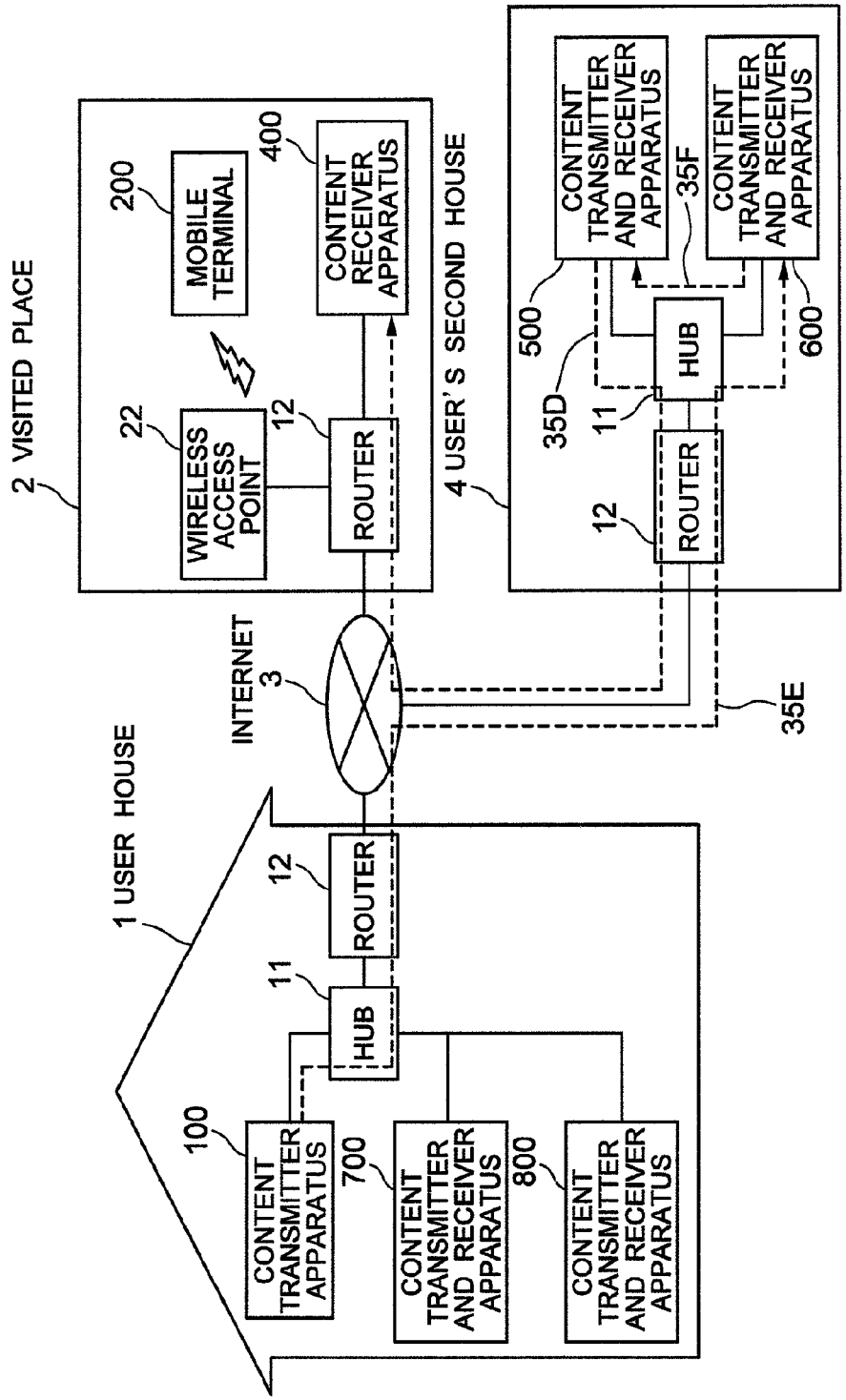
FIG. 42 is a configuration diagram showing an example flow of content in embodiment 14.

FIG. 42 is a configuration diagram showing the flow of content in this embodiment. A retransmission permission/rejection control method that will be explained in the following concerns a case where the content, that was delivered from the content transmitter apparatus 100 in the user house 1 of FIG. 35 to a content transmitter and receiver apparatus 600 located in user's second house 4 (35E), is delivered to a content transmitter and receiver apparatus 500 located in the same user's second house 4 (35F) and then retransmitted to a content receiver apparatus 400 located at a visited place 2 outside the house (35D). Here, the retransmission to the outside of the house refers to a content transmission from the content transmitter and receiver apparatus 500 to the content receiver apparatus 400.

Figure 38:
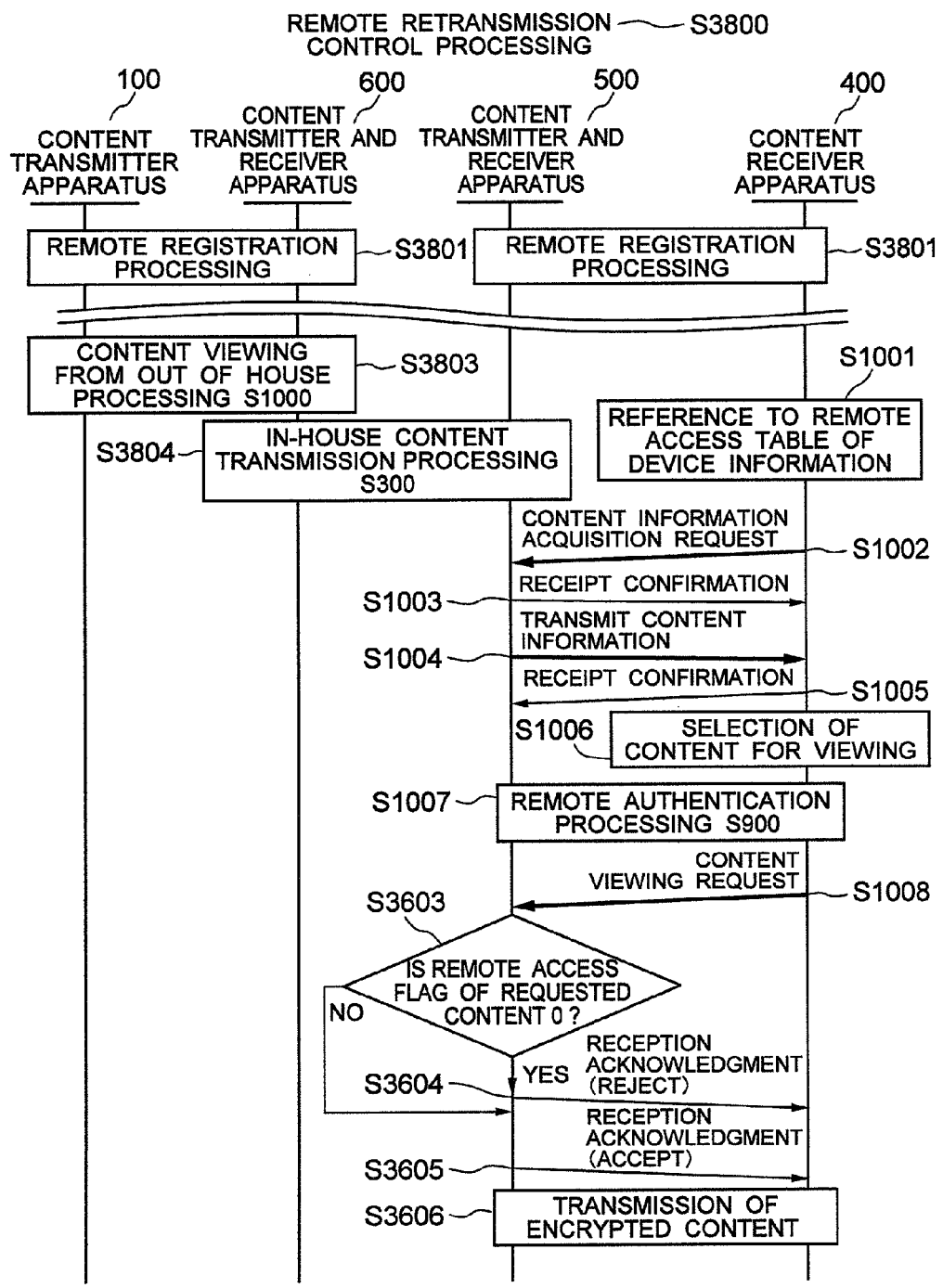
FIG. 38 shows an example procedure of retransmission control when the content, that was delivered from the content transmitter apparatus 100 in user house 1 to a content transmitter and receiver apparatus 600 at user's second house 4, is transmitted to a content transmitter and receiver apparatus 500 at the user's second house 4, from which it is further retransmitted to a content receiver apparatus 400 at a visited place 2, which is outside the house.

FIG. 38 shows an example of a retransmission control procedure executed when the content delivered from the content transmitter apparatus 100 in the user house 1 to a content transmitter and receiver apparatus 600 located in user's second house 4 (35E) is delivered again to a content transmitter and receiver apparatus 500 in the user's second house 4 (35F) before being retransmitted to a content receiver apparatus 400 located at a visited place 2 outside the house (35D).

Prior to initiating this procedure, one of the remote registration processing S700, S1100 and S1400 is performed between the content transmitter apparatus 100 and the content transmitter and receiver apparatus 600 (S3801). Also, one of the remote registration processing S700, S1100 and S1400 is performed between the content transmitter and receiver apparatus 500 and the content receiver apparatus 400 (S3702). With the above preliminary step taken, the content viewing from out of house processing S1000 is executed between the content transmitter apparatus 100 and the content transmitter and receiver apparatus 600 to initiate the content transmission from the content transmitter apparatus 100 to the content transmitter and receiver apparatus 600 (S3803).

Next, the in-house content transmission processing S3000 is executed between the content transmitter and receiver apparatus 600 and the content transmitter and receiver apparatus 500 to initiate the content transmission from the content transmitter and receiver apparatus 600 to the content transmitter and receiver apparatus 500 (S3804). Here, it is assumed that the content that the content transmitter and receiver apparatus 600 is going to deliver is the one being delivered from the content transmitter apparatus 100 to the content transmitter and receiver apparatus 600.

Next, between the content transmitter and receiver apparatus 400 and the content transmitter and receiver apparatus 500, steps ranging from S1001 (reference to remote access table of device information) to S1008 (content viewing request) are performed in the same way as the procedure of FIG. 10. Here it is assumed that the content selected is one that has begun to be delivered from the content transmitter and receiver apparatus 600 to the content transmitter and receiver apparatus 500.

The controller 115 of the content transmitter and receiver apparatus 500 checks whether the remote access flag attached to the content requested by the content receiver apparatus 400, i.e., the content received from the content transmitter and receiver apparatus 600, is 0 (retransmission prohibited) (S3603). If the remote access flag is found to be 0 (Yes branch in S3603), the controller 115 of the content transmitter and receiver apparatus 500 transmits a receipt confirmation indicating that the content viewing request is rejected (S3604).

If on the other hand the remote access flag is 1 (No branch in S3603), the controller 115 returns a receipt confirmation indicating that the content viewing request is accepted (S3605) and transmits the encrypted content (S3606). The encrypted content transmission operation (S3606) is similar to S1010 and the subsequent steps of FIG. 10.

As described above, transmitting the remote access flag from the content transmitter apparatus 100 to the content transmitter and receiver apparatus 600 and from content transmitter and receiver apparatus 600 to the content transmitter and receiver apparatus 500 enables the content transmitter and receiver apparatus 500, when requested for content viewing by the content receiver apparatus 400 located outside the house, to refer to the value of the remote access flag attached to the content and make a decision as to whether to reject or accept the content viewing request.

The retransmission control is performed as described above when the content, that was delivered from the content transmitter apparatus to a content transmitter and receiver apparatus located outside the house, is delivered again to another device located in the same place from which it is retransmitted further to another place outside the house. This control can prevent content that is not given a retransmission permission from the content provider from being retransmitted to the outside of the house.

[Embodiment 15]

This embodiment explains a retransmission control procedure performed in a situation where the content transmitter apparatus delivers content to a content transmitter and receiver apparatus in the same user house which is not capable of the remote retransmission control; the content transmitter and receiver apparatus not capable of the remote retransmission control delivers the received content to another content transmitter and receiver apparatus in the same user house; and the content transmitter and receiver apparatus is requested to retransmit the content to a place outside the house.

Figure 43:
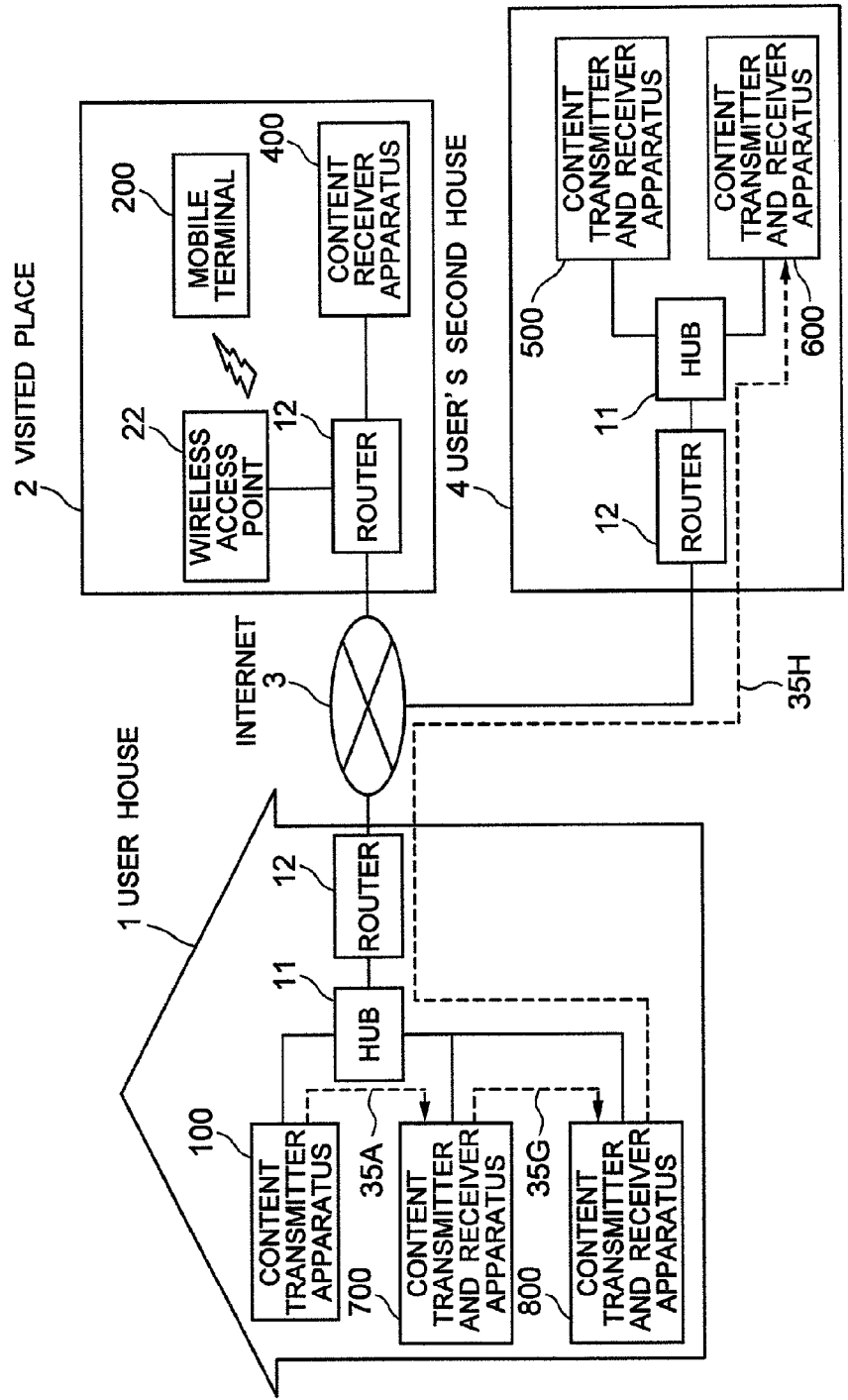
FIG. 43 is a configuration diagram showing an example flow of content in embodiment 15.

FIG. 43 is a configuration diagram showing an example flow of content in this embodiment. A situation is considered in which the content that was delivered from the content transmitter apparatus 100 in the user house 1 of FIG. 35 to a content transmitter and receiver apparatus 700 (35A) is delivered to another content transmitter and receiver apparatus 800 (35G) in the user house 1 from which it is further retransmitted to a content transmitter and receiver apparatus 600 located at user's second house 4 (35H). Here it is assumed that the content transmitter and receiver apparatus 700 is a conventional device not capable of the remote retransmission control but only capable of transmitting and receiving content inside the house.

Figure 44:
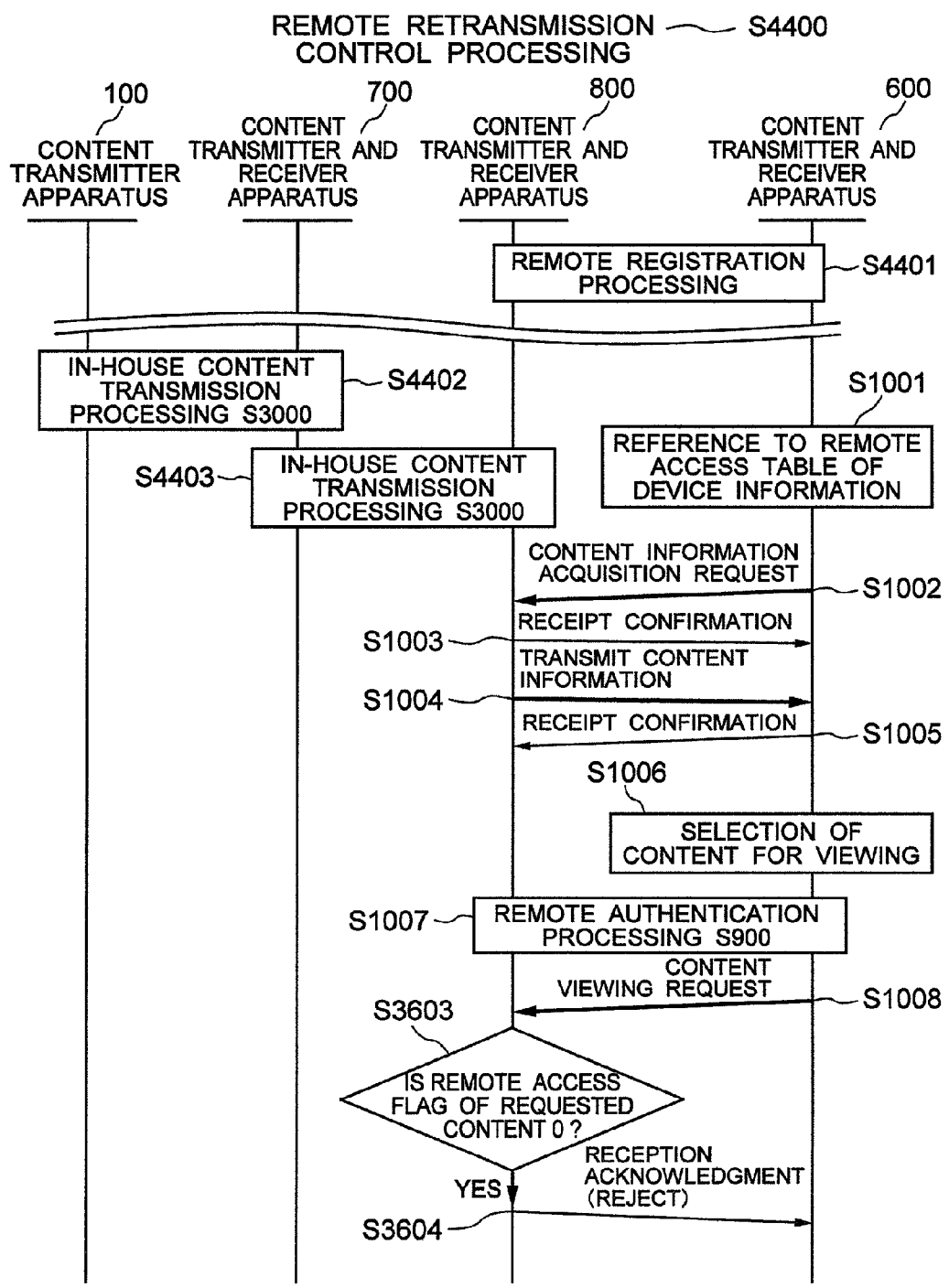
FIG. 44 is an example procedure of retransmission control when the content, that was delivered from the content transmitter apparatus 100 in user house 1 to a content transmitter and receiver apparatus 700, is further delivered to another content transmitter and receiver apparatus 800 in user house 1, from which it is further retransmitted to a content transmitter and receiver apparatus 600 at user's second house 4.

FIG. 44 shows an example retransmission control procedure executed when the content delivered from the content transmitter apparatus 100 in the user house 1 to the content transmitter and receiver apparatus 700 (35A) is transmitted to the content transmitter and receiver apparatus 800 located in the user house 1 (35G) from which it is further retransmitted to the content transmitter and receiver apparatus 600 located in the user's second house 4 (35H).

Before executing this procedure, one of the remote registration processing S700, S1100 and S1400 is performed between the content transmitter and receiver apparatus 800 and the content transmitter and receiver apparatus 600 (S4401). With this preliminary step taken, the in-house content transmission processing S3000 is executed between the content transmitter apparatus 100 and the content transmitter and receiver apparatus 700 to initiate the content transmission from the content transmitter apparatus 100 to the content transmitter and receiver apparatus 700 (S4402).

Here, as for the device authentication processing of S3007, since the content transmitter and receiver apparatus 700 is a conventional device with no remote retransmission controllability, the device 700 performs the normal device authentication processing S600, rather than the Device authentication processing with remote retransmission controllability check S2600. As a result, in the content transmission from the content transmitter apparatus 100 to the content transmitter and receiver apparatus 700, the remote access flag is set to 0.

Next, the in-house content transmission processing S3000 is performed between the content transmitter and receiver apparatus 700 and the content transmitter and receiver apparatus 800 to initiate the content transmission from the content transmitter and receiver apparatus 700 to the content transmitter and receiver apparatus 800 (S4403). As for the device authentication processing of S3007, since the content transmitter and receiver apparatus 700 is a conventional device not capable of the remote retransmission control, it neglects the capability notification operation even if the Device authentication processing with remote retransmission controllability check S2600 is executed.

In the content transmission from the content transmitter and receiver apparatus 700 to the content transmitter and receiver apparatus 800, although the remote access flag setting is not performed explicitly, the associated field is 0, which, on the side of the content receiver apparatus capable of the remote retransmission control, can be interpreted to mean that the remote access flag is 0. Here, it is assumed that the content delivered from the content transmitter and receiver apparatus 700 is the one being delivered from the content transmitter apparatus 100 to the content transmitter and receiver apparatus 700. Next, between the content transmitter and receiver apparatus 600 and the content transmitter and receiver apparatus 800, steps ranging from S1001 (reference to remote access table of device information) to S1008 (content viewing request) are performed in the same way as the procedure of FIG. 10.

Here it is assumed that the content selected is one that has begun to be delivered in the step S4403 from the content transmitter and receiver apparatus 700 to the content transmitter and receiver apparatus 800. The controller 115 of the content transmitter and receiver apparatus 800 checks that the remote access flag attached to the content requested by the content transmitter and receiver apparatus 600, i.e., the content received from the content transmitter and receiver apparatus 700, is 0 (retransmission prohibited) (S3603). With this check completed, the content transmitter and receiver apparatus 800 transmits to the content transmitter and receiver apparatus 600 a receipt confirmation indicating that the content viewing request is rejected (S3604).

As described above, by transmitting content with the remote access flag set to 0 to a conventional receiving device that is capable of only content transmission and reception inside the house and does not have the remote retransmission capability, the conventional receiving device can be made to reproduce the received content. This assures a mutual connectivity. Further, by using the corresponding field in the header portion as a remote access flag, as at RA 170212 of FIG. 17, the receiving device inside the house with the remote retransmission capability can be controlled not to execute the remote retransmission of the content received from the conventional receiving device. This is because the remote access flag of the content delivered from the conventional receiving device is 0.

If, prior to receiving content from a content transmitter apparatus inside the house, a receiving device with the remote retransmission capability checks the capability of the content transmitter apparatus and finds that the content transmitter apparatus is a conventional device not capable of the remote retransmission, the receiving device may be controlled not to execute the remote retransmission operation.

With the above procedure, even if content is delivered inside the house via conventional devices with no remote retransmission capability, the remote retransmission control can be performed properly by a device that transmits the content to the outside of the house.

[Embodiment 16]

The preceding embodiment has described an example retransmission control that uses a remote access flag in controlling the retransmission of content received from a content transmitter apparatus through a network.

In this embodiment will be shown an example case where the content to be delivered to the network or the information attached to the content includes an identifier indicating whether the remote transmission is permitted.

FIG. 46 is an example retransmission condition table 9300 showing the condition under which content delivered from the content transmitter apparatus is permitted to be retransmitted to the outside of the house. This table is used by the content transmitter apparatus 100. The retransmission condition table 9300 comprises two conditions—copy control information 9001 and input media 9002. The copy control information 9001 is classified into such categories as "Copy free (permitted to be copied without limit)", "Copy free with EPN asserted (permitted to be copied without limit but with output protection), "Copy one generation (permitted to be copied for one generation)", "No more copies (re-copy prohibited)" and "Copy never (copy prohibited)".

The input media 9002 has "broadcast wave", "HDD", "optical disc 1", "optical disc 2", "semiconductor memory", "IP broadcast" and "in-house network". The input media shows through which route the content to be transmitted has been entered. Of the input media, the "broadcast wave" indicates that the content has been entered from an antenna of the content transmitter apparatus 100; the "HDD", "optical disc 1", "optical disc 2" and "semiconductor memory" indicate that the content has come from the recording portion of the content transmitter apparatus; and the "IP broadcast" and "in-house network" indicate that the content has come from the digital input/output terminal 114 of the content transmitter apparatus 100.

Further, of the input media 9002, the "broadcast wave", "optical disc 1" and "IP broadcast" each comprise an identifier presence/absence 9301, which indicates whether there is the identifier representing the remote retransmission permission, and a set value 9302 that is used when the identifier exists.

The identifier presence/absence 9301 is classified into "identifier exists" and "identifier does not exist".

The set value 9302 is either a "permitted" or "prohibited".

When the retransmission condition table 9300 is used, the copy control information 9001 and input media 9002 and also the identifier presence/absence 9101 and set value 9302 are checked to see if the content of interest is permitted to be retransmitted to the outside of the house. For example, if the copy control information 9001 is "Copy one generation", the input media is "broadcast wave", the identifier presence/absence 9301 is "identifier exists", and the set value 9302 is "prohibited", it can be decided that the retransmission of the content to the outside of the house is "prohibited".

By using the content copy control information and the input media in the retransmission condition table 9300 to make a decision on the remote retransmission condition, a more precise remote retransmission control can be performed as intended by a content provider.

The present invention is not limited by the above described embodiments and includes various modifications. For example, the above embodiments are described in detail to make the embodiments easier to understand and it is not necessarily to be limited to include all the configurations described above. Further, a part of configurations of one embodiment may be replaced with a configuration of the other embodiments, and the configurations of the other embodiments may be added to one embodiment. A part of configurations of respective embodiments may be modified by adding the other configurations, deleting or replacing with any configurations.

Further, the part of or the all of the above respective configurations, functions, processing portions and processing means etc. may be realized by hardware which is, for example, designed by an integrated circuit etc. The above respective configurations or functions etc. may be realized by executing a software by interpreting a program to realize the respective functions by a processor. Information of a program, a table, or a file etc. to realize the respective functions may be stored in a storage device such as memories, hard disks, SSD (Solid State Drive) etc., or a storage media such as IC cards, SD cards or DVDs etc.

Further, the control line or the information line that would be necessary to describe is illustrated, and all control lines or information lines for a product are not necessarily to be described. In fact, it may be considered that most of all configurations are connected each other.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A content transmitter apparatus to deliver content to a content receiver apparatus through a network, comprising:
    a portion authentication processing portion configured to authenticate the content receiver apparatus and create key information to be shared with the content receiver apparatus;
    an encryption processing portion configured to encrypt the content to be delivered to the content receiver apparatus by using the key information;
    a communication processing portion configured to transmit and receive authentication data to and from the content receiver apparatus and transmit the content to the content receiver apparatus via the network; and
    a controller to control the portion authentication processing portion, the encryption processing portion and the communication processing portion;
    wherein the controller authenticates, through the portion authentication processing portion, the content receiver apparatus according to a first authentication method and registers portion information of the authenticated content receiver apparatus;
    wherein, when the content encrypted by the encryption processing portion is delivered through the communication processing portion to the content receiver apparatus located outside a house, the controller authenticates the content receiver apparatus located outside the house according to a second authentication method and transmits the remote exchange key information, the second authentication method including a procedure that authenticates the content receiver apparatus when it is decided that an authentication according to the first authentication method is performed to the content receiver apparatus and the portion information of the content receiver apparatus is registered;
    wherein, when the content encrypted by the encryption processing portion is delivered through the communication processing portion to the content receiver apparatus located inside the house, the controller authenticates the content receiver apparatus according to a third authentication method and transmits in-house exchange key information different from the remote exchange key information.

2. A content transmitter apparatus according to claim 1, wherein the first authentication method includes a procedure which involves
    transmitting an in-house confirmation request to the content receiver apparatus, receiving a receipt confirmation in response to the in-house confirmation request, deciding that the content transmitter apparatus and the content receiver apparatus
    are located inside the same house if the time it took from when the in-house confirmation request was issued until the receipt confirmation was received does not exceed a predetermined limit and,
    if it is decided that the content receiver apparatus is in the same house, authenticating the content receiver apparatus;
    wherein the second authentication method does not include the procedure for checking whether the content receiver apparatus is in the same house.

3. A content transmitter apparatus according to claim 1, wherein the third authentication method includes a procedure which involves transmitting an in-house confirmation request to the content receiver apparatus, receiving a receipt confirmation in response to the in-house confirmation request, deciding that the content transmitter apparatus and the content receiver apparatus are located inside the same house if the time it took from when the in-house confirmation request was issued until the receipt confirmation was received does not exceed a predetermined limit and, if it is decided that the content receiver apparatus is in the same house, authenticating the content receiver apparatus;

wherein the second authentication method does not include the procedure for checking whether the content receiver apparatus is in the same house.

4. A content transmitter apparatus according to claim 1, wherein, when it receives a remote access authentication start request, the portion authentication processing portion in the authentication procedure decides that the content receiver apparatus that has issued the remote access authentication start request exists outside the house;

wherein, if it decides that the content receiver apparatus is outside the house, the portion authentication processing portion authenticates the content receiver apparatus according to the second authentication method.

5. A content transmitter apparatus according to claim 1, wherein, when it delivers the encrypted content to a first content receiver apparatus, the controller (1) decides whether to permit the first content receiver apparatus at the content transmission destination to retransmit the content to a second content receiver apparatus located outside the house in which the first content receiver apparatus is installed, (2) if it is decided that the content is permitted to be retransmitted, delivers to the first content receiver apparatus the content along with an identifier indicating a permission of content retransmission, and (3) if it is decided that the content is not permitted to be retransmitted, delivers to the first content receiver apparatus the content along with an identifier indicating a prohibition of content retransmission.

6. A content transmitter apparatus according to claim 1, wherein when the encrypted content including additional information including an identifier indicating whether a remote transmission is permitted is transmitted to the content receiver apparatus located outside the house, the controller determines whether the identifier permits a remote transmission of the content:

if the remote transmission of the content is permitted, the content is transmitted to the content receiver apparatus; and if the remote transmission of the content is not permitted, the content is not transmitted to the content receiver apparatus.

7. A content receiver apparatus to receive content from a content transmitter apparatus through a network, comprising:

a portion authentication processing portion configured to perform an authentication procedure between it and the content transmitter apparatus and share key information with the content transmitter apparatus;

a decryption processing portion configured to encrypt/decrypt the content received from the content transmitter apparatus by using the key information;

a communication processing portion configured to transmit and receive authentication data to and from the content transmitter apparatus and receive the content from the content transmitter apparatus via the network; and a controller to control the portion authentication processing portion, the decryption processing portion and the communication processing portion;

wherein the controller performs, through the device authentication processing portion, an authentication procedure with the content transmitter apparatus according a first authentication method to register portion information of the content receiver apparatus;

wherein, when it receives through the communication processing portion the encrypted content from the content transmitter apparatus located outside a house, the controller performs the authentication procedure with the content transmitter apparatus according to a second authentication method and receives remote exchange key information;

wherein, when it receives through the communication processing portion the encrypted content from the content transmitter apparatus located inside the house, the controller performs the authentication procedure with the content transmitter apparatus according to a third authentication method and receives in-house exchange key information different from the remote exchange key information.

8. A content receiver apparatus according to claim 7, wherein the first authentication method includes a procedure which involves receiving an in-house confirmation request from the content transmitter apparatus and transmitting a receipt confirmation in response to the in-house confirmation request;

wherein the second authentication method does not include the procedure which involves receiving an in-house confirmation request from the content transmitter apparatus and transmitting a receipt confirmation in response to the in-house confirmation request.

9. A content receiver apparatus according to claim 7, wherein the third authentication method includes a procedure which involves receiving an in-house confirmation request from the content transmitter apparatus and transmitting a receipt confirmation in response to the in-house confirmation request;

wherein the second authentication method does not include the procedure which involves receiving an in-house confirmation request from the content transmitter apparatus and transmitting a receipt confirmation in response to the in-house confirmation request.

10. A content receiver apparatus according to claim 7, wherein, if the content transmitter apparatus exists outside the house, the controller transmits a remote access authentication start request and performs the authentication procedure with the content transmitter apparatus according to the second authentication method.

11. A content receiver apparatus according to claim 7, wherein, in the retransmission procedure of receiving the encrypted content from the content transmitter apparatus, encrypting and retransmitting the content to a second content receiver apparatus located outside the house through the network, the controller checks an identifier received together with the content to see if the content is permitted to be retransmitted to the second content receiver apparatus located outside the house in which the content receiver apparatus exists, if it is decided that the content retransmission is permitted, encrypts and retransmits the content to the second content receiver apparatus and, if it is decided that the content retransmission is not permitted, does not retransmit the content to the second content receiver apparatus.

12. A content transmission method to deliver content to a content receiver apparatus through a network, comprising the steps of:
   authenticating the content receiver apparatus and creating key information to be shared with the content receiver apparatus;
   encrypting the content to be delivered to the content receiver apparatus by using the key information; and
   transmitting and receiving authentication data to and from the content receiver apparatus and transmitting the content to the content receiver apparatus via the network;
   wherein the authentication of the content receiver apparatus is performed according to a first authentication method and device information of the authenticated content receiver apparatus is registered;
   wherein, when the encrypted content is delivered to the content receiver apparatus located outside a house, the authentication of the content receiver apparatus located outside the house is performed according to second authentication method and remote exchange key information is transmitted, the second authentication method including a procedure that authenticates the content receiver apparatus when it is decided that an authentication according to the first authentication method is performed to the content receiver apparatus and the device information of the content receiver apparatus is registered ;
   wherein, when the encrypted content is delivered to the content receiver apparatus located inside the house, the authentication of the content receiver apparatus is performed according to a third authentication method and in-house exchange key information different from the remote exchange key information is transmitted.

13. A content transmission method according to claim 12, wherein the first authentication method includes a procedure which involves transmitting an in-house confirmation request to the content receiver apparatus, receiving a receipt confirmation in response to the in-house confirmation request, deciding that the content transmitter apparatus and the content receiver apparatus are located inside the same house if the time it took from when the in-house confirmation request was issued until the receipt confirmation was received does not exceed a predetermined limit, and
   authenticating the content receiver apparatus if it is decided that the content receiver apparatus is in the same house;
   wherein the second authentication method does not include the procedure for checking whether the content receiver apparatus is in the same house.

14. A content transmission method according to claim 12, wherein the third authentication method includes a procedure which involves transmitting an in-house confirmation request to the content receiver apparatus, receiving a receipt confirmation in response to the in-house confirmation request, deciding that the content transmitter apparatus and the content receiver apparatus are located inside the same house if the time it took from when the in-house confirmation request was issued until the receipt confirmation was received does not exceed a predetermined limit and,
   if it is decided that the content receiver apparatus is in the same house, authenticating the content receiver apparatus;
   wherein the second authentication method does not include the procedure for checking whether the content receiver apparatus is in the same house.

15. A content transmission method according to claim 12, wherein, in the authentication procedure, when a remote access authentication start request is received, it is decided that the content receiver apparatus that has issued the remote access authentication start request exists outside the house;
   wherein, if it is decided that the content receiver apparatus is outside the house, the authentication of the content receiver apparatus is performed according to the second authentication method.

16. A content transmission method according to claim 12, wherein, when the encrypted content is delivered to a first content receiver apparatus, a control is performed which involves
   (1) deciding whether to permit the first content receiver apparatus at the content transmission destination to retransmit the content to a second content receiver apparatus located outside the house in which the first content receiver apparatus is installed,
   (2) if it is decided that the content is permitted to be retransmitted, transmitting to the first content receiver apparatus the content along with an identifier indicating a permission of content retransmission, and
   (3) if it is decided that the content is not permitted to be retransmitted, transmitting to the first content receiver apparatus the content along with an identifier indicating a prohibition of content retransmission.

17. A content transmission method according to claim 12, when the encrypted content including additional information including an identifier indicating whether a remote transmission is permitted is transmitted to the content receiver apparatus located outside the house, it is determined whether the identifier permits a remote transmission of the content;
   if the remote transmission of the content is permitted, the content is transmitted to the content receiver apparatus; and
   if the remote transmission of the content is not permitted, the content is not transmitted to the content receiver apparatus.

18. A content receiving method to receive content from a content transmitter apparatus through a network, comprising the steps of:
   performing an authentication procedure with the content transmitter apparatus and sharing key information with the content transmitter apparatus;
   encrypting/decrypting the content received from the content transmitter apparatus by using the key information; and
   transmitting and receiving authentication data to and from the content transmitter apparatus and receiving the content from the content transmitter apparatus via the network;
   wherein, to register device information of the content receiver apparatus, the authentication procedure is performed with the content transmitter apparatus according to a first authentication method;
   wherein, when the encrypted content is received from the content transmitter apparatus located outside a house, the authentication procedure is performed with content transmitter apparatus according to a second authentication method and remote exchange key information is received;
   wherein, when the encrypted content is received from the content transmitter apparatus located inside the house, the authentication procedure is performed with the content transmitter apparatus according to the third authentication method and in-house exchange key information different from the remote exchange key information is received.

19. A content receiving method according to claim 18, wherein the first authentication method includes a procedure which involves receiving an in-house confirmation request from the content transmitter apparatus and transmitting a receipt confirmation in response to the in-house confirmation request;

wherein the second authentication method does not include the procedure which involves receiving an in-house confirmation request from the content transmitter apparatus and transmitting a receipt confirmation in response to the in-house confirmation request.

20. A content receiving method according to claim 18, wherein the third authentication method includes a procedure which involves receiving an in-house confirmation request from the content transmitter apparatus and transmitting a receipt confirmation in response to the in-house confirmation request; wherein the second authentication method does not include the procedure which involves receiving an in-house confirmation request from the content transmitter apparatus and transmitting a receipt confirmation in response to the in-house confirmation request.

21. A content receiving method according to claim 18, wherein, if the content transmitter apparatus exists outside the house, a remote access authentication start request is sent to the content transmitter apparatus and the authentication procedure is performed with the content transmitter apparatus according to the second authentication method.

22. A content receiving method according to claim 18, wherein, in the retransmission procedure of receiving the encrypted content from the content transmitter apparatus, encrypting and retransmitting the content to a second content receiver apparatus located outside the house through the network, a control is performed which involves checking an identifier received together with the content to see if the content is permitted to be retransmitted to the second content receiver apparatus located outside the house in which the content receiver apparatus exists, if it is decided that the content retransmission is permitted, encrypting and retransmitting the content to the second content receiver apparatus and, if it is decided that the content retransmission is not permitted, not retransmitting the content to the second content receiver apparatus.

* * * * *